(12) United States Patent
Burrows

(10) Patent No.: US 9,968,218 B2
(45) Date of Patent: May 15, 2018

(54) COFFEE BREWER APPARATUSES AND METHODS FOR BREWING BEVERAGES

(71) Applicant: Coffee Solutions, LLC, Portland, OR (US)

(72) Inventor: Bruce D. Burrows, Valencia, CA (US)

(73) Assignee: COFFEE SOLUTIONS, LLC, Portland, OR (US)

(*) Notice: Subject to any disclaimer, the term of this patent is extended or adjusted under 35 U.S.C. 154(b) by 431 days.

(21) Appl. No.: 14/399,474

(22) PCT Filed: May 6, 2013

(86) PCT No.: PCT/US2013/039790
§ 371 (c)(1),
(2) Date: Nov. 6, 2014

(87) PCT Pub. No.: WO2013/169678
PCT Pub. Date: Nov. 14, 2013

(65) Prior Publication Data
US 2015/0157168 A1 Jun. 11, 2015

Related U.S. Application Data

(60) Provisional application No. 61/643,290, filed on May 6, 2012, provisional application No. 61/711,085, filed on Oct. 8, 2012, provisional application No. 61/771,695, filed on Mar. 1, 2013.

(51) Int. Cl.
A47J 31/44 (2006.01)
A23F 5/26 (2006.01)
(Continued)

(52) U.S. Cl.
CPC .......... *A47J 31/4457* (2013.01); *A23F 5/262* (2013.01); *A47J 31/002* (2013.01); *A47J 31/057* (2013.01);
(Continued)

(58) Field of Classification Search
CPC .... A47J 31/002; A47J 31/057; A47J 31/0576; A47J 31/46; A47J 31/462; A47J 31/4457;
(Continued)

(56) References Cited

U.S. PATENT DOCUMENTS 3,333,964 A * 8/1967 Bender ................. A47J 31/002
426/433
4,083,295 A * 4/1978 Hollingsworth ...... A47J 31/542
392/471
(Continued)

FOREIGN PATENT DOCUMENTS

WO WO2008155538 * 12/2008

Primary Examiner — Anthony Weier
(74) Attorney, Agent, or Firm — Buchalter

(57) ABSTRACT

A brewer for brewing beverages in a brew basket, such as loose coffee or tea, is provided, where the flow of water to the brew basket alternates between water brewing phases and steam brewing phases during a single brew cycle, resulting in comparatively higher temperatures of water in the brew basket than conventional brewers. The frequency and duration of the water brewing phases and steam brewing phases during a brew cycle can be electronically controlled according to one or more predetermined programs. A reinforcing band is also provided for the lighted brew basket interior to strengthen the brewer head bowl in this area, and a single cup insert is also provided.

57 Claims, 38 Drawing Sheets

(51) Int. Cl.
    *A47J 31/057*    (2006.01)
    *A47J 31/00*    (2006.01)
    *A47J 31/46*    (2006.01)
    *G01F 23/292*    (2006.01)

(52) U.S. Cl.
    CPC ....... *A47J 31/0576* (2013.01); *A47J 31/4482* (2013.01); *A47J 31/4489* (2013.01); *A47J 31/46* (2013.01); *A47J 31/462* (2013.01); *G01F 23/292* (2013.01)

(58) Field of Classification Search
    CPC ... A47J 31/4482; A47J 31/4489; A23F 5/262; G01F 23/292
    See application file for complete search history.

(56) References Cited

U.S. PATENT DOCUMENTS

| | | | | |
|---|---|---|---|---|
| 4,531,046 A | * | 7/1985 | Stover ................ | A47J 31/56 |
| | | | | 392/442 |
| 4,967,648 A | * | 11/1990 | Helbling ............. | A47J 31/007 |
| | | | | 99/280 |
| 5,680,108 A | * | 10/1997 | Daniell ............... | A47G 19/2227 |
| | | | | 250/215 |
| 5,862,739 A | * | 1/1999 | Lin ...................... | A47J 31/02 |
| | | | | 99/285 |
| 6,968,775 B2 | | 11/2005 | Burrows et al. | |
| 7,240,611 B2 | | 7/2007 | Burrows et al. | |
| 7,340,991 B2 | | 3/2008 | Burrows | |
| 2006/0102010 A1 | * | 5/2006 | Burrows ............. | A47J 31/057 |
| | | | | 99/279 |

* cited by examiner

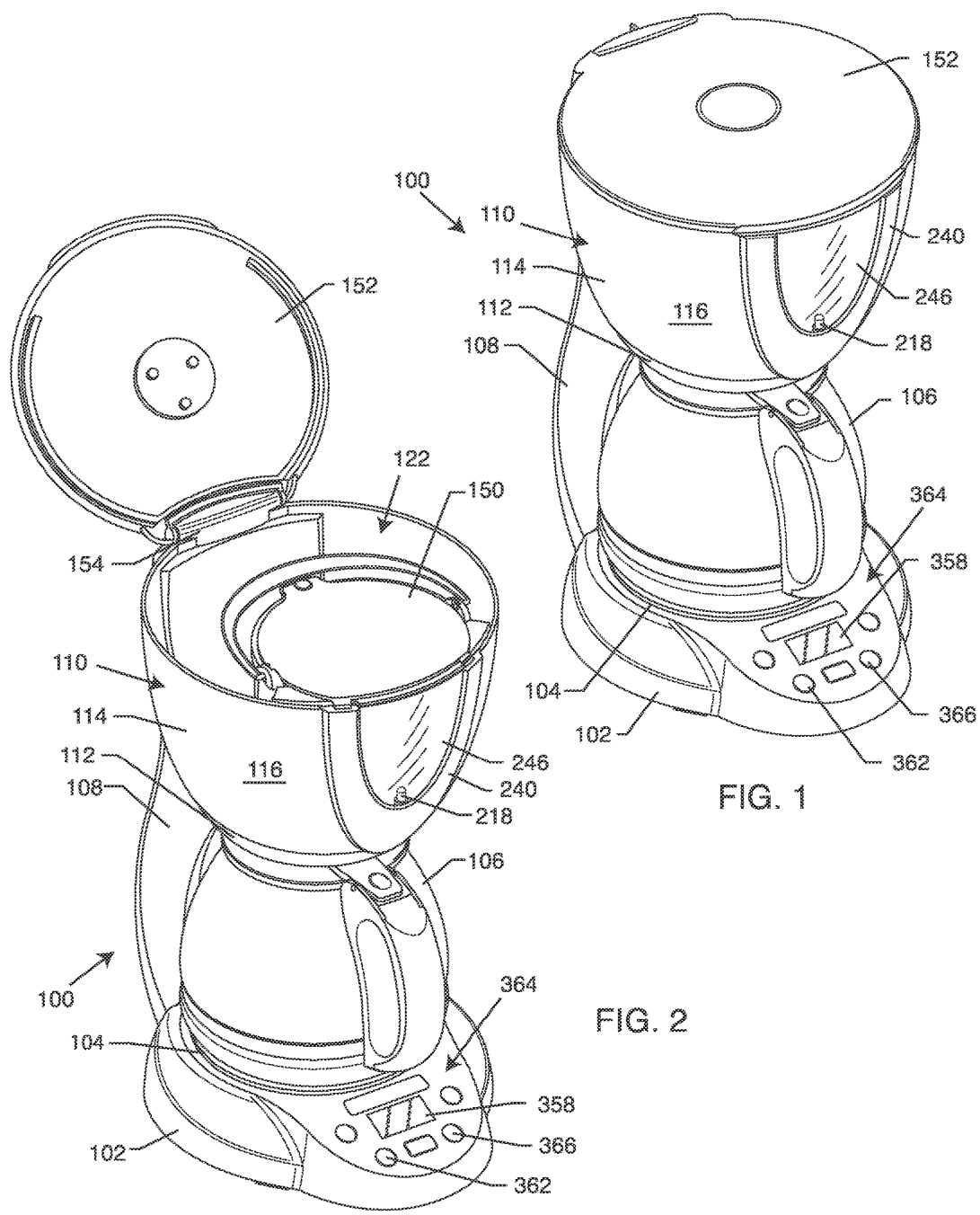

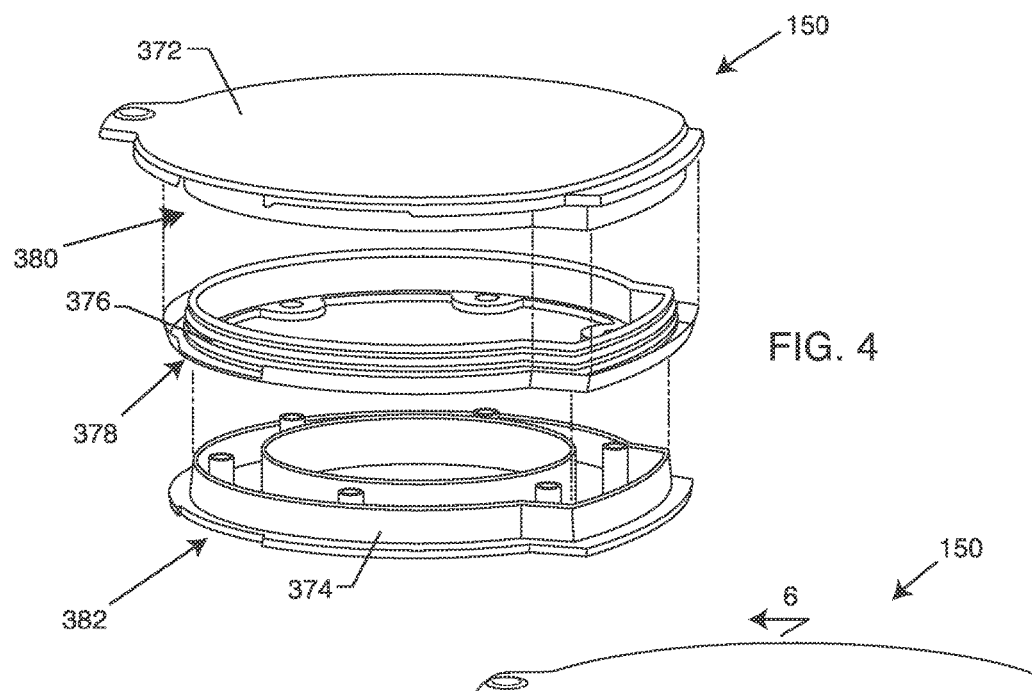
FIG. 4
FIG. 5
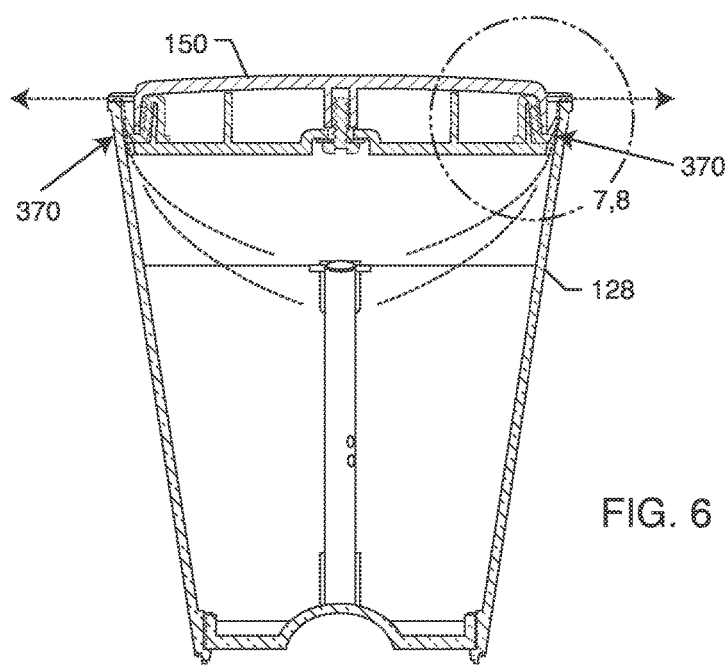
FIG. 6

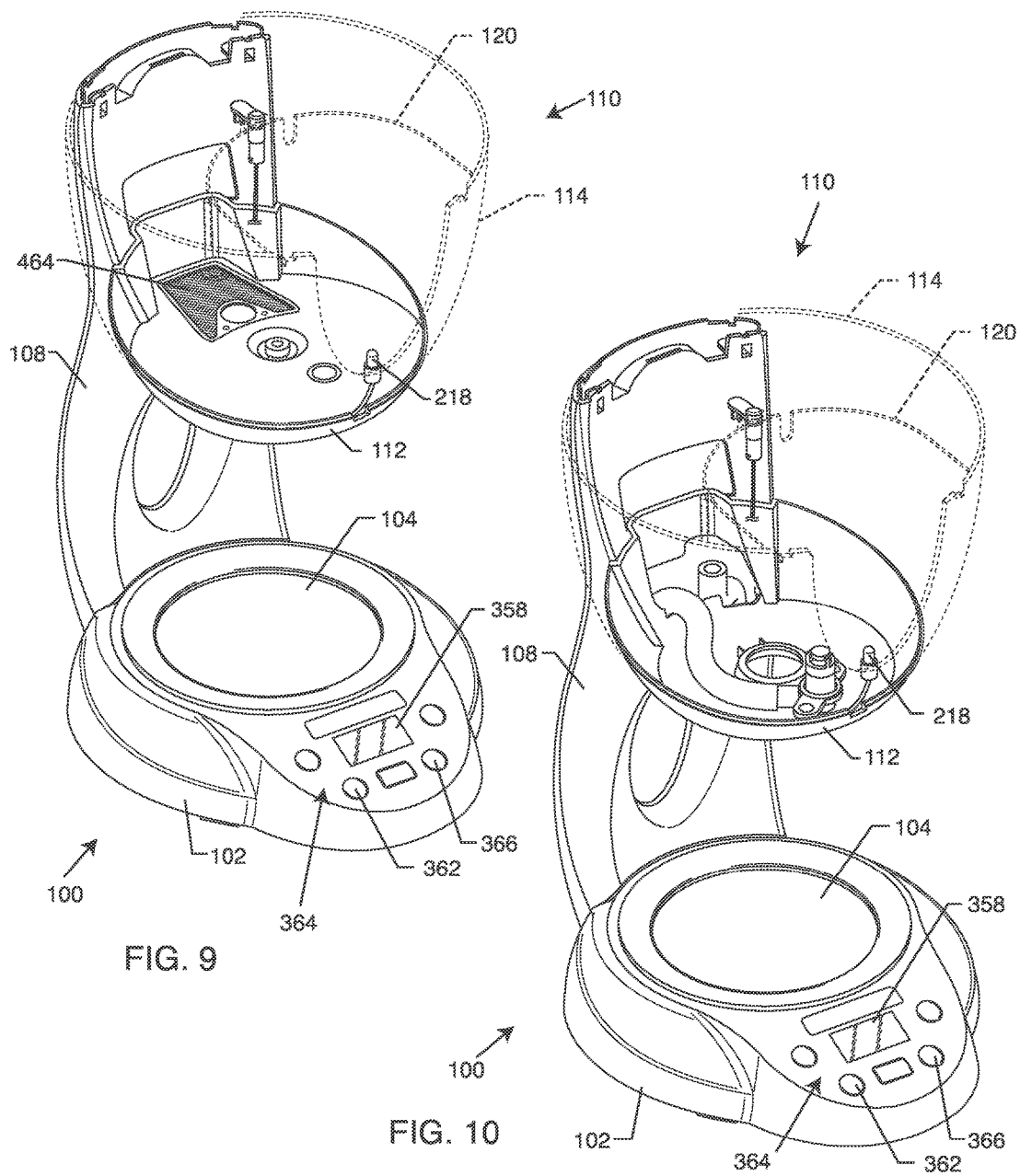

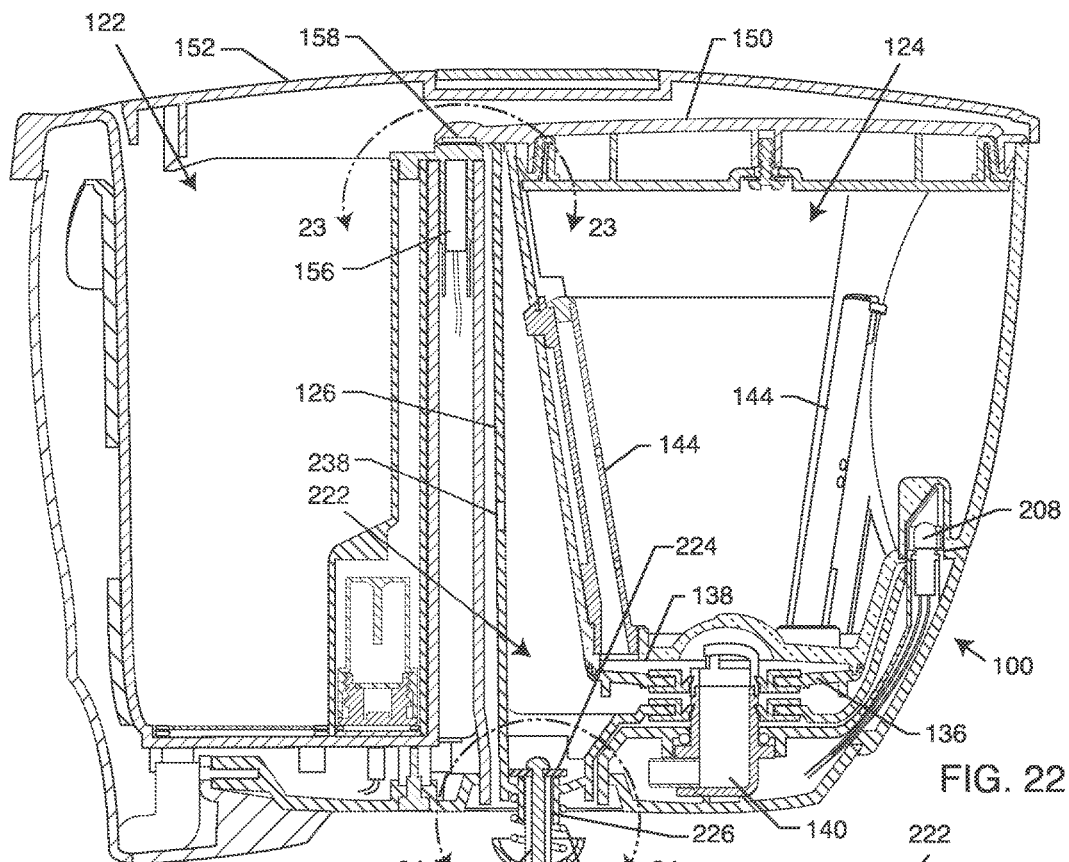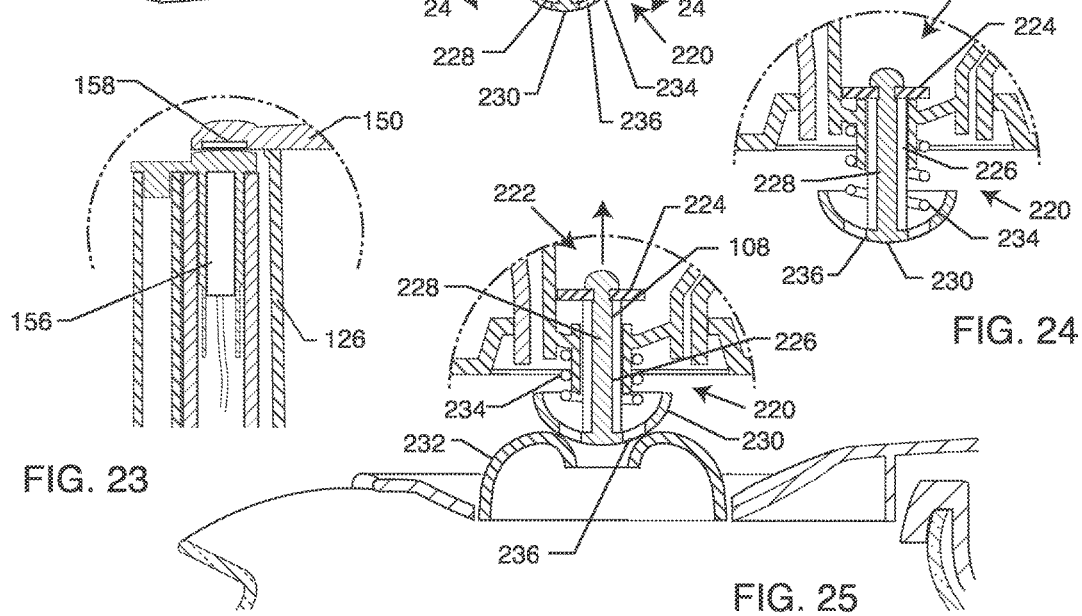

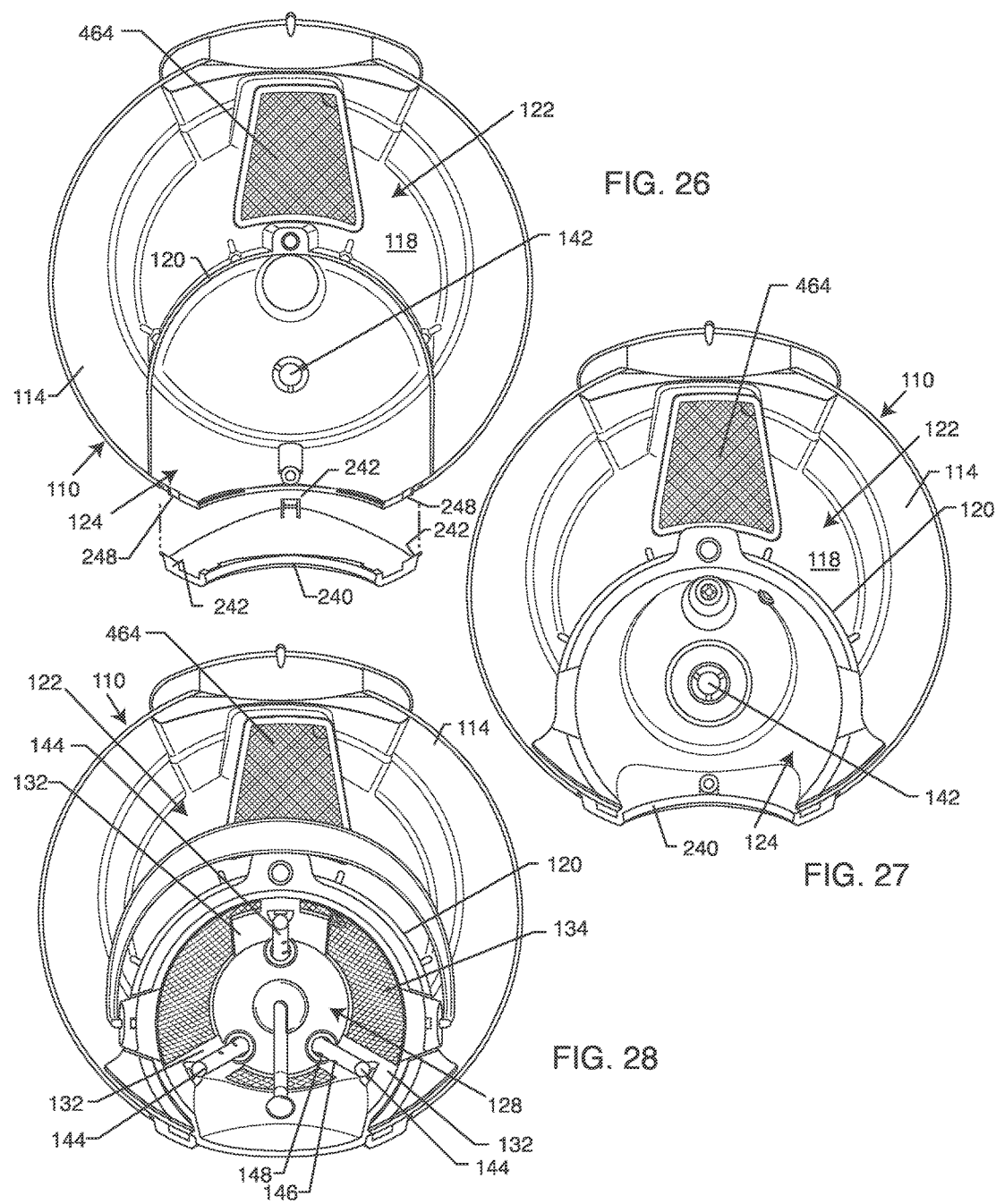

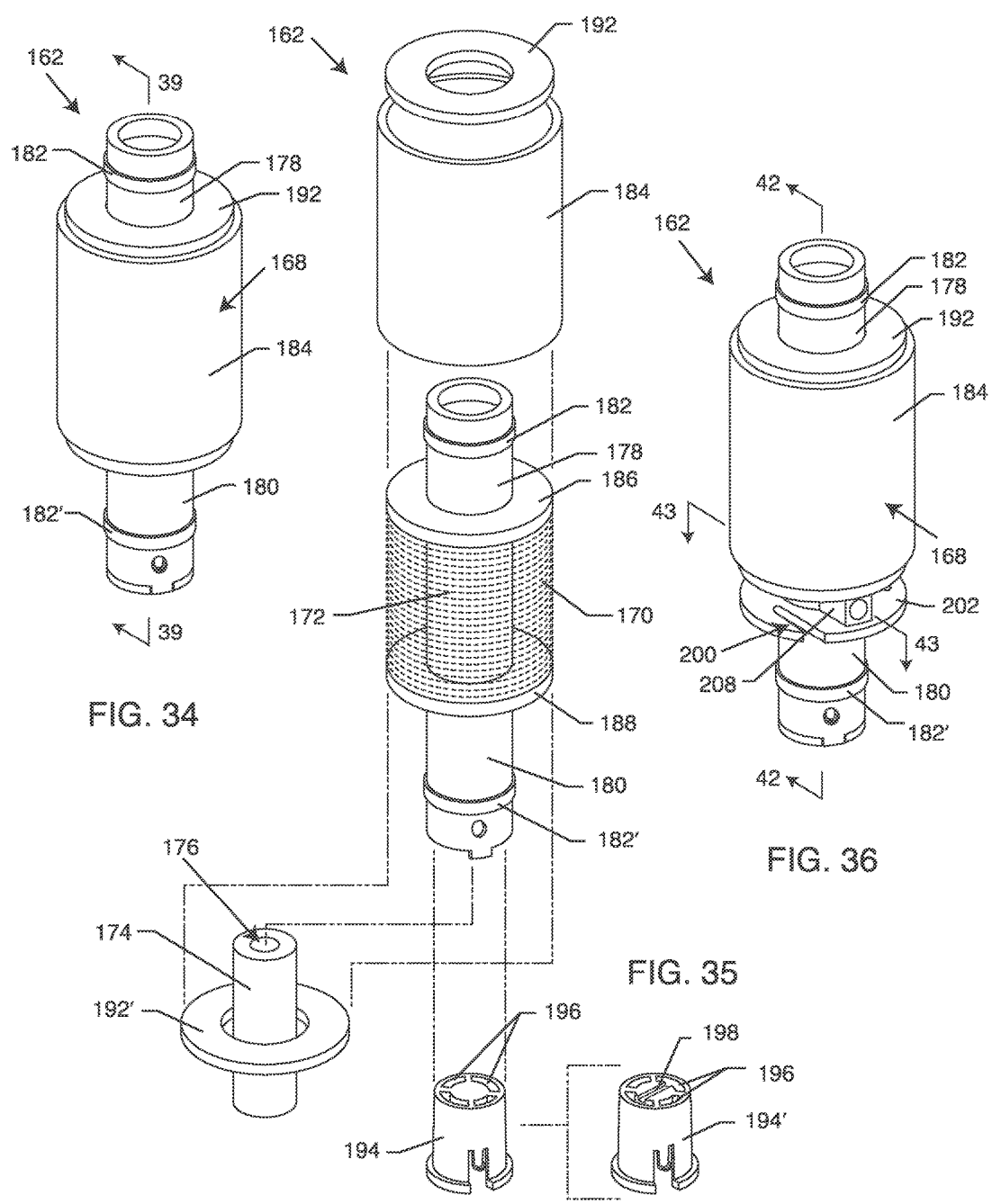

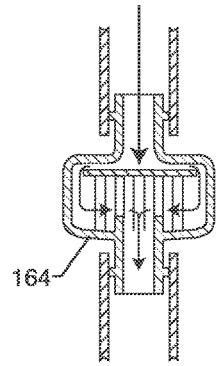
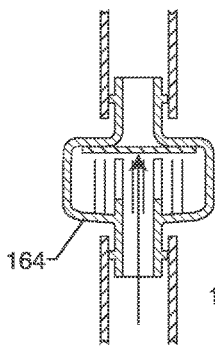
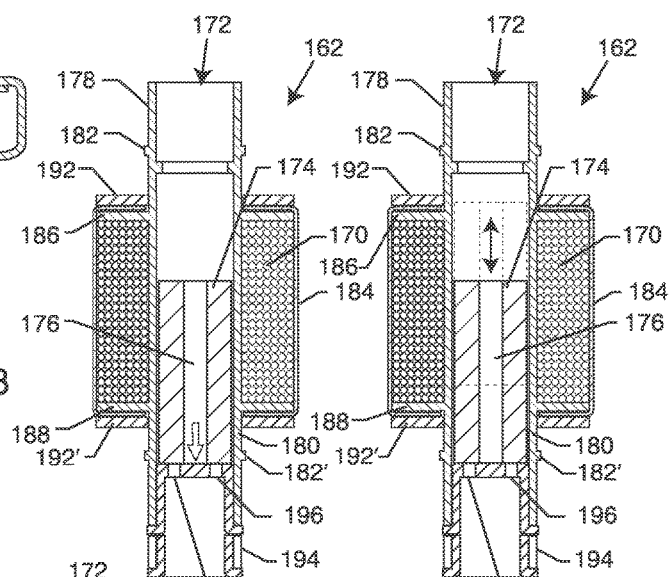
FIG. 37    FIG. 38    FIG. 39    FIG. 40
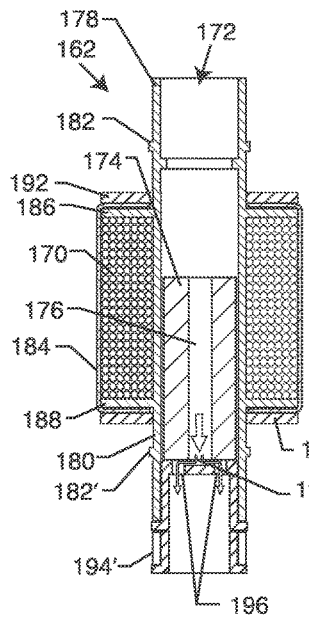
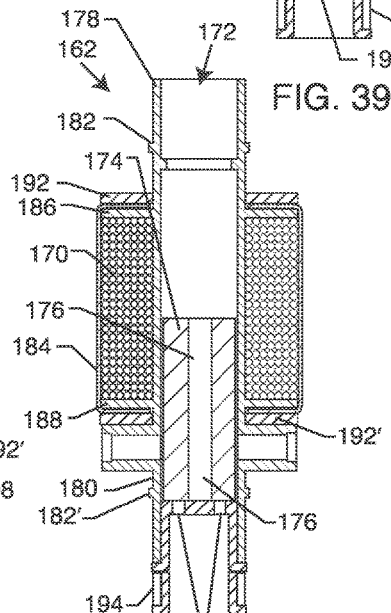
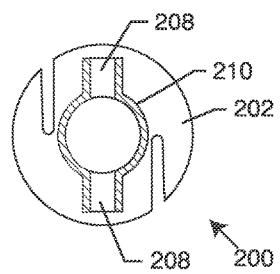
FIG. 41    FIG. 42    FIG. 43

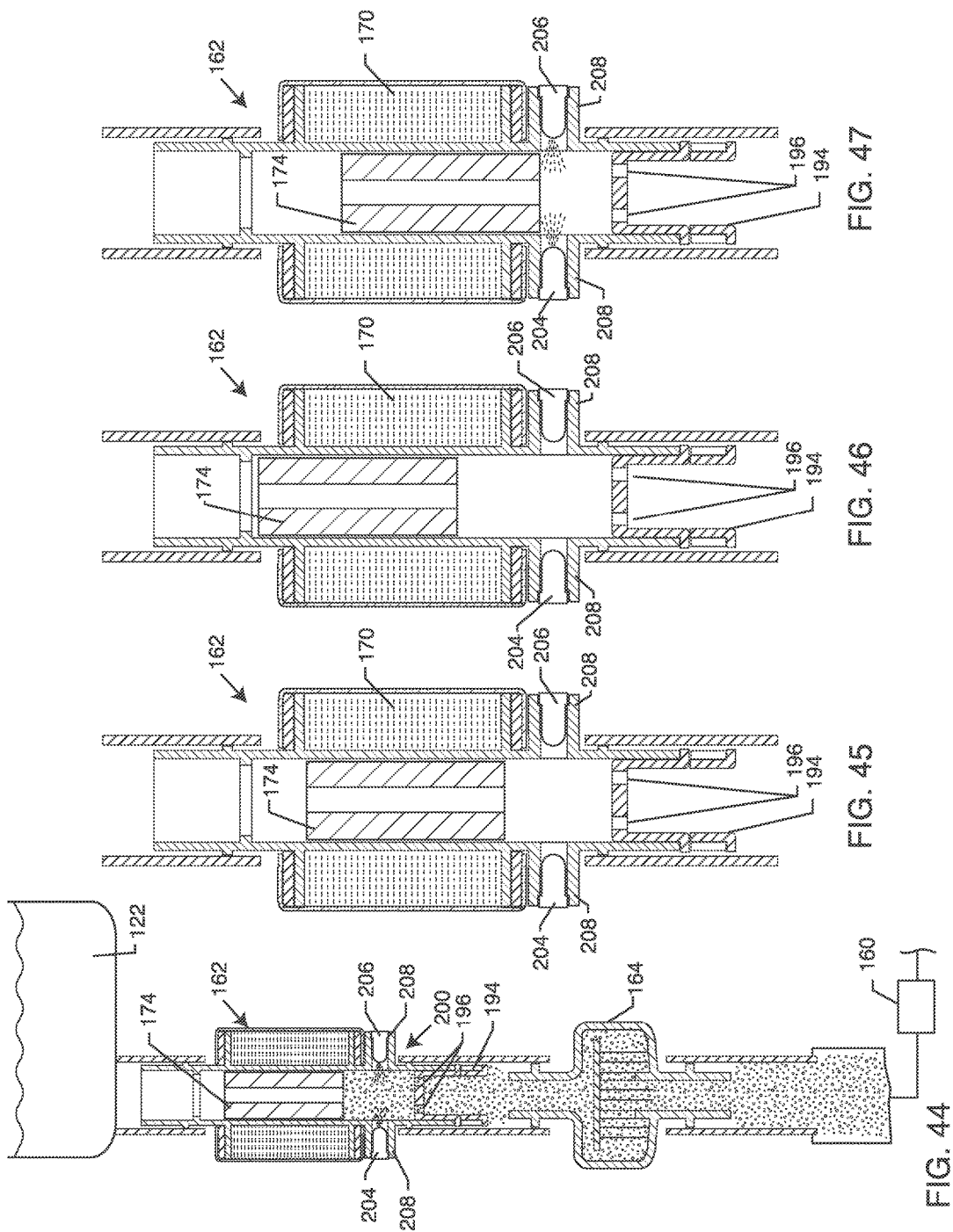

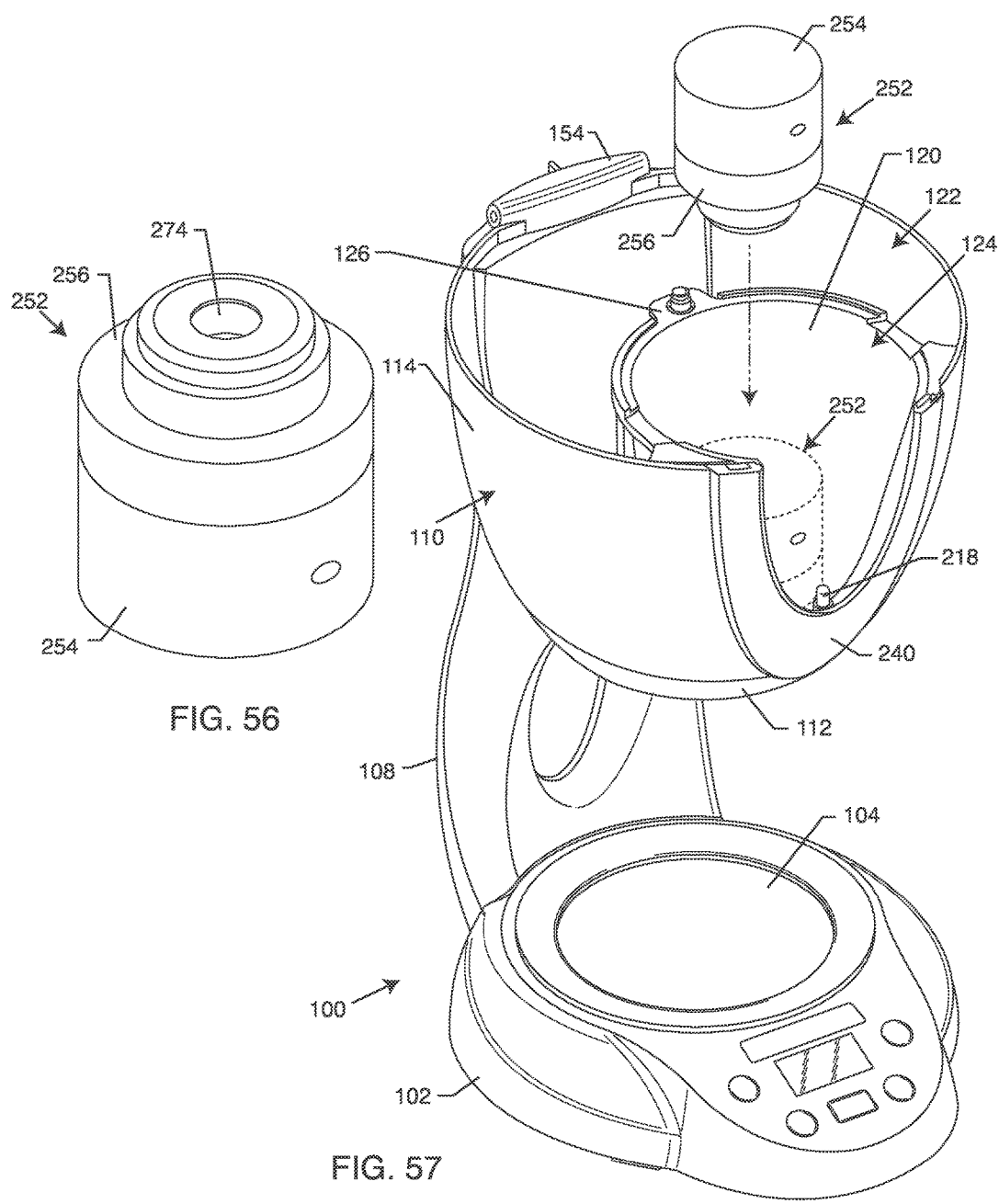

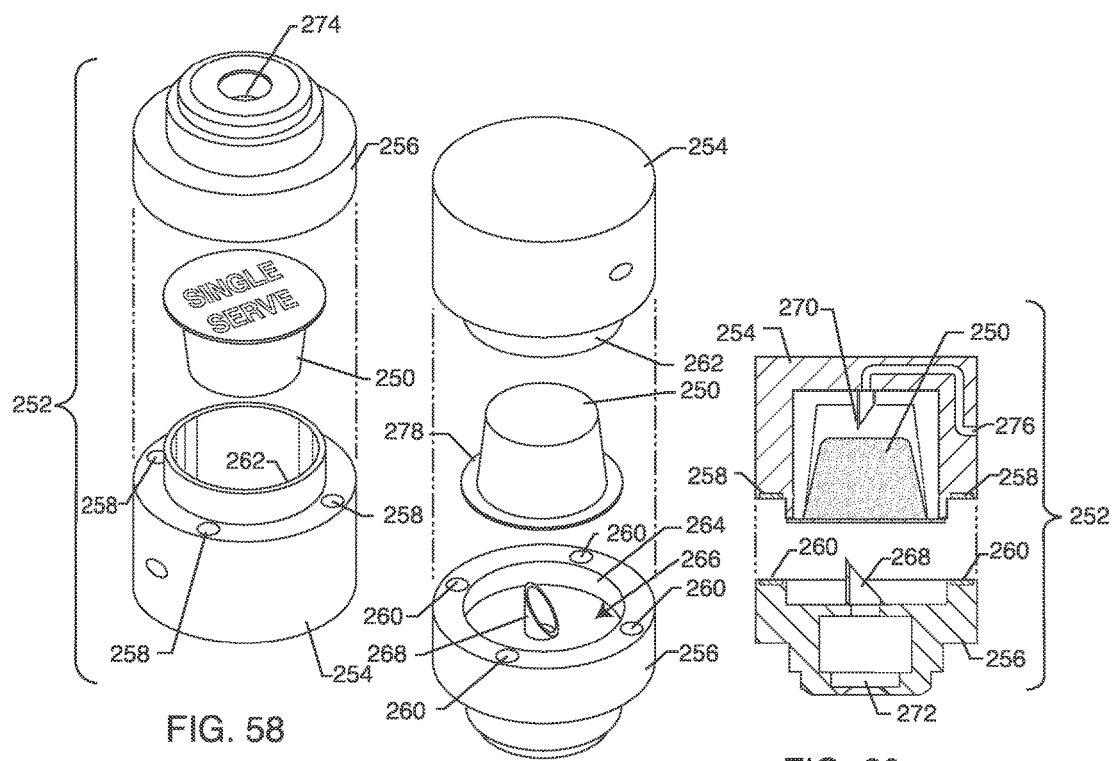
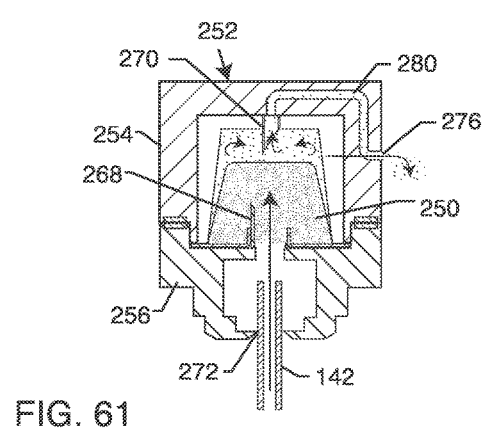

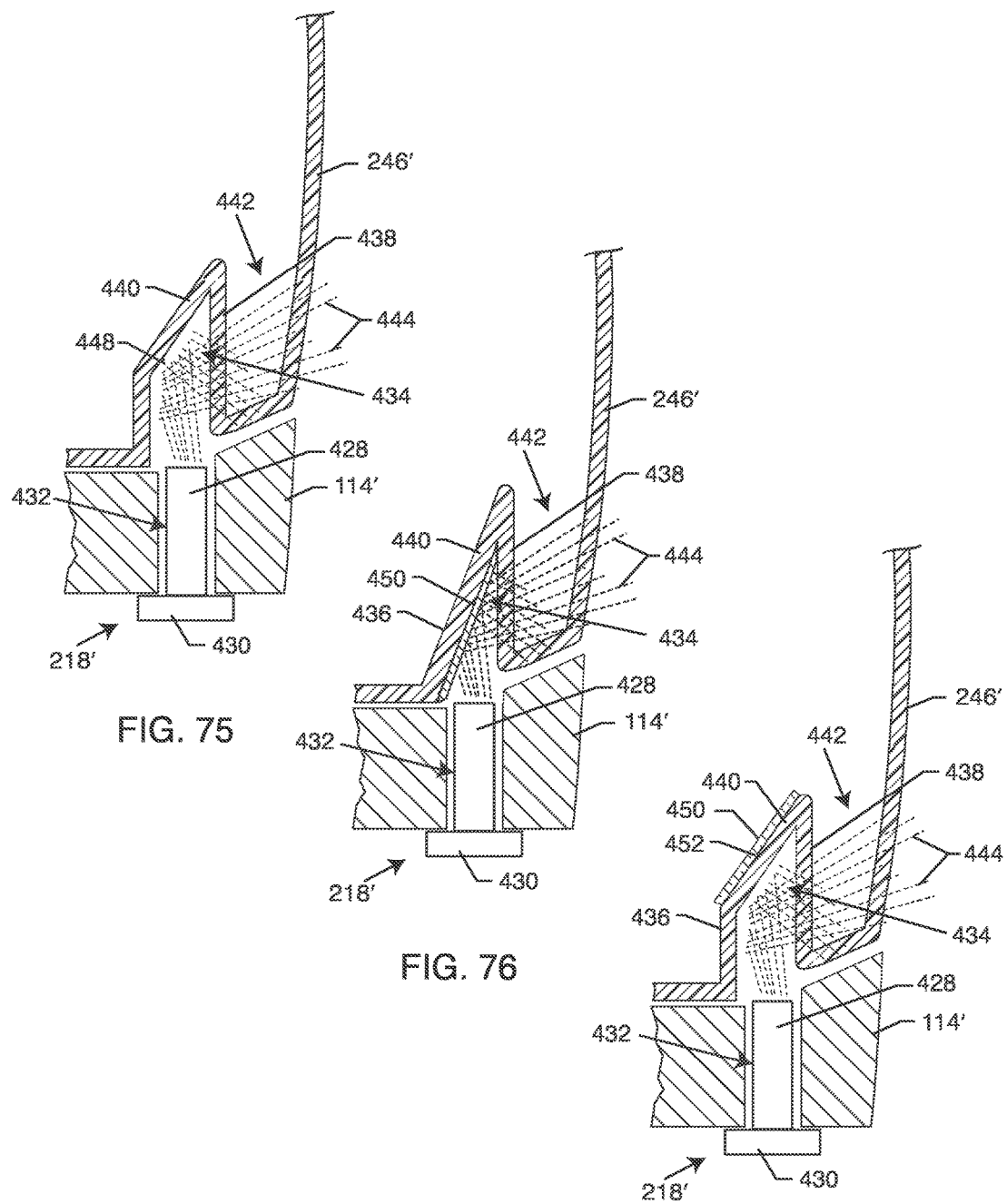

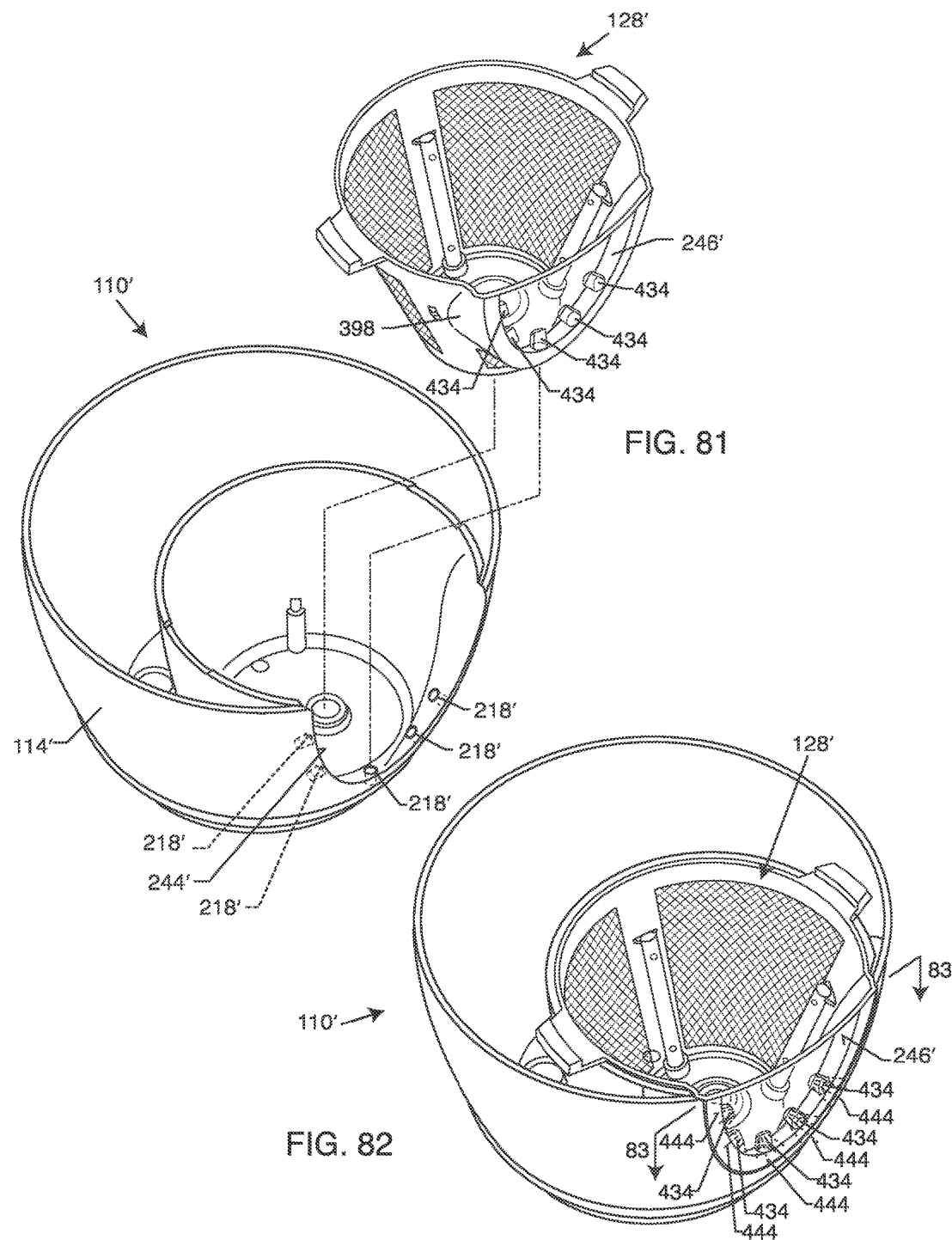

COFFEE BREWER APPARATUSES AND METHODS FOR BREWING BEVERAGES

BACKGROUND OF THE INVENTION

This application is a U.S. national stage application under 35 U.S.C. § 371 of International Application No. PCT/US13/39790, filed May 6, 2013, claiming priority to U.S. Provisional Patent Application No. 61/771,695, filed Mar. 1, 2013, U.S. Provisional Patent Application No. 61/711,085, filed Oct. 8, 2012, and U.S. Provisional Patent Application No. 61/643,290, filed May 6, 2012. Each of the previously mentioned applications and patents are incorporated by reference in its entirety into this application.

The present invention relates to apparatuses and methods for brewing beverages. More particularly, the invention relates to apparatuses and methods for brewing beverages, such as those from loose coffee or tea.

Drip-style coffee brewers are available in a wide range of different configurations and sizes for use in residential or commercial environments to produce brewed coffee. Such coffee brewers commonly include a water reservoir from which a predetermined volume of water is heated and then dispensed downwardly by dripping onto loose coffee grounds contained within an underlying, upwardly open brew basket. The hot water intermixes with the coffee grounds to produce the desired brewed coffee beverage which is drained from the brew basket through a filter element into an underlying coffee pot such as a carafe or decanter. In one common form, the brewer includes a refillable water reservoir from which the water is delivered through a heating element for drip-flow dispensing into the brew basket. In large respect, the brewing process that involves the intermixing of the coffee grounds with the hot water is concealed within an opaque brewer head. In fact, the brewed coffee is oftentimes not visible until dispensed out into the coffee pot.

An optimal water temperature for extracting flavor from coffee grounds for drip-style coffee brewers can be between 195° and 205° Fahrenheit ("F"). Although, many inexpensive drip-style coffee brewers are incapable of achieving such water temperatures. This is because drip-style coffee brewers are often designed to be relatively inexpensive to manufacture. One way to keep the costs of drip-style coffee brewers low is to use relatively inexpensive heating elements and lower cost operating components. While drip-style coffee brewers are available with better performing heating elements and more expensive components, such brewers are typically more expensive. Thus, while inexpensive heaters can keep of the cost of the drip-style coffee brewers relatively inexpensive, the resultant beverage may not achieve optimal water temperatures.

A variety of modified coffee brewers and related brewing processes have been provided in an attempt to enhance the coffee brewing process, including Applicant's own U.S. Pat. Nos. 6,968,775, 7,240,611 and 7,340,991, the contents of each patent being herein incorporated by reference in their entirety. These patents disclose an improved coffee brewer and method for producing brewed coffee with improved flavor. The coffee brewer includes a brew basket having jet ports connected to a source of heated water and positioned to deliver hot water streams into the brew basket at a location beneath the level of coffee grounds contained therein. These hot water streams turbulently agitate and stir the coffee grounds in the brew basket to produce a substantially fluidized bed of water-borne coffee grounds to improve flavor extraction and enhance aroma. This fluidized bed is directed against one or more mesh filter elements forming a wall portion of the brew basket for outward passage of the thus-brewed coffee which is then directed into an underlying coffee put, such as the aforementioned carafe or the like.

In particular, U.S. Pat. No. 7,340,991 ("the '991 patent") further discloses a coffee brewer that includes a brew basket having a frontal side wall that incorporates a substantially transparent window visible from the exterior of the coffee brewer. During a brewing cycle, the spinning fluidized bed of water-borne coffee grounds within the brew basket is thus externally observable. In this respect, a light is provided therein in close proximity to the transparent window, for illuminating the visible brewing process. This light (i.e., an LED or the like) is mounted onto the brewer for slide-fit reception into an upstanding pocket or recess formed in the brew basket generally at a lower margin of the basket window, when the brew basket is mounted onto the brewer. The light bulb extends up into this pocket and is positioned in spaced relation from an inboard side of the basket window, thereby defining a chamber between the light and window through which a portion of the water-borne coffee grounds may circulate during a brew cycle. The light back-illuminates the brewing coffee travelling through this chamber by turning on at the initiation of the brew process, and then turns off at the conclusion thereof.

The brewer shown and described in the '991 patent also includes other deficiencies not addressed by the prior art due to the uniqueness of the brewing process disclosed therein. In particular, brewing temperatures achieved with conventional heating elements were not high enough to properly extract the coffee flavors form the coffee grounds. Furthermore, the brew basket chamber is not sealed, which may facilitate additional heat loss from the brew basket during the brew process. Moreover, increasing the wattage of the standard hot water heater caused a tendency to trip a bimetal safety switch, thereby turning off the heater, which can significantly slow down the brewing process, especially the time it takes to evacuate the remaining brewed beverage in the brew basket at the end of the brew cycle. Increased wattage also reduces hydraulic pumping efficiency by converting a higher percentage of water to steam. Additionally, the front of the brewer in and around the arcuate cutout that permits visual observation of the brewing process can warp during the molding process because the arcuate cutout diminishes the hoop strength inherent in the manufacturing process. The brewer and related process disclosed herein address these issues with earlier brewer designs.

Additionally, the lighting system shown and described in the '991 patent has a number of competing drawbacks. Importantly, the overall luminescence of the light must be capable of illuminating the coffee during the brew cycle. Coffee comes in a variety of thicknesses and certain types of "dark" coffee have a level of opacity that prevents or diminishes illumination therein by standardized lighting elements of the size and shape configured to protrude upwardly for slide fit reception into the corresponding pocket in the brew basket. Insufficient luminescence in this respect defeats the purpose of incorporating a lighting element for purposes of observing the intermixture of the water-borne coffee grounds during the brew cycle. Moreover, upward extension of the bulb into the brew basket recess allows the heated water-borne coffee to flow in and around the recess, to transfer heat to the bulb. On one hand this is preferred from the sense that the light provides direct back-illumination, but the drawback is that the bulb can be exposed to temperatures upwards of 100° Celsius during each brew cycle. Such exposure to heat, even for a few minutes, can adversely affect the operational lifespan and efficiency of the lighting element, and especially LEDs.

In fact, it has been realized that the lighting system disclosed in the '991 patent is particularly ineffective at providing adequate back-illumination of especially dark roasts. That is, the thickness of the brewing coffee occludes transmission of light through the transparent window in the brew basket, despite the presence of the chamber between the upstanding pocket and window. While LEDs are available in a wide variety of sizes and shapes, the "standard" sized LED, having a round cross-section of approximately 3 to 5 mm in diameter, is incapable of providing sufficient back-illumination for an observer to watch the brewing process. These standard-sized LEDs are ideal for the size and shape desired to slidably fit into the upstanding pocket, but the drawback is that these LEDs are only cooled by copper wires extending out from the LED housing. Increasing luminescence of this LED requires increasing the current, which naturally results in increased heat and higher operating temperatures. Increasing heat in this respect shortens the lifespan of the LED and increases the risk of premature burnout. The size and shape of the upstanding pocket further prohibits incorporation of a heat sink or the like to function to dissipate heat. In this respect, LED operational lifetime falls sharply with rising current as increased heat across the P-N junction and exposure to heated water-borne coffee during the brewing process increases the risk of premature failure. As a result, and without more, it is not possible to increase the luminescence of such a standard-size LED to adequately illuminate "dark" coffee during the brew cycle.

Accordingly, there exists a significant need in the art for improvements in and to conventional coffee brewers, and specifically the types of coffee brewers generally disclosed in the '991 patent and its progeny, including a need for providing an improved brew basket ventilation system, an overflow avoidance system, methods and systems for efficiently and timely evacuating brewed coffee in the brew basket after the water reservoir is substantially or completely empty, methods and systems for regulating steam and water brewing cycles using a phase control valve, solenoid or mechanical check valve, monitoring and measuring in real-time the water level in the reservoir and activating a down cycle after a threshold low or no water level is identified by a mechanical or electrical sensor, integration of a real-time voltage sensor and related control circuit that regulate the duty cycle the heating element to prevent inadvertent or premature shutoff conditions, and improvements in the related lighting system, namely for achieving significantly enhanced and fuller illumination of the intermixing of heated water and coffee grounds during a brew cycle, without adversely impacting the lifetime operation of the LED or other comparable lighting light source. The present invention fulfills these needs and provides further related advantages.

SUMMARY OF THE INVENTION

In one embodiment, the coffee brewer disclosed herein includes a brewer head having a cavity configured for nested reception of a brew basket that intermixes hot water and coffee during a brew cycle. The brewer head also includes at least one water inflow port for introducing hot water into the brew basket for purposes of contacting and brewing coffee, tea or the like. A heating unit disposed upstream from the water inflow port produces the hot water stream preferably from a source of purified or treated drinking water, such as from an integrated water reservoir, before delivery to the brew basket. Furthermore, the brewer also includes a phase control valve that regulates the supply of unheated water to the heating unit. More specifically, the phase control valve alternates between a first position permitting a substantial full flow of unheated water to the heating unit during a water brew cycle and a second position substantially restricting full flow of unheated water to the heating unit during a steam brew cycle.

Preferably, the phase control valve includes a solenoid having a central shaft with a hollow plunger movable therein and selectively positionable within a magnetic field. The phase control valve may further include a valve seat having at least one flow port therein such that the material thickness of the plunger substantially occludes water flow through the flow port when in a first position and substantially permits water flow through the flow port when in a second position. In an alternative embodiment, the valve seat may include a bypass channel fluidly coupled to the flow port to permit metered flow of water through the solenoid valve when the plunger is in the first position occluding flow though said flow port. The first position preferably corresponds with the steam brew cycle and the second position preferably corresponds with the water brew cycle.

Additionally, the coffee brewer disclosed above may include a control circuit that measures current changes in the magnetic field of the coil through movement of the plunger in the central shaft during the water brew cycle. A check valve fluidly coupled between the phase control valve and the heating unit is positioned to prevent backflow of heated water into the phase control valve during the water brew or the steam brew cycles. A water reservoir having an outlet port with a filter screen thereover retains relatively unheated water and may be fluidly coupled upstream from the phase control valve. In this respect, the phase control valve can regulate delivery of unheated water from the water reservoir to the heating unit during the water and steam brew cycles.

In another aspect of the coffee brewer, an optical sensor having an emitter that selectively generates a beam receptive by a detector may be positioned relative to the phase control valve to monitor the flow of unheated water through the phase control valve during the water brew cycle. In this respect, such water flow may displace the plunger to a position that disrupts communication of the beam between the emitter and the detector. In this condition, the brewer circuitry identifies the break in the beam, which corresponds with unheated water flowing through the phase control valve. When the phase control valve is in an open position and the plunger fails to break the beam between the emitter and detector, the brewer circuitry identifies a low or no water state in the water reservoir and may switch programs to an end cycle. Alternatively, the brewer may include an optical sensor having an emitter that selectively generates a beam receptive by a detector and positioned relative to the phase control valve to optically monitor the flow of turbulent unheated water through the phase control valve. In this respect, the flow of unheated water may be sufficient to interrupt communication of the beam between the emitter and said detector to signal unheated water flow therethrough.

The brewer may also include a light synchronized with an audible tone and the evacuation of brewed beverage from the brew basket to signal the end of the brewing process. Of note, during the brewing process, the heating unit may include multiple heating units and substantially heat the water therein, for later injection as hot water or steam into the brew basket. The phase control valve is positioned in fluid communication between the reservoir and the heating unit to control fluid flow therebetween, which may be based on electrical control signals from a control circuit. For example, a brewer controller may be configured to send electrical control signals to the phase control valve to move the plunger between the first and second positions multiple times during the brew cycle, to facilitate the water and steam brewing cycles. The controller is preferably coupled to a memory chip that stores program information therein. The controller accesses the program information from the memory chip and may send electrical control signals to the phase control valve according to the program. To this end, the memory chip may include a plurality of manually or automatically selectable brewing programs. Lastly, a TRIAC may regulate the duty cycle of the heating element in real-time to control the amount of heat imparted to the relatively unheated water flowing through the heating unit at any given point in time.

In another embodiment, the coffee brewer disclosed includes a brewer head having a cavity configured for nested reception of a brew basket that intermixes hot water and coffee during a brew cycle. At least one water inflow port in the brewer head introduces hot water or steam into the brew basket for purposes of brewing coffee, tea, or the like. A heater disposed upstream from the water inflow port produces hot water and/or steam before delivery to the brew basket. The water delivered to the heater is controlled by a phase control valve that includes a solenoid valve having a central shaft with a hollow plunger movable therein and selectively positionable within a magnetic field selectively generated by a coil. This allows the solenoid valve to regulate the supply of unheated water to the heating unit by alternating the positioning of the hollow plunger between a first position permitting a substantial full flow of unheated water through the hollow interior of the plunger and to the heater during a water brew cycle and a second position substantially restricting full flow of unheated water to the heater during a steam brew cycle. In particular, a control circuit may measure current changes in the magnetic field through movement of the plunger in the central shaft during the water brew cycle to determine whether a water reservoir is retaining relatively unheated water upstream from the phase control valve.

An additional feature of this alternative coffee brewer includes a phase control valve having a valve seat with at least one flow port therein such that the plunger may substantially occlude water flow through the flow port when in a first position and substantially permit water flow through the flow port when in a second position. Here, the first position preferably corresponds with the steam brew cycle and the second position preferably corresponds with the water brew cycle. In this respect, the valve seat may further include a bypass channel fluidly coupled to the flow port to permit metered flow of water through the solenoid valve when the plunger is in the first position otherwise occluding flow though the flow port. Similarly, the alternative brewer may include a check valve fluidly coupled between the phase control valve and the heater and positioned to prevent backflow of heated water into the phase control valve during the water brew or steam brew cycles.

An optical sensor having an emitter that selectively generates a beam receptive by a detector may be positioned relative to the phase control valve such that the flow of unheated water through the phase control valve during the water brew cycle displaces the plunger to disrupt communication of the beam between the emitter and the detector, thereby signaling that the reservoir includes water. Alternatively, when the beam is no longer disrupted, the reservoir is in a low or empty state. In this respect, the water reservoir preferably includes an outlet port having a filter screen to prevent debris from entering the brewer tubing. Alternatively, the optical sensor having the emitter that selectively generates a beam receptive by the detector may be positioned relative to the phase control valve such that the turbulent flow of unheated water through the phase control valve during the brew cycle disrupts communication of the beam between the emitter and the detector. Again, as long as the beam is interrupted during the water brew cycle, the reservoir includes water. Once the beam is no longer interrupted, due to the non-flow of unheated water therethrough, the brewer circuitry can identify that the reservoir is either in a low water or no water state or condition. At the end of the brewing process, a light synchronized with an audible tone and evacuation of the brew basket may provide visual and audible notification that brewing has completed. At this stage, the fluidic pressure within the brew basket may dissipate as there is no more heated water and/or steam to inject therein from the heating unit.

In another aspect of the coffee brewer disclosed herein, the reservoir may include an optical water level sensor. This embodiment includes a brewer head having a cavity configured for nested reception of a brew basket that intermixes hot water and coffee during a brew cycle. At least one water inflow port in the brewer head introduces hot water into the brew basket for contacting the coffee to produce brewed coffee. A heating unit (or multiple heating units) disposed upstream from the water inflow port produces hot water, wet steam or steam. Moreover, a phase control valve regulates the supply of unheated water to the heating unit. More specifically, the phase control valve alternates between a first position permitting a substantial full flow of unheated water to the heating unit during a water brew cycle and a second position substantially restricting full flow of unheated water to the heating unit during a steam brew cycle. This embodiment may further include a water reservoir that retains relatively unheated water fluidly coupled upstream from the phase control valve. In this respect, the phase control valve can regulate delivery of the unheated water from the water reservoir to the heating unit during the water and steam brew cycles by selectively occluding or permitting water flow therethrough. To this end, an optical sensor may monitor the flow of water through the phase control valve. In this respect, the optical sensor preferably includes an emitter that selectively generates a beam receptive by a detector, wherein the flow of unheated water through the phase control valve during the water brew cycle displaces the plunger downwardly to disrupt communication of the beam between the emitter and the detector. A controller coupled to the optical sensor may be configured to send electrical control signals to the phase control valve to move the phase control valve between the first and second positions multiple times during the brew cycle, and depending on the conditions sensed by the optical sensor.

More specifically, the phase control valve preferably includes a solenoid valve having a central shaft with a hollow plunger movable therein and selectively positionable within a magnetic field selectively created by a coil coupled to an electrical source. A valve seat having at least one flow port permits the plunger to substantially occlude water flow therethrough when in a first seated position and substantially permit water flow therethrough when in a second unseated position. To this end, the first position corresponds with the steam brew cycle and the second position corresponds with the water brew cycle. A control circuit may measure current changes in the magnetic field through movement of the plunger in the central shaft during the water brew cycle. A water reservoir retaining relatively unheated water is fluidly coupled upstream from the phase control valve, which permits the phase control valve to regulate delivery of unheated water from the water reservoir to the heating unit during the water and steam brew cycles.

A check valve fluidly coupled between the phase control valve and the heating unit is positioned to prevent backflow of heated water into the phase control valve during the water brew or the steam brew cycles and an optical sensor having an emitter that selectively generates a beam receptive by a detector is positioned relative to the phase control valve such that the turbulent flow of unheated water through the phase control valve during the water brew cycle disrupts communication of the beam between the emitter and the detector. Furthermore, the valve seat may include a bypass channel fluidly coupled to the flow port to permit metered flow of water through the solenoid valve when the plunger is in the first position occluding flow though the flow port.

The brewer may further include a TRIAC for regulating a duty of the heating element in real-time, wherein the phase control valve is positioned in fluid communication between a reservoir and the heating unit and may be actuated based upon electrical control signals from a control circuit. The control circuit preferably includes a memory chip that stores a plurality of manually or automatically selectable brewing programs. The stored programs are accessible by the control circuit for causing the control circuit to send electrical control signals to the phase control valve in accordance with instructions in the program. Lastly, a light synchronized with an audible tone and evacuation of the brew basket may signal an end to the brewing process.

In another alternative embodiment of the coffee brewer disclosed herein, a brewer head having a cavity configured for nested reception of a brew basket that intermixes hot water and coffee during a brew cycle includes at least one water inflow port for introducing at least one hot water stream into the brew basket. A heating unit disposed upstream from the water inflow port produces hot water before delivery to the brew basket. Additionally, a phase control valve for regulating the supply of unheated water to the heating unit alternates between a first position permitting a substantial full flow of unheated water to the heating unit during a water brew cycle and a second position substantially restricting full flow of unheated water to the heating unit during a steam brew cycle.

The phase control valve of this embodiment includes a solenoid valve having a central shaft with a hollow plunger movable therein and selectively positionable within a magnetic field selectively generated by a coil. The phase control valve also includes a valve seat having at least one flow port therein, wherein the plunger substantially occludes water flow through the flow port in a first position corresponding with the steam brew cycle and substantially permits water flow through the flow port in a second position corresponding with the water brew cycle. The valve seat may include a bypass channel fluidly coupled to the flow port to permit metered flow of water through the solenoid valve when the plunger is in the first position occluding flow though the flow port.

Additionally, the brewer further includes a TRIAC coupled to a controller for regulating the duty cycle of the heating element in real time. The controller includes a memory chip for storing program information that may be manually or automatically selectable before initiation of the brewing process, during the brewing process, or near the end of the brewing process. The programs may be stored in a non-volatile memory module for later accessibility by the controller, which operates the electrical control signals directed to the phase control valve.

Additionally, the controller may measure current changes in the magnetic field through movement of the plunger in the central shaft during the water brew cycle. The brewer may also include a check valve fluidly coupled between the phase control valve and the heating unit and be positioned to prevent backflow of heated water into the phase control valve during the water brew or the steam brew cycles. A water reservoir may retain relatively unheated water fluidly coupled upstream from the phase control valve such that the phase control valve can regulate delivery of unheated water from the water reservoir to the heating unit during the water and steam brew cycles. Lastly, the controller may be configured to send electrical control signals to the phase control valve to move the phase control valve between the first and second positions multiple times during the brew cycle.

Another alternative embodiment of the coffee brewer disclosed herein may incorporate the use of a reinforcement badge or band. Here, the coffee brewer preferably includes a brew basket for intermixing hot water and coffee during a brew cycle. The brew basket preferably also includes a substantially transparent frontal window formed from an outwardly protruding shoulder. A brewer head having a brew basket cavity configure for nested reception of the brew basket includes a cutout shaped for seated reception of the shoulder to externally visibly present the transparent frontal window during the brew cycle. At least one water inflow port in the brewer head introduces at least one hot water stream into the brew basket for intermixing hot water and coffee therein. The intermixing water and coffee is externally visible through the transparent frontal window. To this end, a badge panel configured for attachment about the periphery of the cut-out is of a shape and size to provide reinforcement to the brewer head and to prevent deformation about the otherwise structurally weakened cutout while simultaneously permitting selective nested reception of the brew basket in the brewer head.

Further to this embodiment, the shoulder may include a u-shaped shoulder and the cutout may include an arcuate cutout, and the badge panel preferably includes a plurality of detents configured to selectively engage respective mating detents formed along the arcuate cutout of the brewer head.

Another alternative embodiment of the coffee brewer disclosed herein may incorporate the use of a brew basket lid having a ventilation system. In this respect, the brewer includes a brewer head having a cavity configured for nested reception of a brew basket that intermixes hot water and coffee during a brew cycle. At least one water inflow port in the brewer head introduces at least one hot water stream into the brew basket for contacting the coffee to produce brewed coffee. The brew basket includes an inlet port positioned to couple with the water inflow port and an outlet port for discharging substantially brewed beverage, when in nested reception with the brewer head. Furthermore, the brew basket includes a lid including a sealing ring configured for substantial airtight and watertight engagement along an upper rim of the brew basket. Although, the brew basket lid may permit selective release of pressure from the brew basket during the brew cycle through at least one vent.

Further to this embodiment, the brew basket lid preferably includes a clamshell having an upper layer and a lower layer with the sealing ring sandwiched therebetween. To this end, the vent is formed by respectively aligning cutouts in the lower layer, the upper layer and the sealing ring. The cutouts effectively expose an interior of the brew basket to ambient air pressure for purposes of selective release of heated air or steam therein. Moreover, the brew basket lid and the brew basket may be mechanically secured together by use of a lid magnet carried by a radially outwardly extending flange and a corresponding brew basket magnet seated within a portion of the brew basket. Alternatively, such mechanical securement can be accomplished through use of a hinged clamp pivotable about a radially outwardly extending flange of the brew basket lid that selectively engages a recessed shoulder formed from a portion of the brew basket. In this respect, the hinged clamp sandwiches respective portions of the brew basket lid and the brew basket for selective mechanical retainment.

In another aspect of the brewer disclosed herein, the brew basket housing may include a beverage overflow management system. In this respect, the brewer includes a head having an upwardly open cavity defined by an upstanding brewer head wall having a cutout therein for presenting a substantially transparent frontal window formed from an outwardly protruding shoulder of a brew basket. The brewer head also includes a water inflow port for receiving at least one hot water stream used for brewing a beverage and an outlet port for dispensing brewed beverage. A brew basket housing is configured for selective slide-in reception within the cavity and over the water inflow port. An integrated stopper valve regulates dispensing brewed beverage through the outlet port in the brewer head. The brew basket is configured for selective slide-in reception with the brew basket housing and couples to the water inflow port for receiving and intermixing hot water with coffee during the brew cycle.

The brew basket housing overflow prevention system includes a vent port positioned at a vertical position relatively lower than the cutout for draining brewed beverage out from a brew basket housing chamber to the upwardly open cavity when the stopper valve is in a closed position during the brew cycle, and the brewed beverage exceeds a predetermined amount of retainable in the brewer head. To this end, the vent port is preferably coupled to a brew basket evacuation chamber and to the outlet port.

In another embodiment, the brewer includes a light sensor that includes a light emitter having a bulb for emitting light into a fluid retaining reservoir and a light detector positioned beneath and in general vertical alignment with the light emitter for detecting light reflected back on to the light detector. To this end, a control circuit electrically coupled to the light emitter and the light detector is configured to read a first signal from the light emitter corresponding to a value of emitted light and a second signal from the detector corresponding to a value of received light. The control circuit can then identify a fluid level in the reservoir by measuring a ratio of the first signal relative to said second signal. Preferably, the first and second signals include a first and second voltage.

Furthermore, the light sensor may include an outer annular housing supporting the light emitter in an elevated position, an inner annular sleeve supporting the light detector, and a bottom closure sandwiching the light emitter and the light detector into a common housing with the outer annular housing and the inner annular sleeve. The annular housing and the inner sleeve are preferably made from a transparent material to allow reflected light to pass back to the light detector. Furthermore, the light sensor may also include an o-ring providing a liquid tight seal between the outer annular sleeve and corresponding outwardly protruding bulb and reservoir. The outer annular housing and the inner annular sleeve may also include slotted openings sized to retain wiring coupling the light emitter and the light detector to the control circuit. To this end, the bottom closure may also include at least one trough carrying at least one wire. Preferably, the light emitter emits visible light and the light detector includes either a photo detector or an optical detector.

In an alternative embodiment, the light sensor includes a transparent outer annular housing supporting a light emitter having a bulb for emitting light into a fluid retaining reservoir, a transparent inner annular sleeve supporting a light detector positioned beneath and in general vertical alignment with the light emitter for detecting light reflected back on to the light detector, a bottom closure sandwiching the light emitter and the light detector into a common housing with the outer annular housing and the inner annular sleeve, and a control circuit electrically coupled to the light emitter and the light detector and configured to read a first voltage signal from the light emitter corresponding to a value of emitted light and a second voltage signal from the detector corresponding to a value of received light, the control circuit identifying a fluid level in the reservoir by measuring a ratio of the first voltage signal relative to the second voltage signal.

This embodiment may also include an o-ring providing a liquid tight seal between the outer annular sleeve and the outwardly protruding bulb and reservoir. Moreover, the bottom closure may include at least one trough carrying at least one wire and the light emitter preferably emits visible light. Finally, the outer annular housing and the inner annular sleeve may include slotted openings sized to retain wiring coupling the light emitter and the light detector to the control circuit, wherein the light detector may include a photo detector or an optical detector.

The coffee brewer described herein may also be used with a pre-packaged single serving of coffee or tea. In this respect, the coffee brewer includes a brewer head having an upwardly open cavity, an upstanding feed port for delivering at least one hot water stream used for brewing a beverage, and an outlet port for dispensing brewed beverage. A brew basket housing is configured for selective slide-in reception within the cavity and over the feed port, and includes a stopper valve for regulating dispensing brewed beverage through the outlet port. A single serve adapter is configured for placement in the brew basket housing and includes a lower unit having an aperture for selective slide fit engagement with the feed port of the brewer head, and an upper unit having a radial outflow port for dispensing brewed beverage into the brew basket housing. Moreover, the lower and upper units include respective hollow barbs for puncturing respective top and bottom surfaces of a single serve container to permit injection of the hot water stream therein for flow-through brewing.

Preferably, the lower and upper units include a set of complementary inwardly facing magnets that secure the lower and upper units together in a manner to substantially resist axial forces from the feed port as a result of hot water being injected therein. The adapter may further connect to the brewer through use of the lower unit having a set of outwardly facing external magnets that matingly engage magnets in the brew basket housing, or by threadingly engaging the lower unit to the feed port. Moreover, the upper unit includes a flange for slide fit reception with a mating shoulder of the lower unit, the flange and the mating shoulder cooperate to sandwich a rim of a single serving cup, thereby locking the single serve container therein during a brew cycle.

In another embodiment of the coffee brewer disclosed herein, the water reservoir includes a float-based water level sensor. The brewer, in one embodiment, includes a brewer head having an upwardly open cavity, a feed port for delivering at least one hot water stream used for brewing a beverage, and an outlet port for dispensing brewed beverage. A brew basket housing configured for selective slide-in reception within the cavity and over the feed port includes a stopper valve for regulating dispensing brewed beverage through the outlet port. A brew basket configured for nested reception within the upwardly open cavity is fluidly coupled to the hot water stream for intermixing hot water and coffee during a brew cycle. Furthermore, the brewer includes a reservoir for retaining a quantity of unheated water, a heating unit disposed downstream from the reservoir for producing the hot water stream before delivery to the brew basket, and a water level sensor including a buoyant float carried within a float chamber fluidly coupled with the reservoir. The buoyant float is movable within the float chamber between a first position seated on a base of the reservoir and activating a sensor when the reservoir is in a low or no water condition, and a second positioned unseated from the base, wherein the sensor is deactivated, thereby indicating the reservoir includes at least a threshold quantity of fluid.

The water level sensor preferably further includes a relatively narrow vertical vent shaft exposed to ambient air pressure and at least one securement leg offsetting the float housing from the base a distance to permit inflow of fluid in from the reservoir. The sensor preferably underlies the buoyant float, which includes a metallic disk that activates the sensor (e.g., a reed switch). The water level sensor may further include a stud slidably engageable with a retaining rib formed from the brewer head, the stud being coupled to an outwardly extending retaining arm configured for slide fit engagement with the vent to hold the water level sensor housing in place.

In another embodiment incorporating the aforementioned water level sensor, the coffee brewer includes a brewer head having an upwardly open cavity, a feed port for delivering at least one hot water stream used for brewing a beverage, and an outlet port for dispensing brewed beverage. A brew basket housing configured for selective slide-in reception within the cavity and over the feed port includes a stopper valve for regulating dispensing brewed beverage through the outlet port. A brew basket is configured for nested reception within the upwardly open cavity and fluidly coupled to the hot water stream for intermixing hot water and coffee during a brew cycle. Moreover, the brewer includes a reservoir for retaining a quantity of unheated water, a heating unit disposed downstream from the reservoir for producing the hot water stream before delivery to the brew basket, and a water level sensor including a buoyant float carried within a float chamber fluidly coupled with the reservoir and having a relatively narrow vertical vent shaft exposed to ambient air pressure extending upwardly therefrom. The buoyant float further includes a metallic disk movable within the float chamber between a first position seated on a base of the reservoir and activating an underlying reed switch when the reservoir is in a low or no water condition, and a second positioned unseated from the base, wherein the reed switch is deactivated, thereby indicating the reservoir includes at least a threshold quantity of fluid. The water level sensor may include at least one securement leg offsetting the float housing from the base a distance to permit inflow of fluid in from the reservoir, and a stud slidably engaged with a retaining rib formed from the brewer head, wherein the stud couples to an outwardly extending retaining arm configured for slide fit engagement with the vent to secure the float sensor within the reservoir.

Moreover, the improved coffee brewer lighting system disclosed herein includes a brewer head having a cavity configured for nested reception of a brew basket that turbulently mixes coffee and hot water during a brew cycle. The brew basket includes a substantially transparent frontal window extending out from a portion thereof and externally visible when the brew basket is in nested reception with the brewer head cavity. The brewer head includes a light source disposed therein having a bulb in non-engaged relation with the nested brew basket. The light source is positioned to channel light toward a light receiving chamber formed from a bottom portion of the frontal window. This light receiving chamber extends up into the interior of the brew basket in spaced relation back from an inboard side of the frontal window to form a channel therebetween through which the turbulent brewing coffee travels during the brew cycle. A reflector is formed within the interior of the light receiving chamber to substantially reflect light onto the frontal window to illuminate the brewing coffee for visual observation through the frontal window. A heatsink coupled to the light ensures that the bulb remains at temperatures relatively lower than the brewing coffee temperature.

The brewer head may further be made from a thermally conductive material and may function as a heatsink by being circumferentially disposed around the bulb. In this respect, the light may reside within the brewer head such that the light emitted therefrom is projected through a channel toward the light receiving chamber. Furthermore, at least part of the bulb may be exposed to unheated water in a water reservoir so that, during the brew cycle, draining water from the reservoir dissipates heat away from the bulb simultaneously while pre-heating the unheated water delivered to the brew basket. This reduces the energy associated with heating the water for the brew cycle. This is particularly preferred in the event the light includes a plurality of thermally conductive fins extending into the unheated water. Furthermore, the brewer head may also be coupled to a conduit that channels unheated water around at least a portion of the light bulb during the brew cycle to better maximize heat exchange therewith.

Additionally, the cavity may define a forwardly open arcuate recess having a plurality of light sources disposed intermittently along its periphery. In turn, the brew basket may include multiple light receiving chambers disposed intermittently around the exterior periphery of the frontal window and substantially aligned with the plurality of light sources. Preferably, the light receiving chamber is made from a translucent material having an inward surface coated with the reflector as to maximize light distribution to the frontal window. In this respect, the light source may include a translucent light, a frosted light or a 3 mm to 5 mm cross-section LED. The bulb may also reside in a base of the brewer head and convey light to the light receiving chamber via a light conduit.

In an alternative embodiment, the coffee brewer lighting system includes a brewer head having a cavity defining a forwardly open arcuate recess configured for nested reception of a brew basket that mixes coffee and hot water during a brew cycle. A substantially transparent frontal window extends out from a portion of the brew basket and is externally visible when the brew basket is in nested reception with the brewer head cavity. A plurality of 3 mm to 5 mm LEDs are preferably circumferentially surrounded by thermally conductive material of the brewer head and disposed intermittently along the periphery thereof tracking the arcuate recess. These LEDs have bulbs in non-engaged relation with the nested brew basket, but are positioned to channel light toward respective light receiving chambers disposed intermittently around the exterior periphery of the frontal window. These chambers extend up into the interior of the brew basket in spaced relation from the frontal window to form a series of channels through which brewing coffee travels during the brew cycle. Furthermore, the improved coffee brewer lighting system further includes a reflector formed within the interior of each chamber and positioned to substantially reflect light onto the frontal window, and a heatsink for cooling the bulbs to temperatures relatively lower than the brewing coffee and hot water in the brew basket.

In this embodiment, the bulbs preferably include a plurality of thermally conductive fins extending into unheated water in a water reservoir, wherein, during said brew cycle, draining water from the reservoir dissipates heat away from the bulbs simultaneously while pre-heating the unheated water delivered to the brew basket to save on energy. To further cooling, the heatsink may include a conduit that channels the unheated water around at least part of the thermally conductive fins and/or the light bulb. In this respect, the conduit may be formed from a base of the brewer head, where the bulbs reside in distal relationship to the light receiving chambers. Here, the bulbs are coupled to a light conduit terminating in light respective relation to the respective chambers. The light receiving chambers themselves are preferably made from a translucent material having a surface coated with a reflected material.

In another embodiment, the coffee brewer lighting system uses a brewer head having a cavity configured for nested reception of a brew basket that mixes coffee and hot water during a brew cycle, similar to that described above. A substantially transparent front window extends out from a portion of the brew basket to be externally visible when the brew basket is in nested reception with the brewer head cavity. This embodiment includes a light receiving chamber that includes a generally vertical transparent frontal wall segment in spaced relation from an inboard side of the front window and a slanted rear wall segment for reflecting light toward the front window. The light receiving chamber is preferably designed to forwardly reflect light emitted by the bulb out through the transparent frontal wall segment and on to the front window. In this respect, the slanted rear wall segment may include a polished reflective interior surface, or the light receiving chamber may be configured for slide-fit reception of a reflector, such as a mirror. Furthermore, the slanted rear wall segment may make use of both a polished reflective interior surface and a reflector coupled to an exterior surface thereof within the brew basket. The slanted rear wall segment may be angled between 45° and 65° to maximize front window illumination.

A similar light source in the body of the brewer head is in non-engaged relation with the nested brew basket and has a bulb for emitting light through a light transmitting opening in the brewer head proximate the light receiving chamber. In turn, a channel is formed between the frontal wall segment and the front window for receiving a select quantity of turbulently agitated coffee for visual observation through the front window when illuminated by the light source during the brew cycle.

The lighting system may further include a light conduit coupled to the bulb at one end and terminating in light respective relation to the light receiving chamber at the other end. Here, the brewer head may act as a heatsink by including a thermally conductive material adjacent the bulb. To increase heat transfer efficiency, the heatsink may further include a plurality of thermally conductive fins extending into a water reservoir acting as a heat transfer medium. The cavity may further define a forwardly open arcuate recess having a pair of light sources disposed at offset angles relative to one another, and the brew basket may include a pair of light receiving chambers that substantially align with these light sources when in nested in the brewer head cavity. In this embodiment, the LED may have a cross-section larger than 5 mm.

In another embodiment, the improved coffee brewer lighting system includes a brewer head having a cavity configured for nested reception of a brew basket that includes a substantially transparent frontal window externally visible during a brew cycle. A light in non-engaged relation with the nested brew basket is positioned to illuminate a translucent light receiving chamber formed from a bottom portion of the frontal window. This chamber extends into the interior of the brew basket to form a channel through which coffee and hot water travels during the brew cycle. The improved coffee brewer lighting system may further include a reflector coating in at least part of the interior of the chamber for reflecting light onto the frontal window and a cooling system that includes a light heatsink having a plurality of thermally conductive fins extending into unheated water in a water reservoir, wherein, during the brew cycle, draining water from the reservoir cools the light to temperatures relatively lower than the brewing coffee simultaneously while pre-heating the unheated water delivered to the brew basket. In this respect, the cooling system may also include a conduit for channeling unheated water through the thermally conductive fins during the brew cycle.

Further to this embodiment, the cavity may define a forwardly open arcuate recess having a plurality of lights disposed intermittently along its periphery thereof. Preferably, the light includes an LED, a translucent light, or a frosted light at least partially exposed to unheated water in the reservoir. The LED preferably includes a 3 mm to 5 mm LED cross-section and may reside in a base of the brewer head for conveying light to the light receiving chamber via a light conduit.

Other features and advantages of the present invention will become apparent from the following more detailed description, when taken in conjunction with the accompanying drawings, which illustrate, by way of example, the principles of the invention.

BRIEF DESCRIPTION OF THE DRAWINGS

FIG. 1 is a perspective view of an exemplary embodiment of an improved drip-style brewer, showing a base with a brew head supported at an elevated position above a pot;

FIG. 2 is a perspective view of the brewer of FIG. 1, with a lid of the brew head opened to show the interior of a reservoir and a brew basket disposed within a brew basket housing covered with a lid;

FIG. 4 is an exploded perspective view of a brew basket lid including an upper and lower layer that sandwich together a sealing ring and including a series of vents;

FIG. 5 is a perspective view of the brew basket lid of FIG. 4 fully assembled;

FIG. 6 is a cross-sectional view taken about the line 6-6 of FIG. 5, illustrating operation of the vents;

FIG. 9 is a front perspective view of the brewer of FIG. 2 to show interior details of a water heating system;

FIG. 10 is a further front perspective view of the brewer of FIG. 2, showing further details of a preferred water heating system;

FIG. 22 is a fragmented side elevation view of the brew basket housing and associated water heating system of one embodiment of the brewer disclosed herein;

FIG. 23 is an enlarged fragmented section view of taken generally on the line 23-23 of FIG. 22;

FIG. 24 is an enlarged fragmented section view taken generally on the line 24-24 of FIG. 22;

FIG. 25 is an enlarged fragmented section view similar to a portion of FIG. 22, but showing a carafe closure valve in an alternative position of operation;

FIG. 26 is top plan view of the brewer with portions of a brew basket removed to illustrate a reinforcing band on the brew basket housing;

FIG. 27 is a top plan view of the brewer similar to FIG. 26 but showing the reinforcing band snapped into place;

FIG. 28 is a top plan view similar to FIGS. 26 and 27 but wherein brew basket is included with the brewer lid removed;

FIG. 34 is a side elevation view of a solenoid valve and associated phase control valve for use in the brewer of FIG. 1 for use in controlling flow of water from the reservoir to a heater;

FIG. 35 is an exploded perspective view of the solenoid valve and associated phase control valve of FIG. 34, and illustrating alternative preferred embodiments of a valve seat for use therewith;

FIG. 36 is a perspective view of the solenoid valve and associated phase control valve of FIG. 34;

FIG. 37 is a fragmented section view of the check valve shown in an open position;

FIG. 38 is a fragmented section view of the check valve shown in a closed position;

FIG. 39 is a fragmented section view taken about the line 39-39 in FIG. 34, illustrating the solenoid valve in a first position of operation;

FIG. 40 is a fragmented section view of the solenoid valve shown in a second position of operation;

FIG. 41 is a fragmented section view of the solenoid valve shown in accordance with an alternative preferred form as a phase control valve;

FIG. 42 is a fragmented section view of the solenoid valve shown in association with an underlying optical detector, taken generally on the line 42-42 of FIG. 36;

FIG. 43 is a horizontal section view taken generally on the line 43-43 of FIG. 36;

FIG. 44 is a fragmented and somewhat schematic view illustrating the operation of the solenoid valve and the check valve;

FIG. 45 is a fragmented and somewhat schematic view similar to FIG. 44 and showing the solenoid valve in an alternative condition of operation;

FIG. 46 is a fragmented and somewhat schematic view similar to FIG. 44 and showing the solenoid valve in an alternative condition of operation;

FIG. 47 is a fragmented and somewhat schematic view similar to FIG. 44 and showing the solenoid valve in an alternative condition of operation;

FIG. 56 is a perspective view of a single cup serving insert for the brew basket, with the single cup serving insert being shown in inverted relation;

FIG. 57 is a perspective view of the brewer with the lid removed, and showing insertion of the single cup serving insert into the brew basket housing;

FIG. 58 is a perspective view showing insertion of a single cup into the insert shown in FIGS. 56 and 57;

FIG. 59 is an alternative perspective view of the single cup insert, showing insertion of a single serving cup into the insert;

FIG. 60 is an exploded section view showing assembly of the insert with the single serving cup therein;

FIG. 61 is a section view similar to FIG. 60 but showing water flow through the assembled insert;

FIG. 75 is a cross-sectional view taken about line 75-75 of FIG. 74, illustrating a light receiving chamber directing light to a substantially transparent frontal window;

FIG. 76 is an alternative cross-sectional view similar to FIG. 75, illustrating a reflector disposed within the light receiving channel;

FIG. 77 is another alternative cross-sectional view similar to FIG. 75, illustrating a reflector disposed along the exterior of the light receiving channel;

FIG. 81 is an alternative exploded perspective view similar to FIG. 74, illustrating multiple lights positioned intermittently within an arcuate recess in the brewer head and multiple corresponding light receiving chambers in the brew basket;

FIG. 82 is a perspective view similar to FIG. 78, further illustrating alignment of the lights and light receiving chambers illustrated in FIG. 81;

DETAILED DESCRIPTION OF THE PREFERRED EMBODIMENTS

Figure 3:
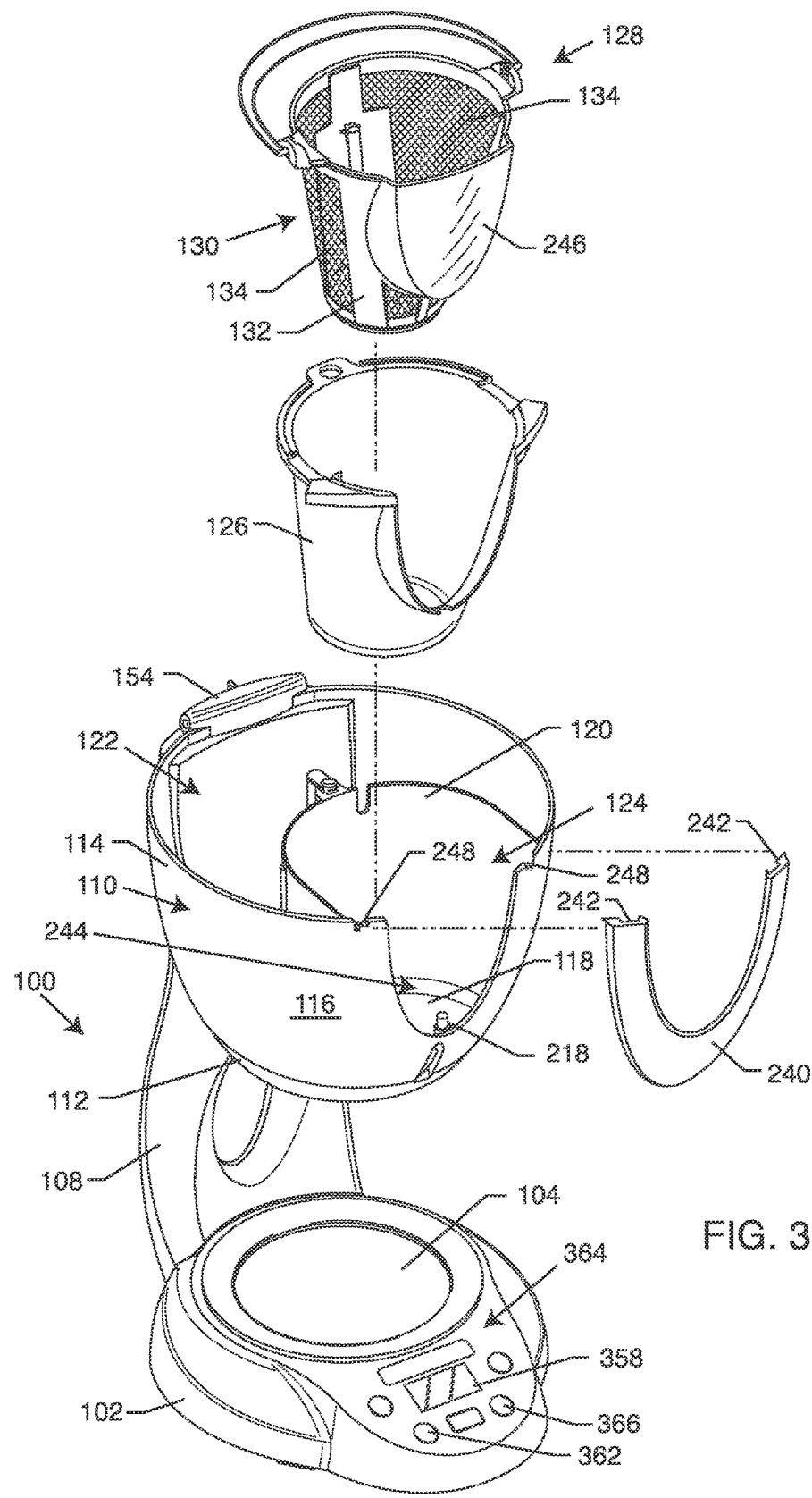
FIG. 3 is an exploded front perspective view of the brewer of FIG. 1, without the lid of the brew head and without the lid of the brew basket housing.

As shown in the drawings for purposes of illustration, the present invention is directed to enhancements in the art of brewing beverages, and specifically coffee and/or tea brewers. In particular, such enhancements include apparatuses and methods for utilizing a solenoid to regulate heated or steamed water flow utilizing a conventional pot or carafe heating element, utilizing a control circuit to regulate fluid flow through the heating element, monitoring water levels in a reservoir with a water level sensor, venting heat and steam from the brew basket, monitoring the brewer in-line voltage and adjusting the duty cycle of the heating element in response thereto in real-time, enhancing brewed beverage evacuation from the brew basket at the end of the brew cycle, and providing an improved sealant and ventilation system for the brew basket lid. These particular features may be utilized by those of ordinary skill in the art with known conventional brewers, or such features may be used with more recently designed brewers, such as those described in detail in U.S. Pat. Nos. 6,968,775, 7,340,991, 7,240,611 (hereinafter "the Burrows patents"), the contents of each of which are herein incorporated by reference in their entireties. For the purposes of this application, however, the brewer apparatuses and methods disclosed herein will be described with respect to a model brewer 100 (FIGS. 1-3, 9-10, 14-17, 21, 53 and 57) or brewer 100' (FIGS. 62, 64-65 and 71), which is similar in construction and operation as those brewers disclosed in the Burrows patents.

In this respect, the illustrated brewer 100, as shown in FIGS. 1-3, 9-10, 14-17, 21 and 57, generally includes a base 102 having a platen 104 that supports a pot 106 (FIGS. 1 and 2 only) or other vessel such as a carafe, for receiving and retaining a brewed beverage such as coffee or tea. The platen 104 could be a heat plate known in the art, or the platen 104 could optionally be heated by a heating unit (described in more detail below) integrated into the base 102 of the brewer 100. Furthermore, the platen 104 and the base 102 may be adapted to accommodate different sized beverage retaining vessels, such as larger or smaller pots 106, cups or travel mugs. The brewer 100 further includes a support 108 extending upwardly from a rear portion of the base 102 to provide cantilevered attachment of a brewer head 110 that extends outwardly from the support 108 and over the platen 104. More specifically, a lower housing shell 112 attaches to an upper portion of the support 108 and carries a brewer head bowl 114 generally defined by an outer peripheral wall 116 and a bottom wall 118 (FIG. 3). As shown best in FIG. 3, the bowl 114 includes an inner wall 120 that divides the bowl 114 into a pair of chambers, including a rear water receiving reservoir 122 and a forward upwardly open cavity 124 that selectively receives a brew basket housing 126 carrying a brew basket 128. The brew basket 128 is preferably configured for slide-out removal from the brew basket housing 126 so that the brew basket 128 can be quickly and easily removed therefrom after a brew cycle for purposes of cleaning and preparing (e.g., discarding the spent coffee grounds or tea) the brew basket 128 for a subsequent brew cycle. Similarly, once cleaned, the brew basket 128 quickly and easily slides back into the brew basket housing 126 for the next brew cycle. In a particularly preferred embodiment, the brew basket housing 126 and the brew basket 128 are preferably keyed for one-way slide-fit insertion.

More specifically, the brew basket 128 shown in FIG. 3 has a generally bowl-shaped curvature or sidewall 130 formed by a series of upstanding solid sidewall segments 132 having a series of mesh filter screens 134 disposed in between. The surface area and size of the mesh filter screens 134 can be selected to control the flow rate of brewed beverage through the brew basket 128 and thus the residence time within the brew basket 128. Different brew baskets may include different types of brewing material. For example, a brew basket for use with finely ground coffee can have a greater screen surface area and a larger mesh than a brew basket for use with coarser tea.

Figure 53:
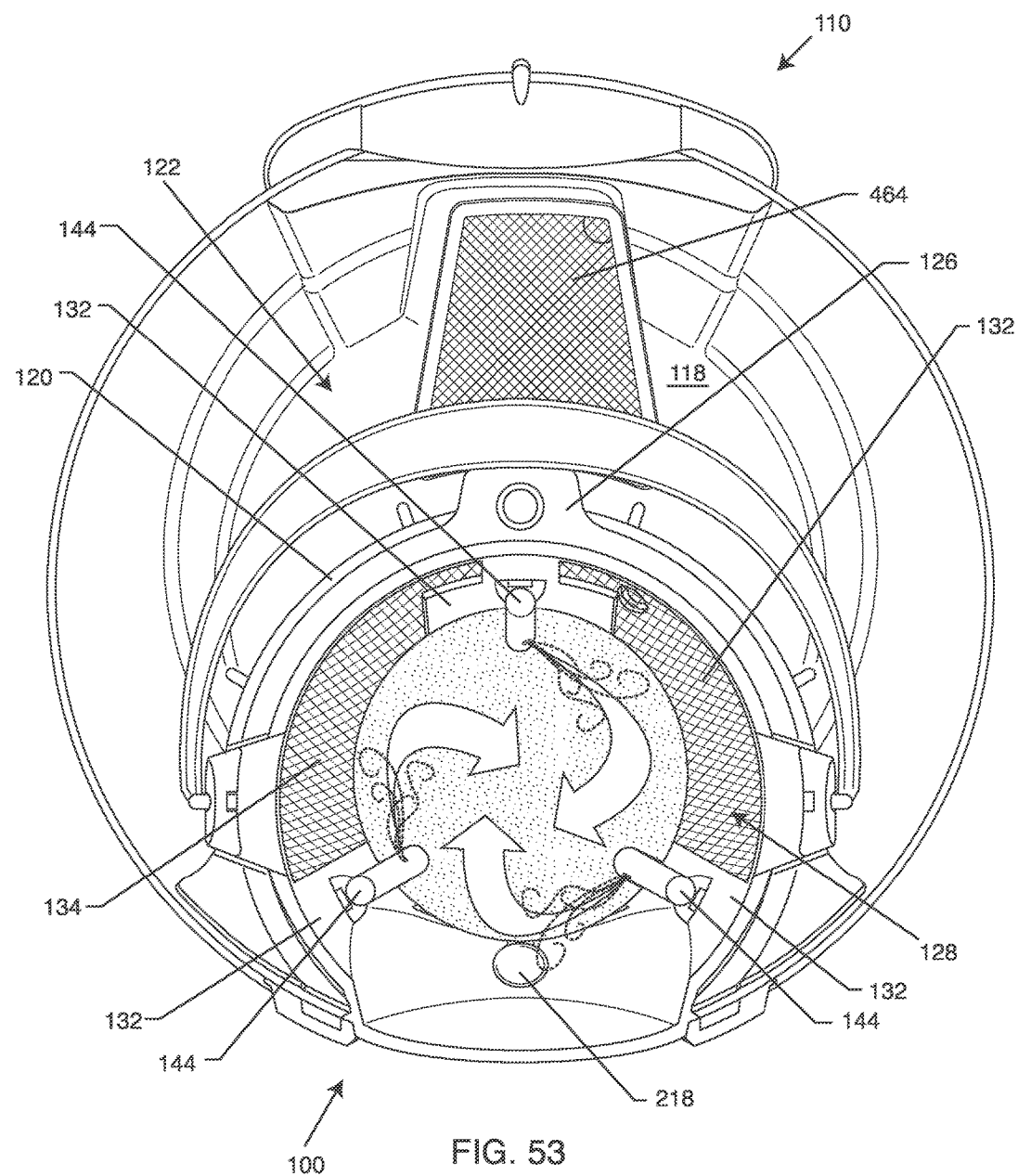
FIG. 53 is a top plan view of the brewer with the lid removed, for illustrating somewhat schematically operation of the brewer.
Figure 54:
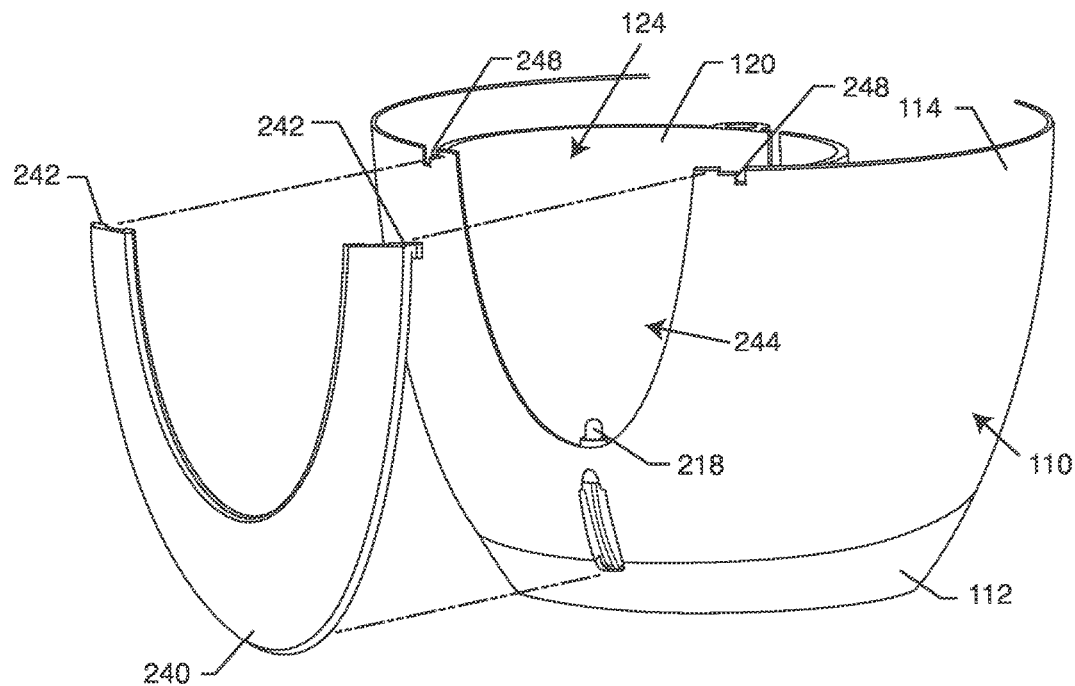
FIG. 54 is a fragmented top perspective view of the brew basket housing with a reinforcing band being shown in exploded relation.
Figure 55:
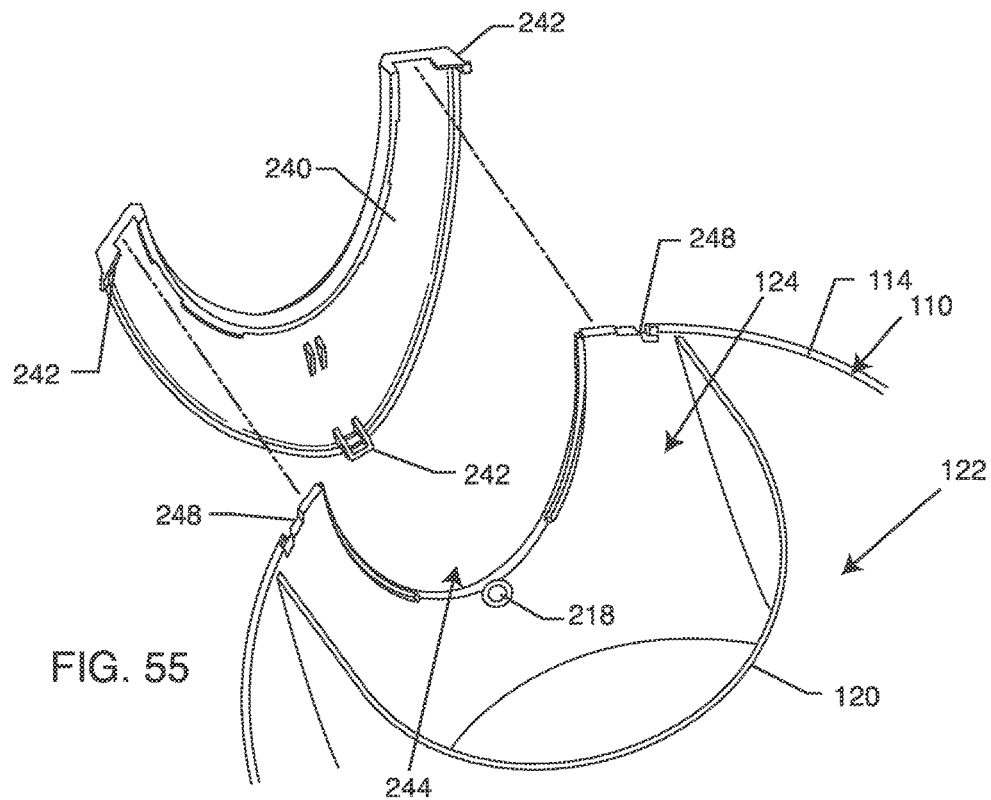
FIG. 55 is another fragmented top perspective view of the brew basket with the reinforcing band shown in exploded relation.

While the brew basket 128 is illustrated in FIGS. 2, 28 and 53 as filling much of the interior of the brew basket housing 126, the brew basket 128 can be much smaller. For example, a smaller brew basket can have sidewalls and an upper rim spaced inwardly from the brew basket housing 126. Indeed, the term "brew basket" can include many different variations in size, structure, and operation from that illustrated and described herein. While not necessary for every permutation of brew baskets, adapters and the like can be utilized to support brew baskets that were sized for use with other brewers. To facilitate brew baskets of different sizes, including the brew basket 128, magnets can be incorporated into the bottom of the brew basket housing 126 (or an adapter for use therewith) that can cooperate with magnets disposed in the bottom of the brew basket 128 (or adapter) thereof. The magnets (not shown) can advantageously be resistant to axially directed fluid forces seeking to push the brew basket 128 (or adapter) away from engagement with the bottom of the brew basket housing 126, which is the preferred entry point for heated water flow, as described in detail below. Although, advantageously, these magnets are less resistant to rotational or twisting motion that facilitate separation of the brew basket 128 (or adapter) from the brew basket housing 126 when the magnets are no longer aligned. To this end, a second set of magnets having opposite polarity may facilitate pop-out removal of the brew basket 128 (or adapter) when rotated or twisted from the engaged position. The magnets preferably cooperate to pull the brew basket 128 (or adapter) toward engagement with the opposing magnets in the brew basket housing 126, thereby assisting in positioning and seating the brew basket 128 within the housing 126.

Furthermore, the brew basket 128 includes a base wall 136 having an internal plenum chamber 138 (FIGS. 20-22) with an aperture 140 configured for slide-fit and fluidly sealed reception with an upstanding probe or feed port 142 that receives pulsed heated liquid or steam water from the reservoir 122, in accordance with the embodiments described below. This feed port 142 delivers the heated liquid or steam water to the plenum chamber 138 for distribution to one or more of a series of upstanding hollow ribs 144 (FIGS. 20-22, 28 and 53) disposed within the brew basket 128. Preferably, the hollow ribs 144 each include an upper jet port 146 and a lower jet port 148, as best shown in FIG. 28, through which heated water from the reservoir 122 is injected into the brew basket 128 during a brew cycle. The hollow ribs 144 are preferably coupled to the solid sidewall segments 132 to provide stable vertical extension while pressurized heated water and/or steam is jetted into the brew basket 128. In a particularly preferred embodiment, the brew basket 128 includes three equidistantly spaced sidewall segments 132, as shown in FIGS. 28 and 53, each having an adjacent hollow rib 144. Although, a person of ordinary skill in the art may recognize that other combinations and quantities of the sidewall segments 132 and the hollow ribs 144 may be utilized, depending, of course, on the structural and operational aspects of the corresponding brewer. While the jet ports 146, 148 are disposed within the hollow ribs 144 in the brew basket 128 as shown in FIG. 53, the jet ports 146, 148 could be placed elsewhere, including outside the area where the loose ground coffee or tea is deposited prior to brewing. Here, the hollow ribs 144 may not be adjacent to the sidewall segments 132 within the brew basket 128 and the heated water streams emanating from the lower and upper jet ports 146, 148 may enter the containing area retaining the loose ground coffee or tea through one or more mesh or perforated sidewall segments of the brew basket 128. The jet ports 146, 148 function, of course, in accordance with U.S. Pat. Nos. 6,968,775; 7,340,991; and 7,240,611, all of which are incorporated by reference herein.

Preferably, the brewer 100 includes at least one of the lower jet ports 146 positioned at a level below an upper surface of the corresponding dry coffee or tea placed within the brew basket 128 prior to initiating a brew cycle. In this respect, upon initial supply of jetted hot water into the brew basket 128 through this at least one lower jet port 146, at least a portion of the hot water stirs and agitates the initially dry and loose coffee grounds or tea to initiate swirling or spinning, which tends to create a fluidized bed of waterborne coffee or tea. At this stage in the brewing process, a brewer that includes at least one of the upper jet ports 148 positioned above the coffee grounds or tea and is unable to generate this swirling or spinning action. This stirring and agitating action continues as additional water is supplied to the brew basket 128 through the aforementioned lower and upper jet ports 146, 148, as described in more detail below. Preferably, the water level in the brew basket 128 will eventually increase to a point higher than the upper jet ports 146, whereby water jetted into the brew basket 128 by the lower and upper jet ports 146, 148 cooperatively stir and agitate the now combined body of coffee grounds or tea suspended for water-borne dispersion in the swirling water. Such action thoroughly and substantially uniformly exposes the entire volume of coffee grounds or tea to heated water for nearly the entire brew cycle. The lower and upper jet ports 146, 148 are preferably, though not necessarily, orientated to inject water generally tangentially in a common swirling direction into the interior of the brew basket 128. The thus-produced fluidized bed is swirled by centrifugal action against an inboard side of the brew basket 128 and passes through the mesh filter screens 134 thereof. Of course, the size of the mesh filter screens 134 may vary to provide controlled filtration of ground coffee or tea. For example, the mesh filter screens 134 may be smaller for finer ground dry coffee, and vice versa. Moreover, the jet ports 146, 148 can optionally be designed for minimizing or eliminating undesirable inflow or ingestion of particle-laden coffee or tea when the supply of hot water to the jet ports 146, 148 terminates, as described in detail in the Burrows patents.

As shown in FIGS. 2, 4-8, and 19-20, the brew basket 128 preferably includes a brew basket lid 150 that selectively covers the brew basket 128 so that coffee, tea and/or hot water does not accidentally splash out or escape out from the brew basket 128 during a brew cycle, and especially while being agitated by the lower jet ports 146, the upper jet ports 148, or a combination of both jet ports 146, 158, as described above. The brew basket lid 150 also traps the heated water and steam therein, to maintain elevated brewing temperatures in the brew basket 128 during a brew cycle. The brew basket lid 150 may also be sized to at least partially cover, if not completely seal, the brew basket housing 126. Additionally, in one embodiment, the brew basket lid 150 may attach to the brew basket 128 or the brew basket housing 126 by means of a hinge or the like. A second or upper lid 152 is coupled to the rear of the support 108 by a hinge 154 (FIGS. 2-3, 14-16 and 57) or the like, and effectively closes the top of the brewer head 110 and the associated water reservoir 122 during a brew cycle. In one preferred embodiment, the brew basket lid 150 and the water reservoir/brewer lid 152 cover respective portions of the brewer head 110 and otherwise sit flush with one another. In another embodiment, the brew basket lid 150 may sit within or underneath the water reservoir lid 152 in a manner that facilitates stacking (e.g., the embodiment shown in FIG. 2). In this latter embodiment, the weight of the water reservoir lid 152 may present downward pressure on the brew basket lid 150 to further ensure this lid 150 stays sealed to the brew basket housing 126. A person of ordinary skill in the art will recognize that the brew basket lid 150 and the water reservoir lid 152 should cooperate to prevent cross-contamination between liquids in the reservoir 122 and the brew basket 128, and prevent spillage out from the brewer 100 during the brew cycle, however configured.

Additionally, a sensor or switch 156 (FIGS. 19-23) is preferably associated with at least the brew basket lid 150 to indicate whether the lid 58 is in an open position or a closed position. In one embodiment, the sensor or switch 156 may include a reed switch 156 coupled to or otherwise formed from a portion of the brew basket housing 126, as shown in FIGS. 19-23. In other embodiments, the switch 156 could also be an optical sensor or a mechanical switch or sensor capable of determining whether the brew basket lid 150 is in an open or closed position. The reed switch 156, for example, is able to sense the presence or absence of a magnet 158 coupled to the brew basket lid 150. In this respect, the magnetic field generated by the magnet 158 may close the reed switch 156 when the brew basket lid 150 is properly seated in the closed position. Thus, the brewer circuitry is able to read this closed state for purposes of running the brew cycle. Opening the brew basket housing lid 150 pulls the magnet 158 and its magnetic field away from the reed switch 156, thereby opening the reed switch 156 such that the brewer internal circuitry recognizes that the brew basket housing lid 150 is in an open position and no longer properly seated, thereby preventing the brewer 100 from operating the brew cycle. Of course, the reed switch 156 could work in the reverse, i.e., the magnetic field from the magnet 158 causes the reed switch 156 to open when the brew basket lid 150 is in the closed position and to open when the lid 150 is removed. The brewer internal circuitry is preprogrammed to operate the brew cycle accordingly, based on readings from the reed switch 156. Once the brew basket lid 150 is reseated and the reed switch 156 is reactivated, the brewer internal circuitry will allow the brew cycle to operate. Notably, if the brew basket housing lid 150 was removed in the middle of a brew cycle, the brewer internal circuitry will remember and re-initiate the brew cycle from the last stopping point to complete the brew cycle. Of course, a similar sensor or reed switch may be used in combination with a similar magnet to determine whether the water reservoir lid 152 is properly seated.

In another embodiment, one or more magnets may be disposed at ends of the brew basket lid 150 and/or the water reservoir lid 152 opposite the hinge 154 to enhance engagement therewith. In this embodiment the magnets are preferably oppositely charged and disposed in respective portions of the outer peripheral wall 116 and/or the brew basket housing 126 to keep the lids 150, 152 in a closed or covered position. Such magnets may be used independently or concurrently as a replacement for the sensor/reed switch 156 and the magnet 158.

One aspect of the brewer 100 disclosed herein is that the brewer 100 can alternate between a water brewing phase and a steam brewing phase during a single brew cycle. Alternating between water and steam brewing phases advantageously results in consistently relatively higher average water temperatures in the brew basket 128 during a single brew cycle, as compared to conventional brewers that only include a water brewing phase. Overall higher average water temperatures in the brew basket 128 are achieved by intermittently injecting a fresh hot water stream of water, wet steam or steam into the brew basket 128 at select intervals during the brew cycle. The frequency and duration of the water brewing phases and steam brewing phases during a single brew cycle can be electronically controlled according to one or more predetermined programs, as discussed in detail herein.

Figure 18:
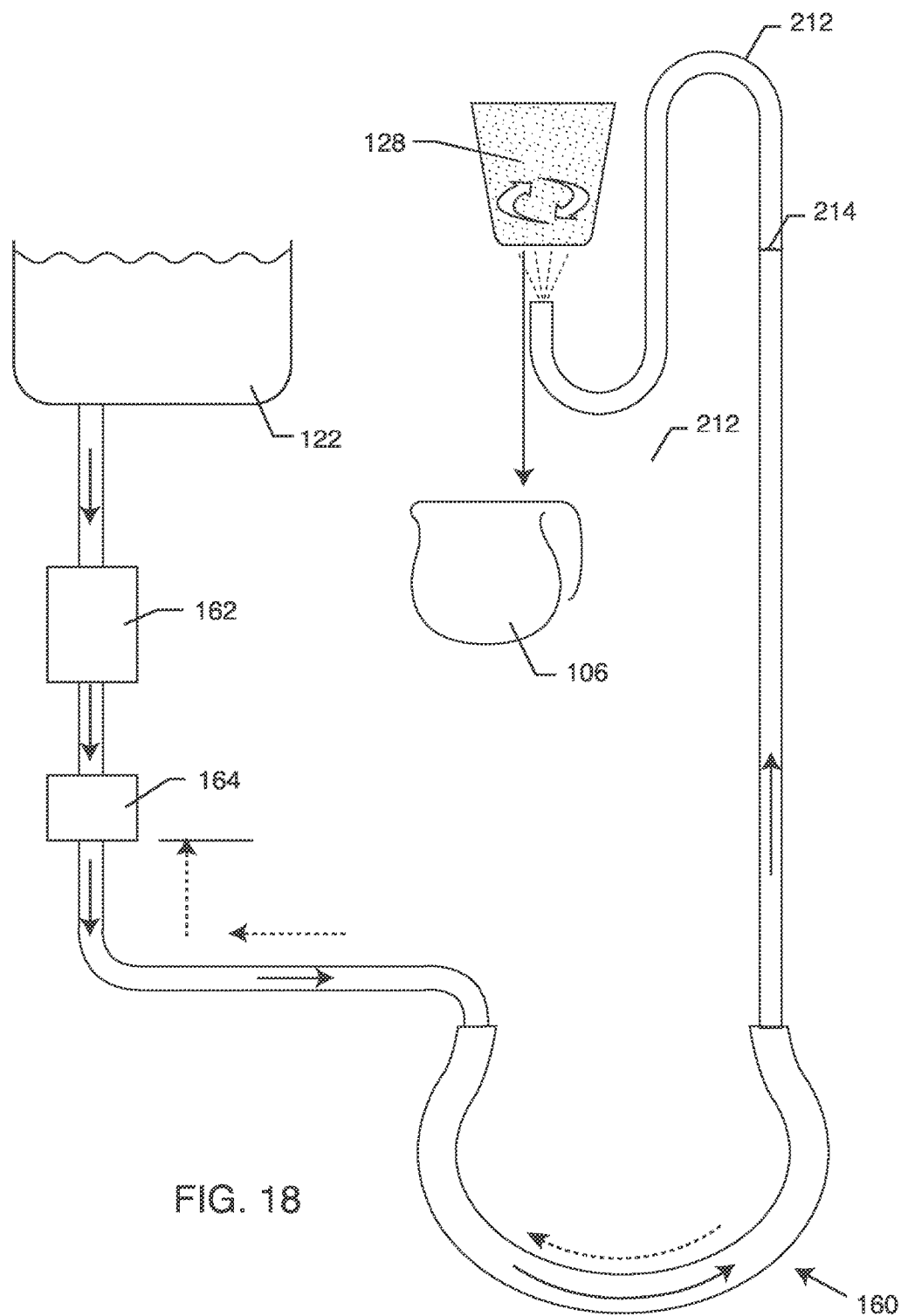
FIG. 18 is a schematic diagram illustrating operation of the water heating system of the invention.
Figure 19:
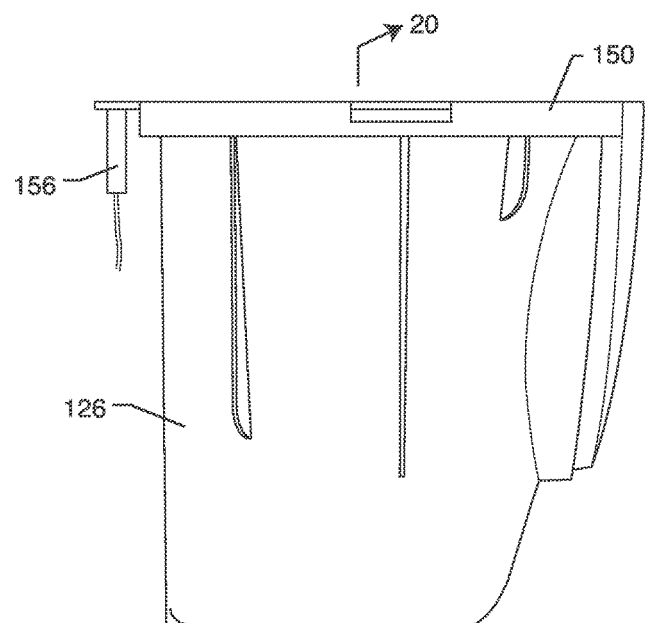
FIG. 19 is a side elevation view of a brew basket housing for use in the brewer of the invention.

As described above, the brewer 100 includes the water reservoir 122 for temporarily storing a predetermined quantity of filtered water or tap water at room temperature for use in brewing coffee or tea during the brew cycle. In this respect, FIG. 2 illustrates one preferred embodiment of the water reservoir 122 disposed within the brewer head 110. FIG. 18 is a general schematic view illustrating the water reservoir 122 in fluid communication with a heating unit or heating system 160, a phase control valve 162 and a check valve 164 disposed in-line. The phase control valve 162 is designed to intermittently meter the flow rate of water from the reservoir 122 to the heating element 160 during a brew cycle. The check valve 164 restricts or prevents reverse water flow from the heating unit 160 back to the reservoir 122, while allowing forward flow of water from the reservoir 122 to the heating unit 160 in accordance with the embodiments disclosed herein. Also shown in FIG. 18 is the brew basket 128 positioned downstream from and in fluid communication with the heating unit 160. During operation, water generally flows from the water reservoir 122, past the phase control valve 162 and the check valve 164, and into heating unit 160. Activating the heating unit 160 causes the water therein to rapidly increase in temperature and, in some cases, turn to steam, thereby increasing the pressure therein and expanding the water in the heating unit 160. As a result, backpressure causes the check valve 164 to close, thereby preventing reverse flow of heated water/steam back into the water reservoir 122 and ensuring one-way unidirectional flow out from the heating unit 160 and into the brew basket 128. As briefly described above, this heated water/steam is channeled through the plenum chamber 138, into the hollow ribs 144 and out through the lower and upper jet ports 146, 148 to mix and brew loose coffee or tea (shown generally, e.g., in FIG. 53).

In one embodiment, the phase control valve 162 is designed to meter the flow rate of water from the reservoir 122 to the heating system 160 such that the brewer 100 alternates between steam and water brewing cycles. In a preferred embodiment, the phase control valve 162 may be disposed in fluid communication between the water reservoir 122 and the heating unit 160, such as upstream of the check valve 164 as shown in FIG. 18. The phase control valve 162 is electronically controlled by a control circuit 166 (FIG. 50) to alternate the water flow rate between a relatively higher flow rate (water brewing phase) and a relatively lower flow rate (steam brewing phase). That is, in the first water brewing phase, the phase control valve 162 permits a higher volume of water travel to exit the water reservoir 122 for delivery to the heating unit 160, while the phase control valve 162 throttles the water flow rate from the water reservoir 122 to the heating unit 160 during the steam brewing phase. In the water brewing phase, the heating unit 160 is preferably configured to heat the water to an increased temperature substantially higher than room temperature, yet lower than turning the water to steam. The water brewing phase may occur in the brew basket 128 even if no heated water is being injected into the brew basket 128. In the alternative steam brewing phase, the heating unit 160 preferably turns the lower quantity of water flowing therethrough substantially or completely to steam before delivery to the brew basket 128. In this respect, the heating unit 160 may be configured to heat to a certain predetermined temperature such that the volume of water flowing therethrough determines whether it is turned to steam. In this respect, a person of ordinary skill in the art will appreciate that it will take more energy and a longer time to turn a larger quantity of water to steam, as opposed to a smaller quantity.

Figure 51:
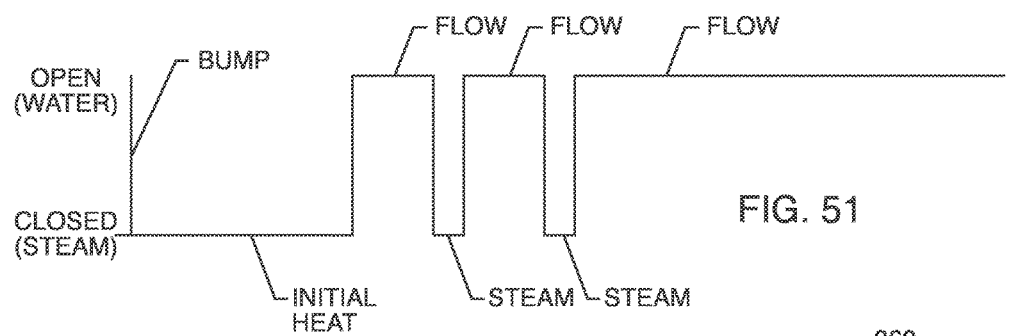
FIG. 51 is a further graphical depiction of pulsed water flow in the brewer during the stream brew and water brew cycles.

The brewer circuitry is preferably preprogrammed to automatically alternate between flow rates, depending on the brewing conditions during a single brew cycle. Although, in both the water and steam brewing phases, the heating unit 160 increases the water temperature well beyond normal room temperature before delivery to the brew basket 128. The higher temperature steam generated during the steam brewing phases tends to increase (or at least maintain) the elevated water temperature in the brew basket 128 during the brew cycle. This is particularly advantageous over conventional brewers because the water in the brew basket 128 of the brewer 100 disclosed herein remains at higher relative temperatures during the entire brew cycle. In this respect, the diagram shown in FIG. 51 generally illustrates the conditions where the brewer 100 alternates between steam and water brewing cycles. In particular, the phase control valve 162 may be initially closed such that the heater 160 generates an initial burst of steamed or heated water for injection into the brew basket 128. After this initial period, the phase control valve 162 opens to permit a quantity of water in the reservoir 122 to flow to the heater 160 as part of the water brewing cycle. Here, the heater 160 substantially increases the temperature of the increased flow rate of water, but preferably does not turn it to steam before delivery to the brew basket 128. Thereafter, the phase control valve 162 will close or substantially occlude water flow from the reservoir 122 to the heating system 160, thereby starving the heater 160 of fresh unheated water. As such, the heater 160 is able to turn this lower volume of water to steam for delivery to the brew basket 128. The control circuit 166 continues to modulate the phase control valve 162 as needed to alternate between these steam and water brewing cycles, as generally shown in FIG. 51.

Figure 16:
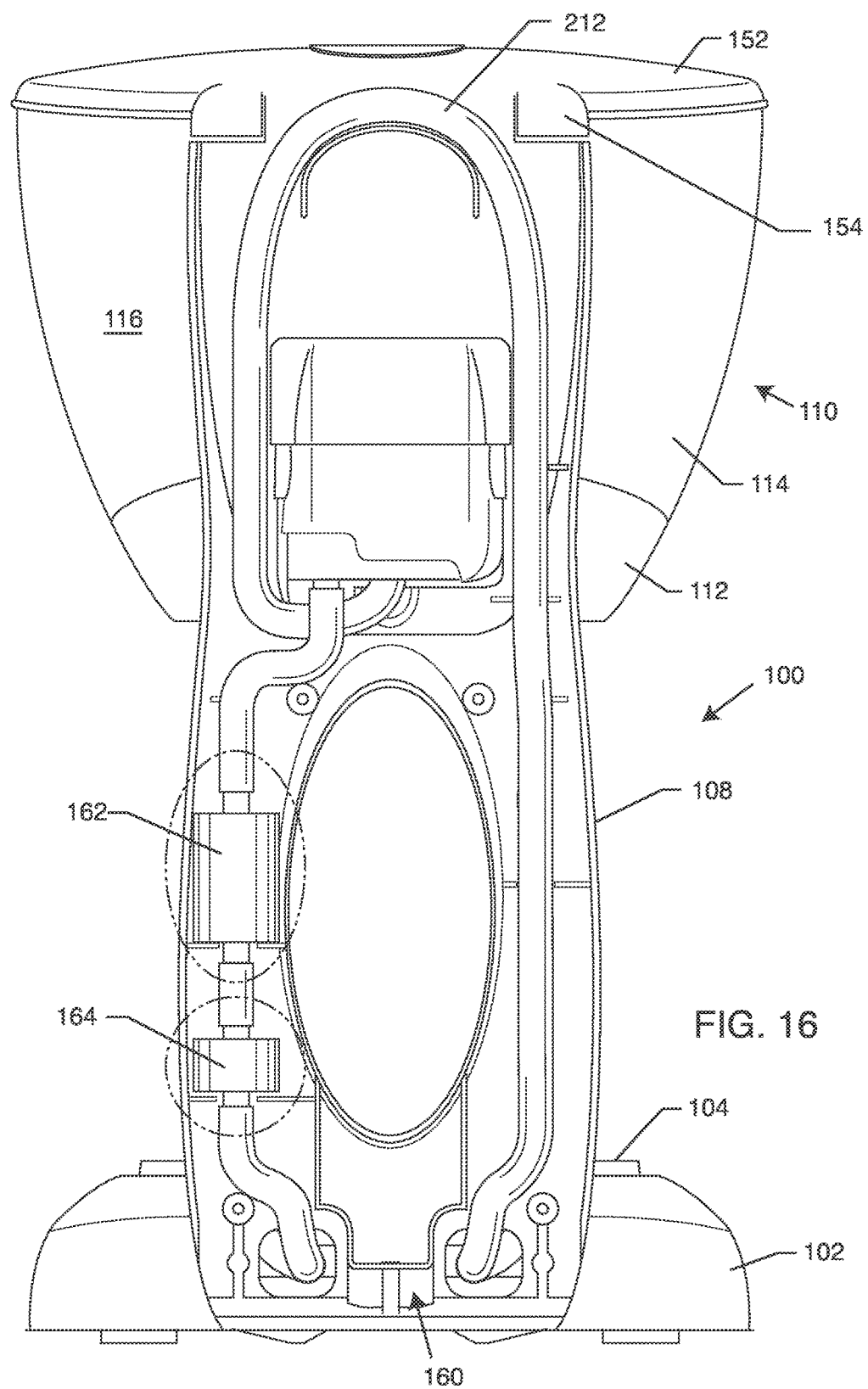
FIG. 16 is an enlarged rear elevation view of the brewer similar to FIG. 14, but with a cover of a support removed to illustrate internal components thereof.
Figure 17:
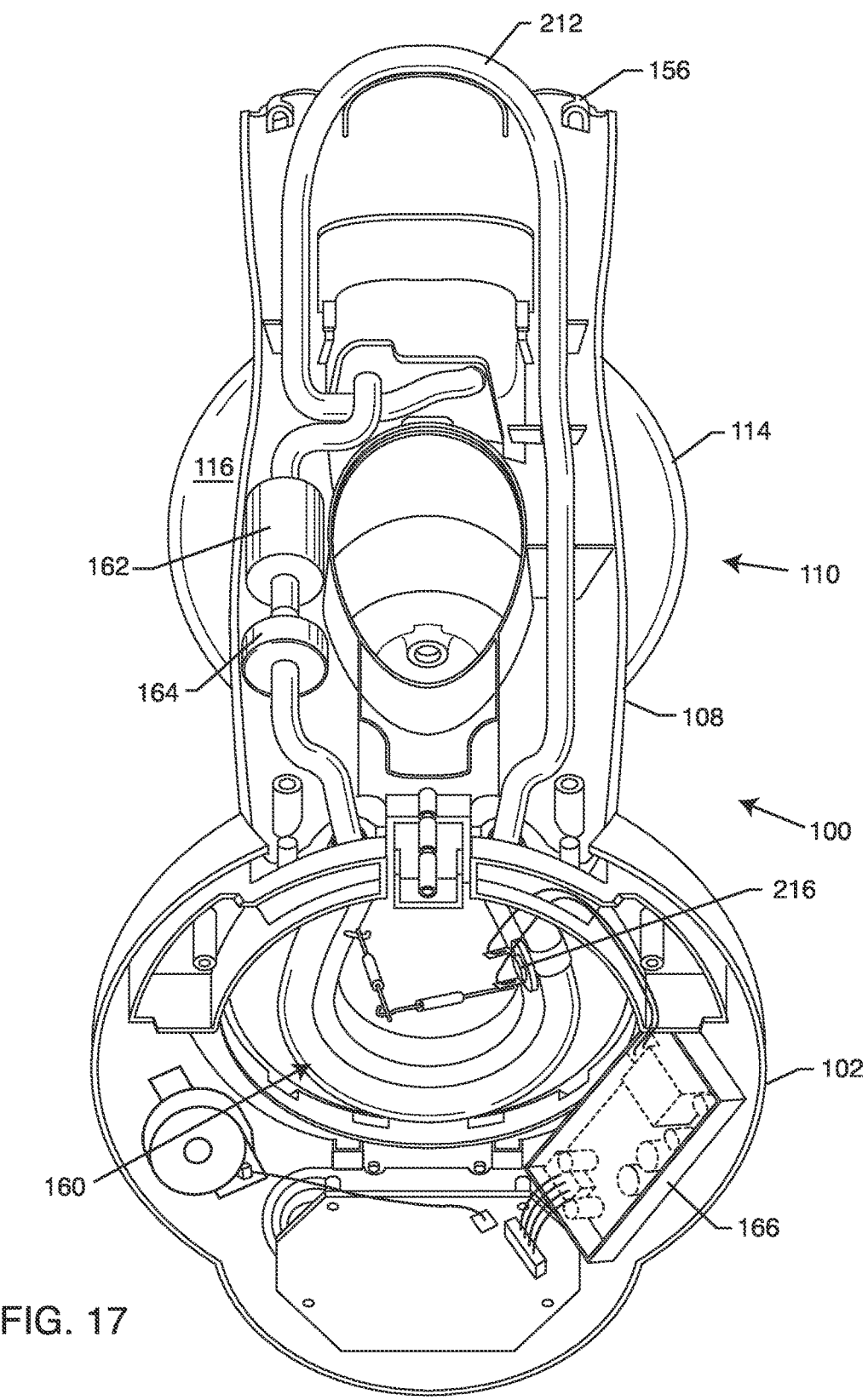
FIG. 17 is a bottom perspective view brewer with a cover of a support removed, similar to FIG. 16, to show internal components of the water heating system.

More particularly, with reference to FIGS. 34-42, the phase control valve 162 may be in the form of a solenoid valve 168 that generally includes a coil or stator 170 surrounding a central shaft 172 that carries an inner hollow or tubular metal plunger or valve member (or armature) 174 movable within the interior of the central shaft 172, as shown best in FIGS. 39-42 and 45-47. The plunger 174 includes an interior passageway 176 extending along its longitudinal axis to provide a flow pathway that allows water from the reservoir 122 to travel through the solenoid valve 168. The central shaft 172 includes upper and lower ends 178, 180 suitable for slide-fit reception of flexible tubing, as may be secured thereto in airtight and watertight fashion by a pair of upper and lower annular ribs 182, 182' when the phase control valve 162 is placed in-line with the brewer tubing, as generally shown in FIGS. 16-17. A flexible or rubber outer housing 184 encompasses a pair of upper and lower circumferential plates 186, 188 that define a middle portion 190 therein substantially circumferentially encompassed by the coil 170, the coil 170 being disposed between the outer housing 184 and the central shaft 172. Additional washers or plates 192, 192' can optionally be disposed outwardly adjacent to the upper and lower circumferential plates 186, 188, respectively, to further enclose the outer housing 184 and the coil 170, as best shown in FIGS. 36 and 39-42. In effect, the plunger 174 generally travels longitudinally within the central shaft 172 depending on the magnetic field generated by the coil 170. That is, when energized with electricity, the coil 170 generates a magnetic field that causes the plunger 174 to align generally between the upper and lower circumferential plates 186, 188. When the coil 170 is de-energized, the magnetic field dissipates and the plunger 174 will move downwardly, as described in more detail below, whether as a result of gravity, downward pressure from the water in the reservoir 122, or a combination of the two. It is this movement of the plunger 174 within the central shaft 172 that allows the brewer 100 to regulate, in one embodiment, the steam and water brewing cycles.

Further in this respect, and as shown in FIGS. 35 and 39-42, the phase control valve 162 further includes a valve seat 194 or 194' that operates in conjunction with the movable plunger 174 to regulate the water flow rate through the phase control valve 162. When actuated for displacement from the closed position (FIG. 39) toward the open position (shown in dotted lines in FIG. 40), the inner plunger 174 of the solenoid valve 162 opens a series of small flow ports 196 formed in the valve seat 194 or 194' (FIGS. 35 and 39-42). When opened, the flow ports 196 permit passage of water to and through the directionally oriented check valve 164 (FIG. 18). This check valve 164, as clearly shown in FIGS. 37-38, permits forward flow of water to the associated heating unit 160, while preventing or precluding reverse flow therein.

The difference between the valve seats 194 and 194' pertain to the slight permitted forward flow of water therethrough despite the closed condition (or partially open condition in the case of valve seat 194') of the associated solenoid valve 162. In particular, the valve seat 194' in the alternative embodiment includes a shallow trench or trough 198 coupled between a pair of the flow ports 196 to permit at least some forward or downward flow of water through the solenoid valve 162 from the open hollow tubular plunger 174 into and through the trough 198 and further out the flow ports 196, even though the solenoid plunger 174 is in the lower closed position substantially overlying the flow ports 196. In other words, through use of the valve seat 194', the phase control valve 162 moves between an open position wherein the plunger 174 is unseated, and a partially open position wherein the plunger 174 sits on the valve seat 194', but permits some forward flow of water through the trough 198 and out through the flow ports 196. The valve seat 194' is preferred in conditions where at least a minimum forward water flow is desirable at all times.

Forward water flow may be detected by an optical detector 200, as shown in FIGS. 36 and 42-43. In this regard, the optical detector 200 includes an enlarged slotted flange 202 (FIGS. 36 and 43) or the like for convenient mounting at a suitable location within the support 108 (FIG. 16). The optical detector 200 includes an optical emitter 204 and a sensor or detector 206 mounted respectively within tubular extensions 208 on a valve housing 210 (FIG. 43) between the phase control valve 162 and the check valve 164 (FIG. 44). The optical detector 200 functions by sensing water flow exiting the phase control valve 162, as generally shown in FIG. 44. Alternatively, the optical emitter 204 and the sensor or detector 206 can be utilized to sense the positioning of the plunger 174 as shown in FIGS. 45-47.

Figure 50:
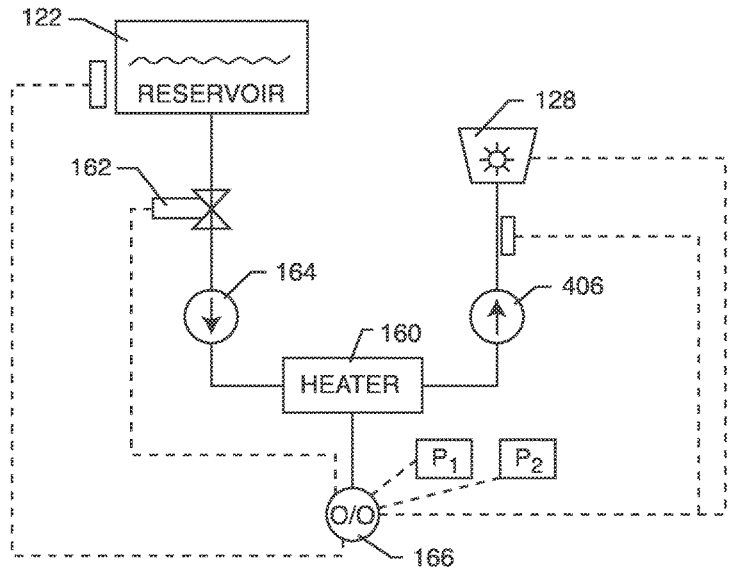
FIG. 50 is a schematic diagram illustrating operation of the brewer of the present invention.

In the water brew cycle, the hydrostatic head of water within the reservoir 122 creates a pressure or weight on the phase control valve 162, which, when in the open position, permits water flow through to the heating unit 160 for elevating the water temperature. The water flows on through the brewer tubing 212 for distribution via the jet ports 146, 148 within the brew basket 128 and from there falls into the underlying carafe or pot 106. Periodically, the phase control valve 162 shifts electronically to the closed position (or to the partially open position when using the valve seat 194') whereat the water supply to the heating unit 160 is halted (or substantially halted). During this operating condition, the residual water remaining within the heating unit 160 is heated further and substantially to 212° F., or, in other words, converted to higher temperature steam. The schematic diagram and related flow chart alternating between longer water heating and shorter steam heating modes are illustrated in FIGS. 50 and 51, as mentioned above. Importantly, during the steam brewing phase, the check valve 164 prevents undesired backflow through the phase control valve 162. The result of heating the water is that the pressure builds along the tubing 212 whereby the coffee or the like is brewed by alternate pulses of a controlled duration of heated water and steam. The overall result is that the coffee or the like is brewed by a higher overall temperature than in comparison with using only heated water, to provide the brewed beverage with an overall higher temperature and enhanced flavor.

The tubing 212 extends from the heating unit 160 within the base 102 to a location above the brew basket 128 (FIGS. 16-18), to preclude risk of siphoning water back from the brew basket 128 to the water reservoir 122. Indeed, by forming and mounting the tubing 212 to extend above the brew basket 128, the water in the tubing 212 is self-leveling with respect to water in the water reservoir 122. That is, with reference to FIG. 18, water poured into the rear reservoir 122 of the brewer 100 self-levels relative to the height of water poured into the reservoir 122 at an equal-height position along the tubing 212. This position in the tubing 212 is generally shown in FIG. 18 by a water level mark 214. In this manner, water spillage is avoided. In other words, before the brewer 100 is switched on, but after the reservoir 122 is filled or partially filled with an appropriate quantity of water, the hydrostatic head through the initially closed phase control valve 162 is sufficient to leak past the valve 162 and self-level within the tubing 212 as shown in FIG. 18.

The brewer 100 further includes a bimetal check switch or thermostat 216, as shown in FIG. 17, coupled to the heating unit 160. The bimetal check switch 216 is designed as a safety shut-off mechanism when the heating unit 160 exceeds some threshold temperature. In this respect, the bimetal check switch 216 is used as a first mechanism to prevent overheating in the heating unit 160 due to excessive temperatures therein. This bimetal switch 216 is, in the preferred form, located beneath the brewer 100 and in proximity to the heating unit 160. When the temperature of the heating unit 160 exceeds a predetermined limit, the check switch 216 functions to shut off electrical power thereto until the temperature therein drops at which point the bimetal switch 216 allows the heating unit 160 to turn back on.

The problem with the switch 216 shutting off electrical power to the heating unit 160 is that the remaining or leftover water remaining in the tubing 212 (e.g., that condenses out from steam) or the reservoir 122 near or at the end of a brew cycle no longer receives heat and is otherwise not expanded or turned into steam and discharged into the brew basket 128, as described above. As a result, coffee grounds that may accumulate around the mesh screens 134 may prevent the efficient drainage of coffee therefrom into the underlying carafe or pot 106.

As such, the brewer 100 preferably includes a solid state relay, such as a TRIAC circuit, that functions as an electronic switching mechanism. In this respect, the TRIAC may be operated by the control circuit 166 (FIG. 50) to modulate the duty cycle of the heating unit 160. That is, once the phase control valve 162 (or another mechanism) senses a low level or no water condition in the water reservoir 122, the control circuit 166 activates the TRIAC to modulate the duty cycle of the heating unit 160 (i.e., reducing the power thereto) to maintain a temperature below the threshold temperature that would otherwise trip the bimetal switch 216 and deactivate the heating unit 160. To this end, the TRIAC can increase or decrease the energy generated by the heating unit 160 in real-time. When the heating unit 160 is in a condition where it is not receiving a full flow of fluid from the now empty or near empty water reservoir 122, the water in and around the heating unit 160 sees an immediate increase in temperature, similar to that of the steam brew cycle. But, in the case of the brewer 100, this increase in heat, without some form of cooling mechanism (e.g., a new flow of water from the reservoir 122), the temperature of the heating unit 160 will rise beyond the predetermined safety threshold that activates the bimetal switch 216, thereby shutting off the heating unit 160. Any remaining water in the tubing 212 or water reservoir 122 must wait for the heating unit 160 to cool down and turn back on before essentially running another steam brew cycle. This can take some time as the pot 106 just above the heating unit 160 now holds a heated quantity of the brewed beverage. Pulsing or regulating the power of the heating unit 160 decreases and preferably eliminates runaway heating that can cause the bimetal switch 216 to turn off the heating unit 160. Additionally, duty cycle regulation with the TRIAC allows the control circuit 166 to manage the heating unit 160 so that the residual water is continuously heated into steam for delivery to the brew basket 128. Injection of steam into the brew basket 128 continues the cyclone-based mixing and serves to scrub and move the coffee grounds away from the mesh screens 134, thereby keeping the coffee grounds from lining and clogging the mesh screens 134 to facilitate faster draining or evacuation of the brewed coffee into the underlying carafe or pot 106. This also can prevent the brewed beverage in the brew basket 128 from rising too high and overflowing. In particular, the TRIAC is able to pulse at a duty cycle or in real-time according to the measured voltage in the system, which inevitably varies in time and depends on the electrical connection. For example, a 100% duty cycle may equal 1500 watt, while a 50% duty cycle may equal 750 watt. When the controller circuitry 166 identifies a state where there is no water remaining in the water reservoir 122, the TRIAC immediately drops the duty cycle of the heating element 160 (e.g., 30%) to maintain steaming any residual water in the brewer 100 without overheating and tripping the bimetal sensor or switch 216. In essence, this feature keeps the jet ports 146, 148 steaming. A light 218 (FIGS. 1-3, 9-10, 12, 21-22, 53-55 and 57), as will be described in more detail below, preferably remains on for approximately 1 minute after the control circuit 166 indicates that the water reservoir 122 is empty, which correlates with emptying the remaining brewed beverage from the basket 128 and (optionally) sounding an end tone.

In an alternative embodiment, the brewer 100 may alternate between the water brew phase and the steam brew phase using only the heating element 160, and without use of the phase control valve 162. In this embodiment, the controller 166 may operate the TRIAC, for example, to regulate the duty cycle of the heating element 160, such that the heating element 160 alternates between the steam and water brewing phases. That is, the TRIAC may operate the heating element 160 at a high duty cycle (e.g., 100% and 1600 watt) during the steam brew phase and a relatively lower duty cycle (e.g., 50% and 800 watt) during the water brew phase. In this example, the energy output by the heating element 160 is able to generate steam for purposes of the steam brew phase when operating at a 100% duty cycle, while the 50% duty cycle only generates enough energy to operate the water brew phase, for the same flow rate of unheated water.

In another alternative embodiment, the heating unit 160 may include multiple heating elements that work separately or in conjunction with each other to alternate between the water and steam brewing phases. In this embodiment, the heating unit 160 may include a first heating element rated at 1200 watt and sufficient to operate the water brew phase. This heating unit 160 may also include a second heating element rated at 400 watt, which, when turned on at the same time as the first heating element (i.e., the 1200 watt example mentioned above), the heating unit 160 has an effective output of 1600 watt, or enough energy to operate the steam brew phase. In an alternative form of this embodiment, the first heating element may be rated at 1600 watts and capable of operating the steam brew phase independently of the second heating element, which simply operates at 1200 watt, or enough energy to operate the water brew phase.

Another advantage of using a TRIAC circuit in connection with the heating unit 160 is to regulate and ensure consistent steam and water brewing cycles during the regular brewing phase (i.e., not necessarily at the end). In this respect, the brewer 100 may be automatically compatible with different voltage sources, which not only obviously vary by country, but may also vary by household depending on the age of the circuits, the wiring, other devices running on the circuit, etc. For example, the United States uses a standard 120 V mains electrical source while other foreign countries use different mains electrical sources, e.g., 220 V in China, 100 V in Japan and 230 V in most European countries. Furthermore, an electrical connection can see voltage variances and may experience interruptions multiple appliances run off a single circuit. To this end, the TRIAC can regulate the duty cycle of the heating unit 160 in real-time to ensure a consistent brewing process, regardless of the input voltage. In particular, the TRIAC may take an initial voltage reading and communicate it to the control circuit 166. Based on this reading, the control circuit 166 may select from one of several pre-programmed brewing cycles separated by voltage intervals (e.g., 100 V-104 V, 105 V-109 V, 110 V-114 V, 115 V-119 V, 120 V-124 V and 125 V-130 V). The selected program is in essence a look-up table that determines the optimal sequence of steam brew and/or water brew cycles or phases, such as the duration and frequency of each cycle or phase. In one example, the TRIAC may maintain a: 100% duty cycle when the measured voltage is 100 V; 60% duty cycle when the measured voltage is 120 V; and 40% duty cycle when the measured voltage is 130 V.

The TRIAC may take various voltage measurements during the course of a brew cycle and update the control circuit 166 accordingly. To this end, the control circuit 166 may change the program mid-brew if the TRIAC measures a significantly different voltage. The TRIAC voltage measurements may be taken at the beginning, when the water in the reservoir 122 is empty or nearly empty, at select intervals during a brew cycle, or in real-time. To this end, the control circuit 166 may include a memory chip or circuit for storing the related program information, which may include different programs for an initial brew cycle, the standard steam/water brew cycles and an end or concluding cycle (e.g., to ensure efficient evacuation of brewed beverage, as mentioned above). The end cycle may also be delayed (e.g., 30 seconds or more depending on the measured voltage) for a predetermined during after a low or no water condition is identified by one of the sensors described herein. Alternatively, once the low or out of water condition is met, the control circuit 166 may delay initiation of the end cycle by some duration (e.g., 1 minute).

Beverage brewed by the brewer 100 flows from the brew basket 128 into the underlying carafe or pot 106 through a stopper valve 220 (FIGS. 19-22 and 24-25) which permits carafe removal to pour out or serve some of the beverage while brewing proceeds. The stopper valve 220 includes a simple spring-loaded valve that closes to accumulate brewed beverage within a brew basket housing chamber 222 for a short duration when the pot 106 is removed from the platen 104. FIGS. 19-22 and 24 show the stopper valve 220 in a closed position drawing a seal member 224 over a flow port 226 (FIGS. 22 and 24-25) through which a stem 228 of the stopper valve 220 protrudes. FIG. 25 shows the stopper valve 220 in an open position wherein a head 230 of the stopper valve 220 is engaged by a hinged lid 232 on the carafe 106 or the like to partially compress a spring 234 and permit beverage down flow through the now-open flow port 226 and through flow ports 236 in the head 230. When the pot 106 is removed, the stopper 220 is configured to close so that hot beverage does not exit the brew basket 128. The mechanical exit valve 220 can be replaced with an electronically controlled valve, such as a solenoid valve, to dispense beverage from the brew basket 128 in response to a user or automatically generated electrical signal, to facilitate filling containers of various sizes.

Figure 20:
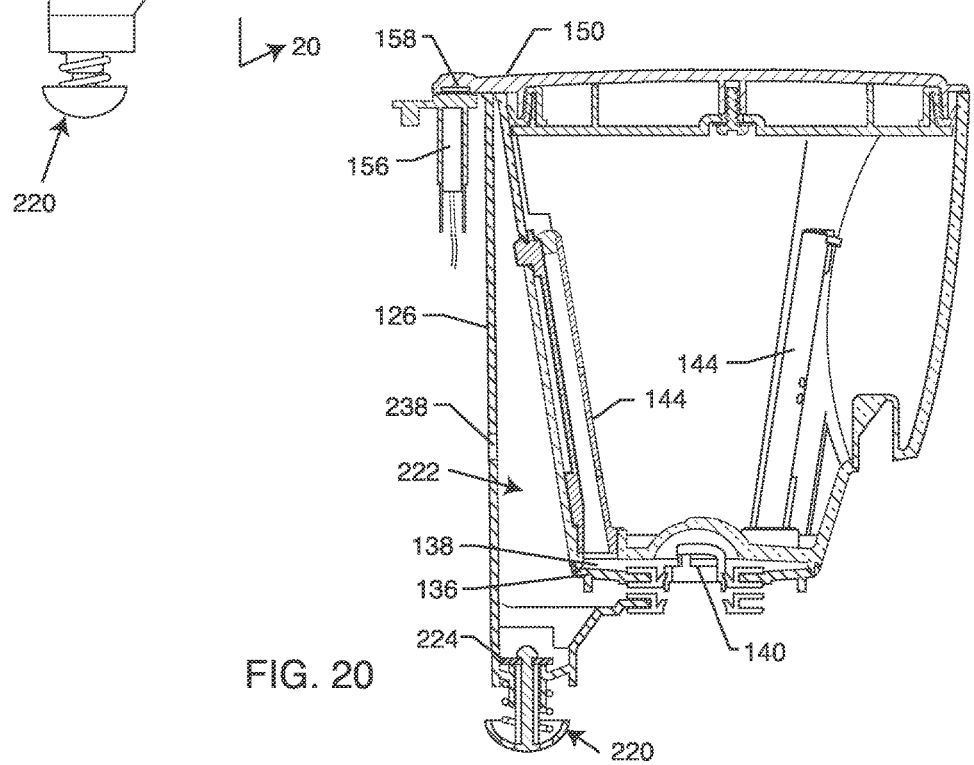
FIG. 20 is a fragmented side elevation view taken generally on the line 20-20 of FIG. 19.
Figure 21:
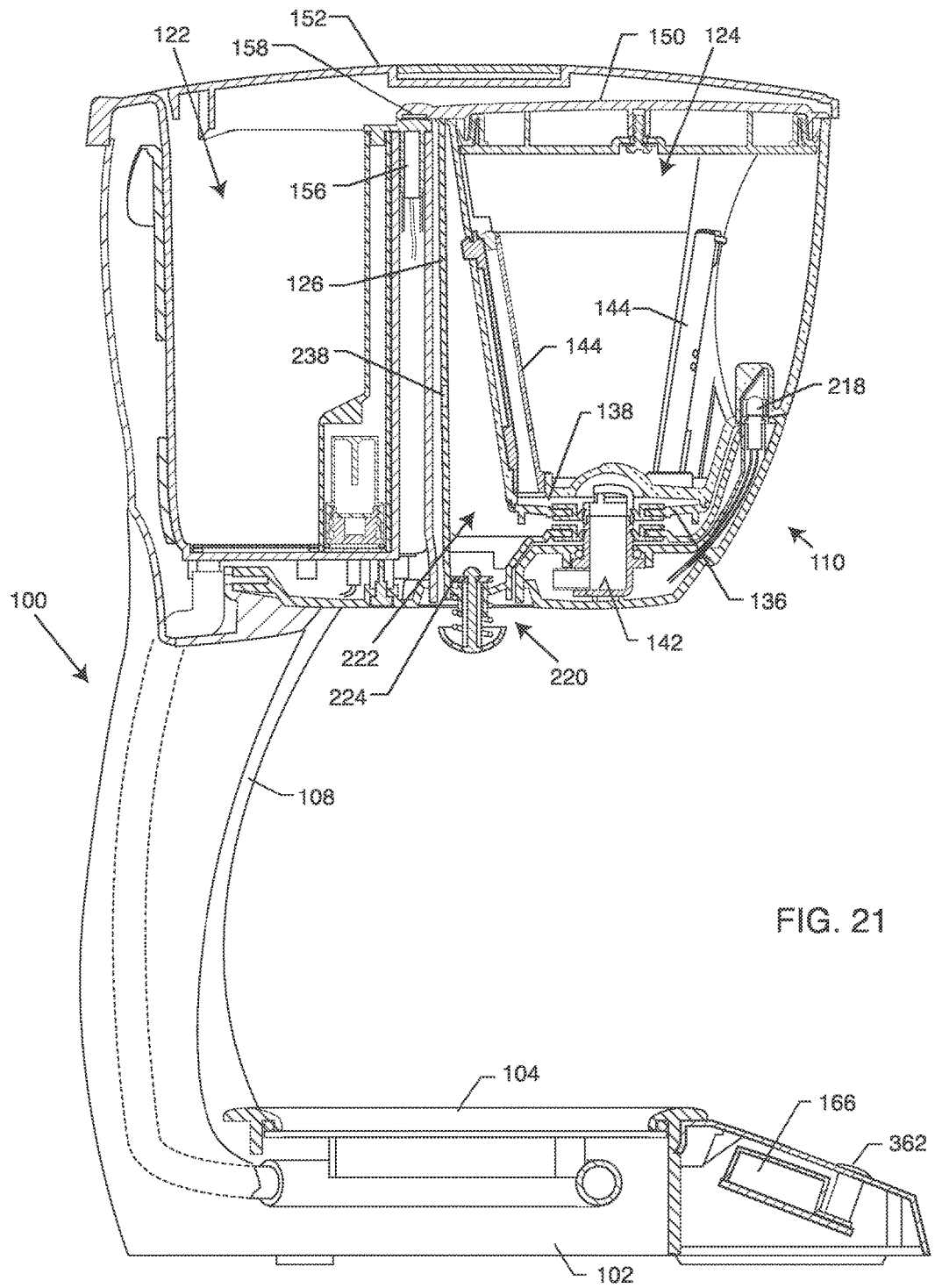
FIG. 21 is a side view of the brewer taken generally on the line 21-21 of FIG. 15.
Figure 29:
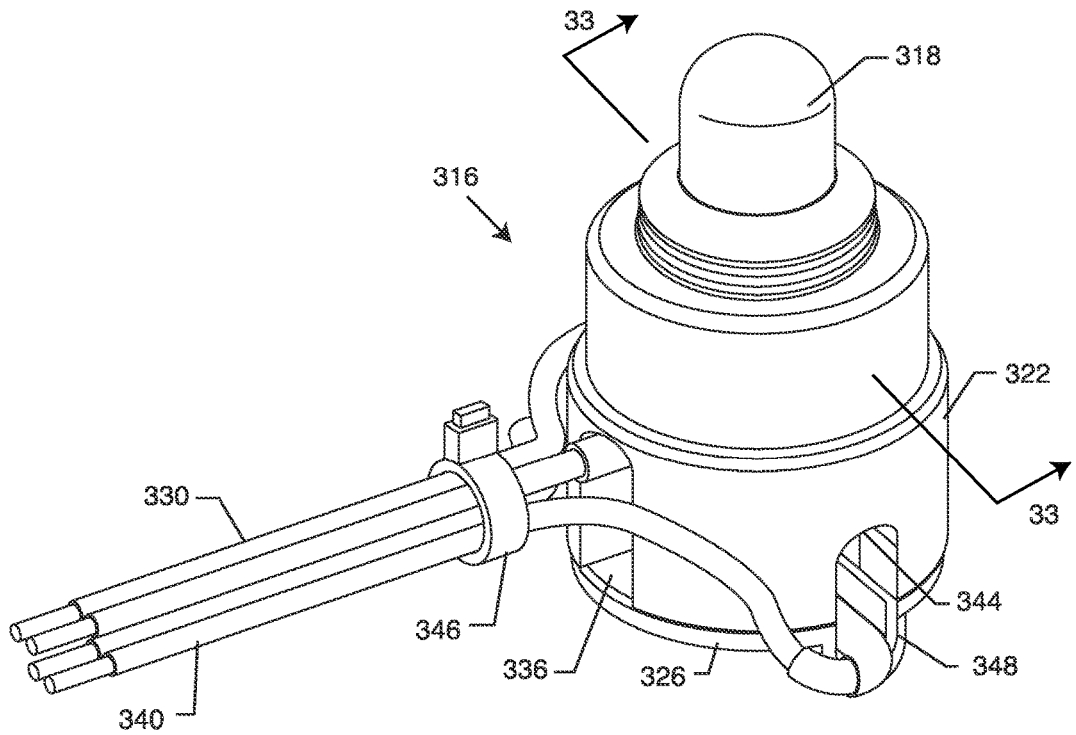
FIG. 29 is a perspective view of an exemplary embodiment of a water level sensor to sense a level of liquid within the reservoir of the brewer, and showing a light emitter protruding from a sensor housing.
Figure 30:
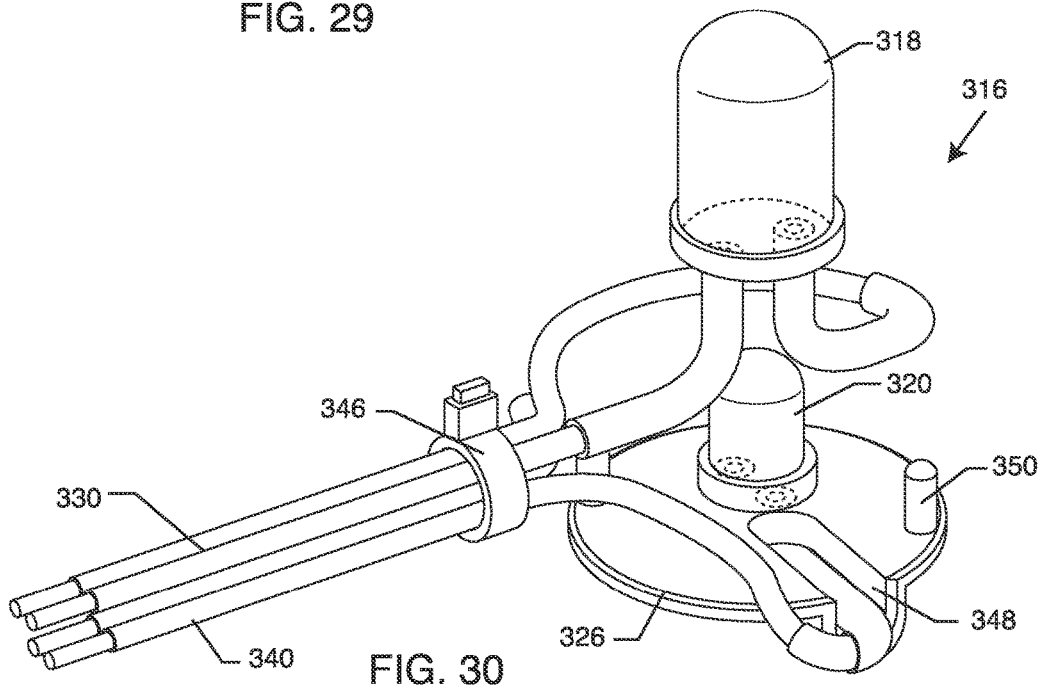
FIG. 30 is a perspective view of the liquid level sensor of FIG. 29, but with the sensor housing removed to show a light detector disposed below a light emitter.
Figure 31:
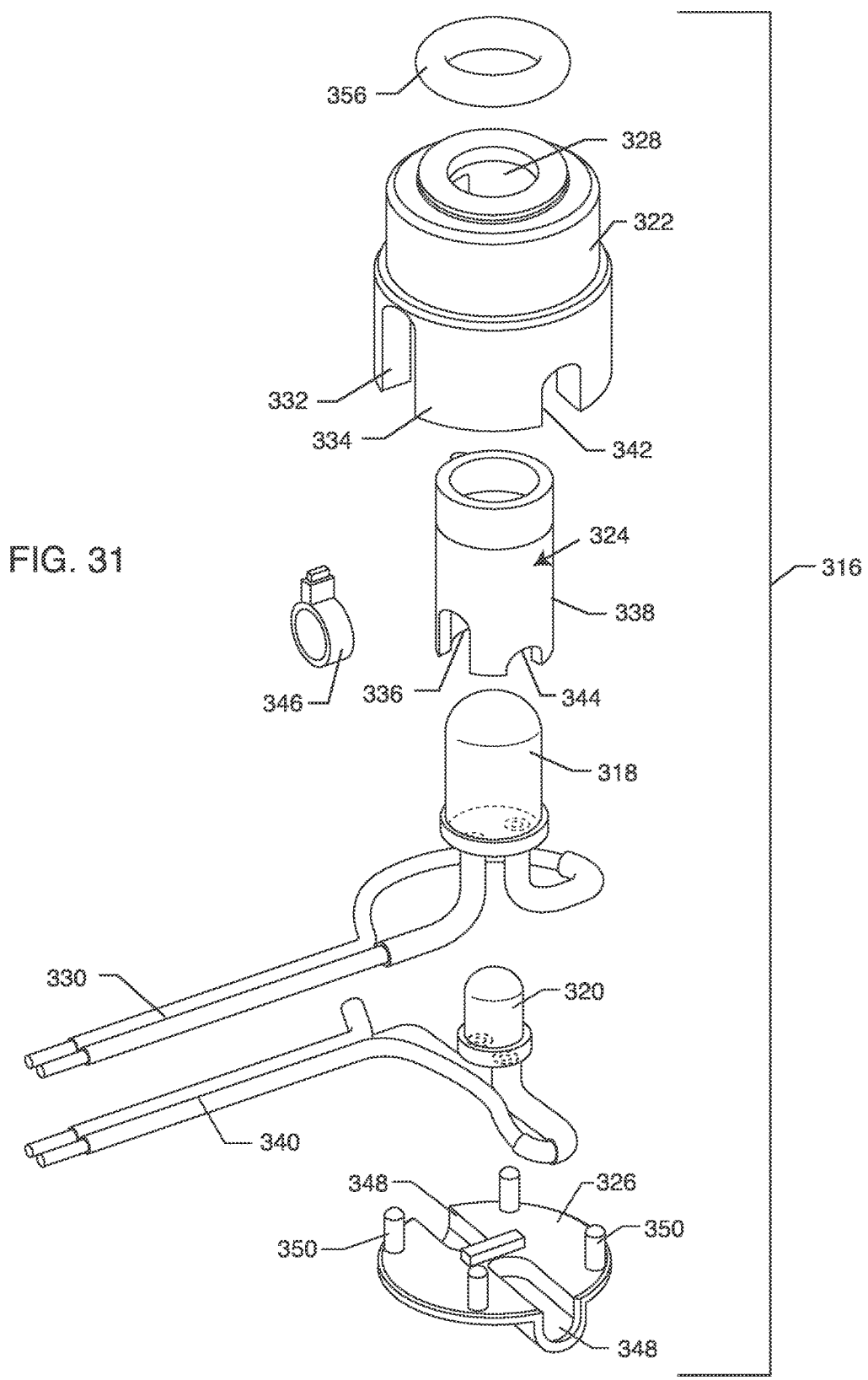
FIG. 31 is an exploded perspective view of the liquid level sensor of FIG. 29.
Figure 32:
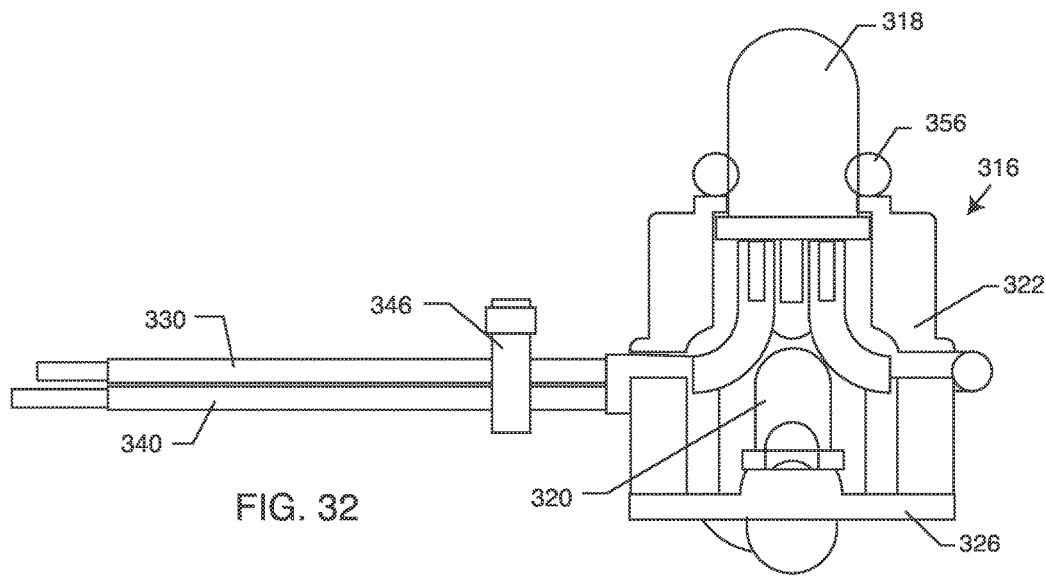
FIG. 32 is a side elevation view of the liquid level sensor of FIG. 29.

The brew basket housing 126 further includes a vent 238, as shown in FIGS. 20-22, that prevents accumulated brewed beverage in the brew basket housing chamber 222 from overflowing out from the front (or other parts) of the brewer head 110. As mentioned above, the brew basket housing chamber 222 will fill with brewed beverage when the stopped valve 220 closes. The beverage level will rise in this chamber 222 until it reaches the vent 238 at which point beverage exits the brew basket housing 126 through the vent 238 and into the upwardly open cavity 124 to the front of the inner wall 120 shown in FIG. 3. Preferably, the vent 238 is positioned below the other openings or cutouts in the brew basket housing 126 so that accumulated beverage in the brew basket housing chamber 222 first exits the vent 238.

Another feature of the brewer 100 is a reinforcing band or badge 240 as shown in FIGS. 1-3, 26-27, 54-55 and 57. As shown, the reinforcing band 240 is preferably an arcuate shaped plastic component having multiple rearward-facing detents 242 for snap-fit reception or assembly with the brewer head 110, in a position underlying and reinforcing the brewer head bowl 114 in the frontal region adjacent an arcuate cut-out 244 through which an illumination window 246 of the brew basket 128 is fitted. The reinforcing band 240 beneficially reinforces the arcuate cut-out 244 of the molded plastic brewer head bowl 114 in a manner giving relative longevity to the brew basket 128 and the illuminated window 246 thereof. Mating detents 248 are formed on the bowl of the brewer head bowl 114 for receiving the detents 242 on the reinforcing band 240.

FIGS. 56-61 illustrate the use of a single serving cup 250 (FIG. 58), such as a K-Cup® manufactured by Keurig Incorporated of 55 Walkers Brook Drive, Reading, Mass. 01867, for use with an adapter 252 compatible with the brewer 100. More specifically, the adapter 252 is configured to receive the single serving cup 252 of coffee or the like in the form of a small plastic cup or the like (FIGS. 58-62). In this embodiment, the adapter 252 generally comprises an upper unit half 254 and a lower unit half 256 removably interconnected to one another as by a set of complementary upper and lower magnets 258, 260 or the like. Rotating the upper and lower unit halves 254, 256 in opposition directions (e.g., clockwise and counter-clockwise) about their center axes displaces alignment of the magnets 258, 260 for purposes of disengagement. That is, when rotated, the magnets 258, 260 no longer align and may provide weak or no attraction, which allows the unit halves 254, 256 to be quickly and easily separated. Alternatively, the unit halves 254, 256 may further include a second set of magnets that repel magnets 258, 260 when in the rotated or offset position so that the upper unit half 254 is pushed away from the lower unit half 256, thereby facilitating pop-off disengagement.

The upper unit half 246 includes a flange 262 extending axially into engagement with a mating shoulder 264 on the other lower unit half 256, when the magnets 258, 260 are engaged. The unit halves 254, 256 cooperatively define an internal chamber 266 to receive and support the single serving cup 250 or the like, with an upper hollow barb 268 and a lower hollow barb 270, on respective upper and lower unit halves 254, 256, that pierce the top and bottom, respectively, of the single serving cup 250. Importantly, the lower unit half 256 includes an axial port 272 having an aperture 274 therein providing a conduit between the interior of the upper hollow barb 268 and the water and steam flow from the upwardly projecting feed port 142. The upper unit half 254 includes a radial port 276 communicating with the interior of the lower hollow barb 270 thereon to accommodate outflow of the brewed beverage from the adapter 252 to the stopper valve 220, when the adapter 252 is placed into the beverage-making chamber or open cavity 124, as shown in phantom in FIG. 57. A rim 278 of the single serving cup 250 may sit on the flange 262 of the upper unit half 254 to be wedged therebetween when connected to the lower unit half 256 to secure the single serving cup 250 within the adapter 252 during a brew cycle.

Further to this embodiment, the lower unit half 256 may include one or more external magnets that correspond with one or more oppositely charged magnets within the brew basket housing 126 or the bottom wall 118 of the brewer head 110 to more securely seat the adapter 252 therein. Here, the adapter 252 is preferably rotated concentrically about its center axis to displace alignment of the magnets for purposes of disengagement. When rotated, the magnets are no longer aligned and may provide weak or no attraction, which allows quick and easy removal of the adapter 252. Alternatively, the brew basket housing 126 or the bottom wall 118 of the brewer head 110 may have additional offset magnets that repel the external magnets on lower unit half 256 when in this rotated position, thereby pushing the adapter 252 away from seated engagement therewith. In this respect, the brewer 100 may include a keyed engagement platform (not shown) to guide engagement and/or disengagement so that the adapter 252 is not accidentally displaced vertically when still attached to the brewer 100 by the magnets. In an alternative embodiment, the adapter 252 may screw into the brew basket housing 126 or the bottom wall 118 of the brewer head 110 to provide secure attachment thereto during a brew cycle. Beverage brewing, albeit a single cup, proceeds in the same manner as described herein, with only a single cup of water being added or consumed from the reservoir 122. More specifically as shown in FIG. 61, a rush of hot water or steam is delivered to the adapter 252 through the feed port 142 extending into the lower unit half 256 through the axial port 272 and the aperture 274. The upper hollow barb 268 has pierced the top of the single serving cup 250 to permit heated water flow therein to intermix with coffee within the cup 250 as shown in FIG. 61. Brewed beverage exist the cup 250 by way of the lower hollow barb 270, which has pieced the bottom of the single serving cup 250 as shown. Accordingly, brewed beverage travels through a conduit 280 in the lower unit half 254 to the radial port 276 for delivery to the carafe or pot 106 by way of the stopper valve 220.

The general operation of the brewer 100 typically first requires filling the brew basket 128 with coffee grounds, or the like, and the reservoir 122 with water. Water from the reservoir 122 may leak through the phase control valve 162 (e.g., by way of the trough 198 shown in FIGS. 35 and 41) and the associated check valve 164 to prime the brewer 100 (e.g., as shown in FIG. 18). Alternatively (e.g., when using the valve seat 194 without the trough 198) or in addition to, the phase control valve 162 may be turned "on" to open the solenoid plunger 174 for typically 2-8 seconds to ensure pre-filling of the tubing 212 to the point show in FIG. 18. In another alternative condition, the phase control valve 162 may simply be initially open such that water from the reservoir 122 is allow to pass through the phase control valve 162 and the check valve 164 to establish the initial static state shown in FIG. 18, and as known with conventional brewers. When the heater 160 is first initiated, this initial slug or mass of water is heated and flows through the tubing 212 into the brew basket 128 at a selected temperature above ambient, for example about 195-205° F. The phase control valve 162 is then moved to the closed position. When the valve 162 is closed, water within the heating unit 160 is heated, and the resultant heated water is injected through the tubing 212 into the brew basket 128. The peak pressure within the tubing 212, in combination with the starvation of the heating unit 160 from receiving fresh water, results in a pulse of steam generated by the heating unit 160 and delivered to the brew basket 128 at a higher temperature of about 212° F. This is followed in turn by re-opening the phase control valve 162 and resumption of water flow to the heating unit 160. The overall temperature of the water delivered to the brew basket 128 is thus increased to result in an overall improvement in the brewed beverage. An end tone may be sounded by the brewer 100 when the water reservoir 122 is in an empty state and the brew cycle has finished in its entirety.

In another aspect of the brewer 100, the control circuit 166 may monitor the water level in the reservoir 122, and in particular when the reservoir 122 is empty. In one embodiment, reservoir monitoring occurs through use of the solenoid valve 168. Here, the armature/plunger 174 experiences turbulence along its outer surface area as a result of water rushing by during the water brew cycles. Turbulence through the solenoid valve 168 indicates that the valve 168 is open and allowing water to flow from the water reservoir 122 to the heating unit 160. By contrast, laminar flow or the absence of flow through the solenoid valve 168 is associated with the closed position (or partially open, depending upon the use of the valve seat 194 or the valve seat 194') of the solenoid plunger 174. In the normal static or off position, the plunger 174 is seated within the solenoid valve 168 to completely or substantially prevent flow out from the water reservoir 122. When the brewer 100 is activated, energy is delivered to the solenoid 168, which causes the plunger to unseat, thereby allowing water to flow from the water reservoir 122 and through the phase control valve 162. The water rushing past the plunger 174 places a downward pressure thereon, thereby causing the plunger 174 to move or modulate within the solenoid 168. That is, the downwardly flowing water from the reservoir 122 attempts to displace the plunger 174 downwardly, while the magnetic force of the energized coils 170 counter this downward force and, instead, attempt to reposition the plunger 174 upwardly within the middle portion 190. This movement of the plunger 174 within the solenoid 168 generates readable electrical signals as a result of disruptions in the electrical field therein due to movement of the plunger 174. Specifically, such movement within the solenoid valve 168 generates current spikes when the plunger 174 moves within the magnetic field. The magnetic field, of course, generally resists movement of the plunger 174 therein. These current spikes are preferably monitored by the control circuit 166 of the brewer 100. In this respect, as the brewer 100 alternates between steam brew and water brew cycles, the internal circuitry periodically sees current spikes as a result of the plunger 174 moving within the solenoid 168 as a fresh flow of water dispenses from the water reservoir 122 to the heating element 160 during the water brew cycle. When the water reservoir 122 empties, the control circuit 166 stops seeing current spikes as new water is no longer passing through the solenoid valve 168 to cause the aforementioned magnetic disruptions through movement of the plunger 174 that cause the measurable current pulses. At this point, the control circuit 166 knows the water reservoir 122 is out of water.

Figure 11:
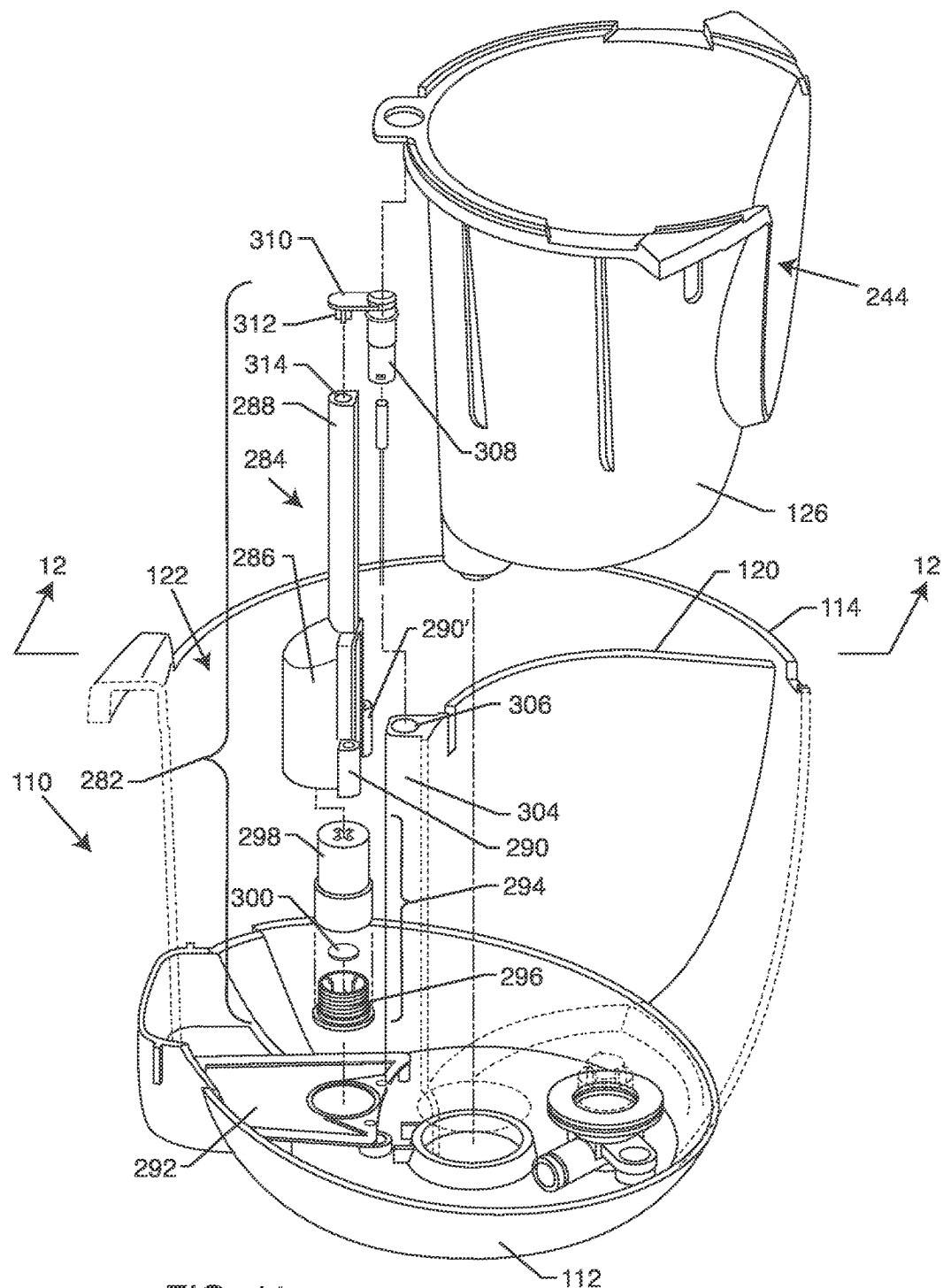
FIG. 11 is a partial cut-away exploded perspective view of the brewer head incorporating a float sensor rear mounted to an inner wall of the brewer head bowl and disposed within the water reservoir for monitoring a low water or no water condition therein.
Figure 12:
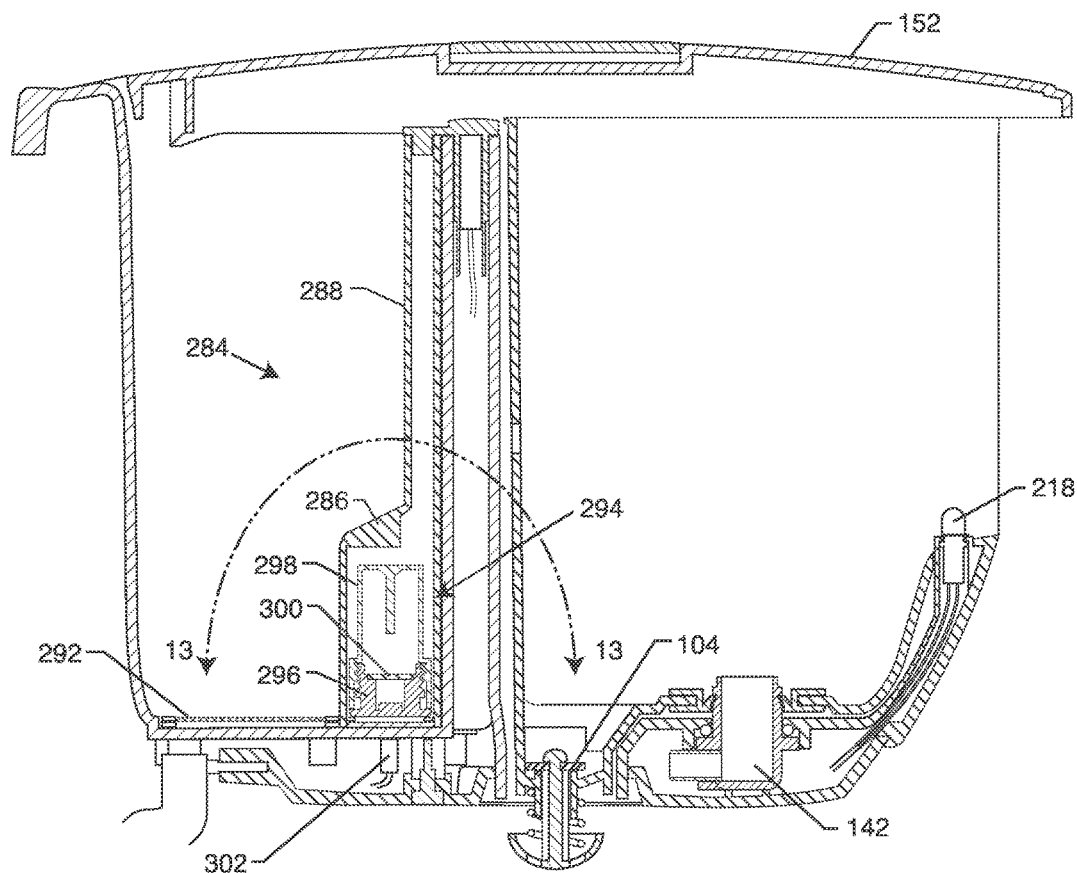
FIG. 12 is a cross-sectional view of the brewer head taken about the line 12-12 in FIG. 11, illustrating the float sensor in a first position wherein an activation disk engages or trips a sensor or reed switch when the water reservoir is empty.
Figure 13:
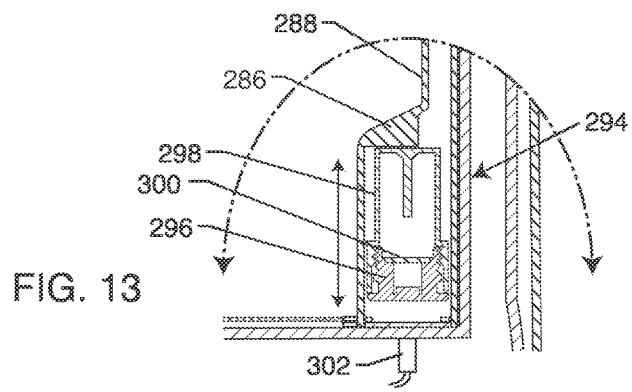
FIG. 13 is an enlarged cross-sectional view of the float sensor taken about the circle 13-13 of FIG. 12, further illustrating the float sensor in a second position wherein the activation disk is disengaged from the sensor or reed switch to indicate a sufficient quantity of water in the reservoir.
Figure 14:
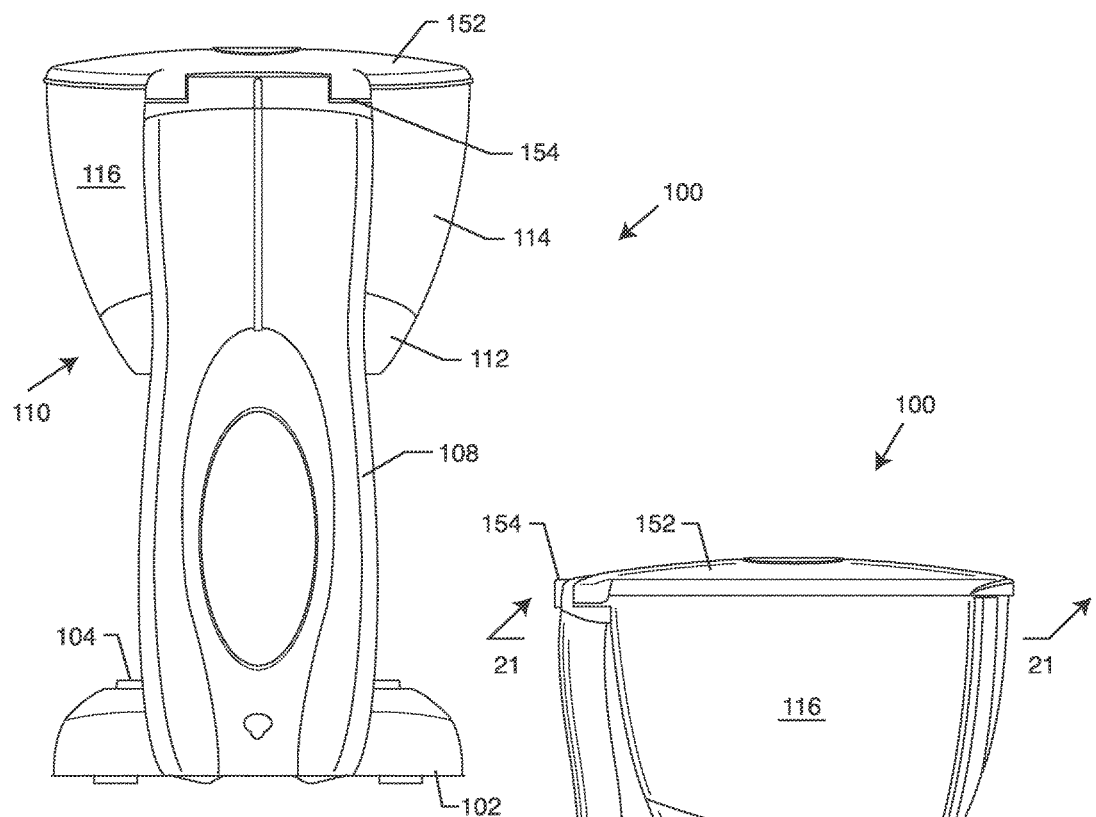
FIG. 14 is a rear elevation view of the brewer.
Figure 15:
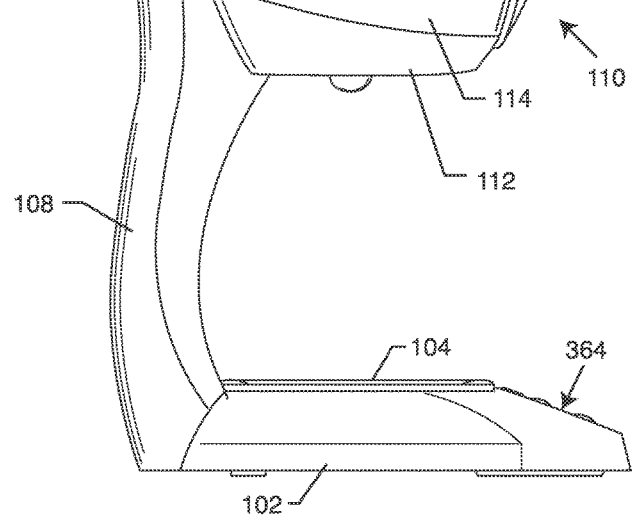
FIG. 15 is a side elevation view of the brewer.

In an alternative embodiment, the brewer 100 may track the water level in the reservoir 122 through use of a float sensor 282, as shown in FIGS. 11-13. Here, the float sensor 282 includes a housing 284 having an enlarged bottom float chamber 286 and a relatively streamlined upstanding vertical vent 288 fluidly coupled to and extending outwardly from the float chamber 286. The float chamber 286 generally includes a pair of securement legs 290, 290' flanking each side of the chamber 286 and having a mechanism for connecting the housing 284 to a base 292 of the reservoir 122, such as by a screw, bolt or the like. The securement legs 290, 290' preferably extend somewhat below the bottom of the float chamber 286 to prop the float chamber 286 above a base 292 of the brewer reservoir 122 to expose a buoyant float 294 to the water in the reservoir 122. The buoyant float 294 generally includes a threaded bottom or base 296 configured to threadingly engage a reciprocally threaded hat or cap 298 that, when assembled, sandwiches a magnetic or metal activation disk 300 therebetween. As shown in FIG. 12, the float 294 generally resides within the interior of the float chamber 286 with at least some clearance between the top of the cap 298 and the section of the housing 284 that tapers from the relatively larger float chamber 286 to the narrower upstanding or vertical vent 288. This clearance permits the float 294 to move vertically within the housing 286 as generally shown by the directional arrows in FIG. 13. A sensor 302, such as a reed switch or the like is positioned underneath the base 292 and aligned with the float 294 and designed to identify whether or not the reservoir 122 has water, or is substantially or completely empty.

The housing 284 attaches to the inner wall 120 of the brewer head bowl 114 about an elongated rib 304 shown in FIG. 11. Notably, the rib 304 includes a slot 306 that receives a generally cylindrical stud 308 having a retaining arm 310 extending outwardly therefrom and generally aligned with the top of the vent 288. In this respect, the retaining arm 310 includes a downwardly projecting and generally x-shaped offset 312 that slidably engages an elongated vertical vent shaft formed within the vent 288 and fluidly coupled to the float chamber 286. The x-shaped offset 312 opens the interior of the float sensor 282 to ambient air pressure to permit the ingress and egress of water and/or air without creating a vacuum or other undesirable suction therein. The x-shaped offset 312 also cooperates with the securement legs 290 to vertically and horizontally align the float sensor 282 within the reservoir 122.

In operation, initially before the reservoir 122 is filled with water, the float sensor 282 is in the static position generally shown in FIG. 12 wherein the float 294 sits on the base 292 of the brewer head bowl 114. Here, the activation disk 300 is proximate to the sensor 302 such that the sensor 302 generates an activation signal, i.e. that the reservoir 122 is in a low water or no water condition. This information may be relayed to the control circuit 166 as generally shown in FIG. 50. When the reservoir 122 fills with water, water enters into the float chamber 286 underneath the housing 284 as a result of the float chamber 286 being offset from the base 292 by the securement legs 292, thereby causing the substantially buoyant float 294 to rise within the chamber 286 to the position shown in FIG. 13. Air within the float chamber 286 and/or within the vent 288 is pushed out of the housing 284 through the vented shaft 314 as water is poured into the reservoir 122. When a predetermined amount of water fills the reservoir 122, the float 294 rises within the float chamber 286 to the position shown generally in FIG. 13. Here, the activation disk 300 pulls away from the sensor 302, thereby causing the sensor 302 to deactivate as it is no longer within sensing range. Again, this information may be relayed to the control circuit 166 of the brewer 100 as shown generally in FIG. 50 to indicate a state wherein the reservoir 122 is in an at least partially filled or full state. In this state, the brewer 100 may proceed to brew beverage as described herein. When this occurs, water is drained from the reservoir 122. Eventually, the water level will drop low enough that the buoyant float 294 starts to descend downwardly within the float chamber 286 toward the base 292, and eventually to the position shown in FIG. 12. When the float 294 drops far enough, the sensor 302 reactivates by again sensing the presence or proximity of the activation disk 300. At this stage, the sensor 302 may relay to the control circuit 166 that the reservoir 122 is in a low or empty state and the control circuit 166 may transition the brewer 100 to an end cycle or stop the brew cycle altogether.

The brewer 100 as shown and described herein may also include other types of water level sensors, such as a light sensor 316, as illustrated in FIGS. 29-33. The light sensor 316 can generate a signal or value based upon an amount of detected light. More specifically, the light sensor 316 can include a light emitter 318 positioned to emit light into the reservoir 122 and, depending upon how much water is in the reservoir 122, below the water level therein. A light detector 320 is positioned to detect reflected light emitted by the light emitter 318 and may send a value to the control circuit 166 that corresponds to the amount of detected light. The light emitter 318 can be of the type LTE-4208, available from Lite-On Technology Corp. of Taipei, Taiwan. The light detector 320 can be of the phototransistor type WP3DP3BT available from Kingbright Elec. Co., Ltd. of Taipei, Taiwan. Although, other emitters and detectors may be suitable for use with the brewer 100.

The amount of light detected by the light detector 320 can vary depending upon the water level. For example, if there is little or no water above the light emitter 318, then there may be a larger amount of reflected light detected by the light detector 320. If there is a full or nearly full reservoir 122, there may be a comparatively smaller amount of reflected light detected by the light detector 320. Different values or signals can be sent from the light detector 320 to the control circuit 166 depending upon the amount of light detected by the light detector 320. Usually, the more water above the light sensor 316, the more light emitted from the light emitter 318 is absorbed or refracted, resulting in less light being received from the light emitter 318 by the light detector 320. The control circuit 166 can use that value or signal to determine which one of a plurality of different programs to select. A sensed lower or low liquid level can result in a different program tailored for heating a smaller volume of water as compared to a program tailored for heating a larger volume of water. The program can include different pre-heat times, post-brew heating operation, and/or different timings of the phase control valve 162.

Figure 49:
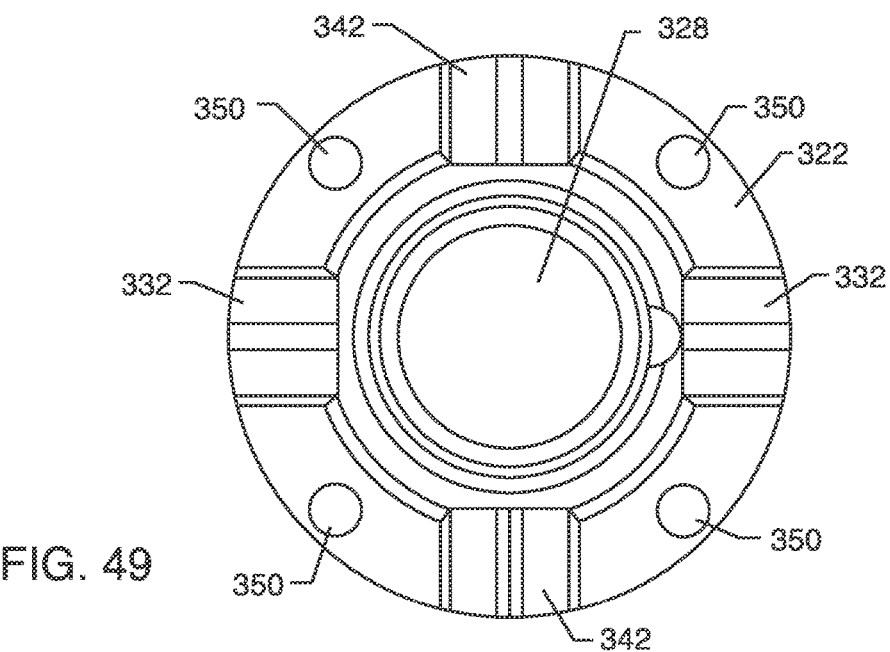
FIG. 49 is a bottom plan view of the housing of the liquid level sensor of FIG. 29.

With respect to the details of the light sensor 316, the light emitter 318 and the light detector 320 are preferably stacked within a common assembly, such as illustrated in FIGS. 29-33. The common assembly includes an annular housing 322, an inner, annular sleeve 324 and a bottom closure 326. The light emitter 318 has a lens configured to protrude into and out from an upper opening 328 of the annular housing 322. The light emitter 318 is supported in an elevated position above the bottom closure 326 by the annular sleeve 324. Disposed directly below the light emitter 318 is the light detector 320. The bottom closure 326 is attached to the bottom of the annular housing 322, and supports the bottoms of the light detector 320 and the sleeve 324. A set of wires 330 for the light emitter 318 extend a through a pair of slotted openings 332 (one slot shown in FIG. 31) in a sidewall 334 of the housing 322 and extend through a pair of slotted openings 336 (again, one slot shown in FIG. 31) in a sidewall 338 of the sleeve 324. Similarly, a set of wires 340 extend through a pair of slotted openings 342 in the sidewall 334 of the housing 322 and extend through aligned slotted openings 344 in the sidewall 338 of the annular sleeve 324. Each of the wires of the wirings 330 and 340 preferably, though not necessarily, extend through a different one of the slotted openings 332, 336, 342 or 344. Thus, when each wiring 330, 340 includes two wires, there can be four slotted openings in each of the annular housing 322 and the annular sleeve 324. A clip or tie 346 can be used to join the wirings 330, 340 together for ease of assembly. The bottom closure 326 can include a pair of troughs 348 for the wires or wirings 330, 340. The bottom closure 326 can also include a pair of upstanding pegs 350, illustrated in FIGS. 30-31, for insertion into a series of mating holes 352 in the sidewall 334 of the annular housing 322 (shown in the bottom plan view in FIG. 49) to assist in positioning and joining the bottom closure 326 to the annular housing 322. The annular housing 322 and the bottom closure 326 are preferably opaque, such as formed from black or other dark plastic, while the sleeve 324 is preferably transparent.

Figure 33:
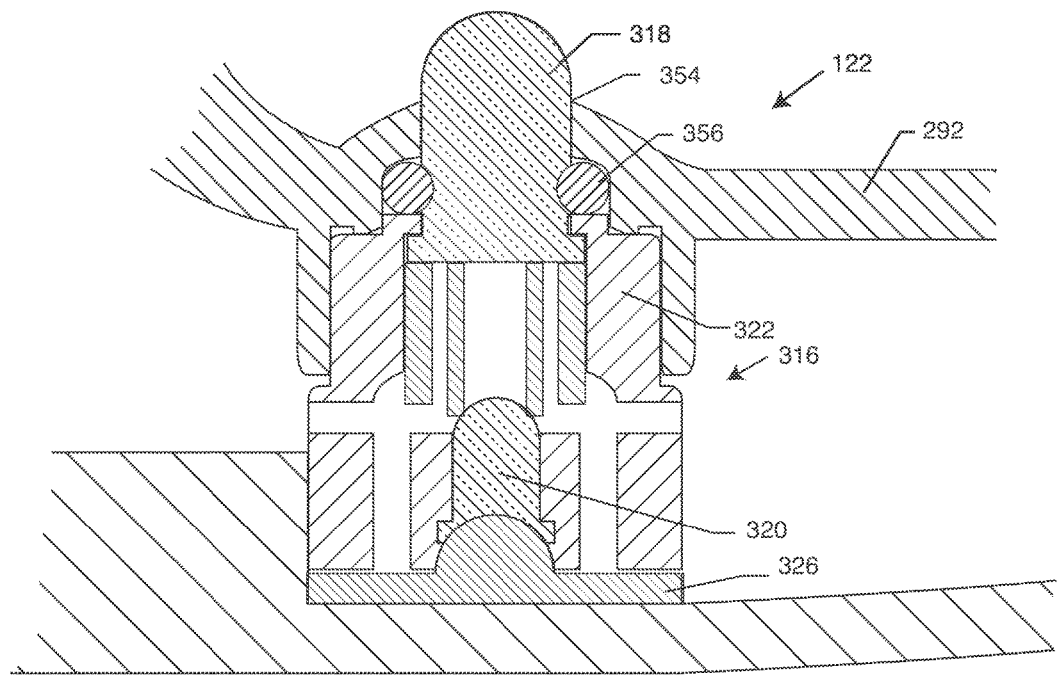
FIG. 33 is a vertical cross section of the liquid level sensor, taken generally on the line 33-33 of FIG. 29.

The light sensor 316 can be positioned such that the light emitter 318 extends partially into the reservoir 122, as illustrated in FIG. 33. More specifically, the base 292 of the reservoir 122 can have an opening 354 sized to receive the light emitter 318. An O-ring 356 surrounding the lower portion of the light emitter 318 can be positioned between the underside of the base 292 of the reservoir 122 and the upper end of the housing 322 to form a seal to prevent or restrict leakage from the reservoir 122. Although a lens is described and illustrated, any suitable transparent or partially transparent material such a sheet or other planar arrangement can be disposed between the light emitter 318 and the reservoir 122. The material functions to both allow some light to pass through as well as reflect light and allow reflected light to pass back to the light detector 320.

Figures 48A, 48B, 48C:
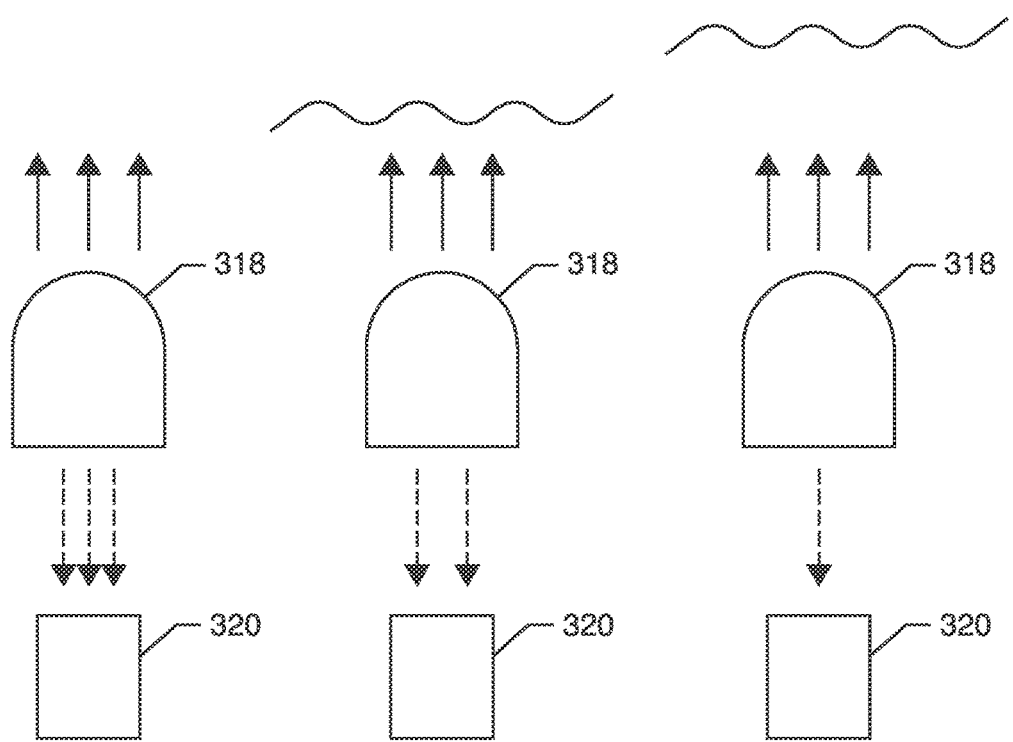
FIGS. 48A, 48B, and 48C are somewhat schematic views showing use of a water level sensor in different conditions of operation.

The light emitter 318 can be an infrared light emitting diode (LED) and the control circuit 166 can send a voltage to the LED to cause the LED to emit light through a light emitter circuit. The light detector 320 is preferably a photo-sensitive transistor. The greater the amount of detected light, the greater the conductivity through the photo-sensitive transistor and/or the light detector circuit. The control circuit 166 can analyze the readings obtained from the detector 320 to determine variations in conductivity and to use the sensed amount of conductivity (also referred to as a signal or value) to select one of several predetermined programs or functions to operate the brewer 100. Separate resistors can be associated with the LED and/or the photo-sensitive transistor to limit current flow. The LED and photo-sensitive transistor can always be supplied with voltage when the brewer is powered on, or can be selectively supplied with voltage according to parameters set by the control circuit 166. For example, the control circuit 166 may determine that the brewer 100 is in a first condition where there is no water in the reservoir 122. This condition is illustrated schematically in FIG. 48A. Here, a relatively large amount of light emitted by the light emitter or LED 318 is reflected by the light emitter 318 back toward the light detector or photo-sensitive transistor 320, as designated by the equal number of arrows emitting from the light emitter 318 and directed toward the detector 320. In this condition, the control circuit 166 can determine that the voltage difference between the light emitter circuit and the light detector circuit is nearly zero. In a second condition as shown schematically in FIG. 48B, about 0.5 inches of water is present in the reservoir 122 above the light sensor 316. Here, most, but not all of the light emitted by the light emitter or LED 318 is reflected back to the light detector or photo-sensitive transistor 320, as represented generally by the relatively fewer arrows directed back to the detector 320 compared to those emitted by the light emitter 318. In this condition, the control circuit 166 is able to determine that there is a voltage difference between the light emitter circuit and the light detector circuit, and certainly more than in the first condition or state shown in FIG. 48A. A third condition or state is shown schematically in FIG. 48C, wherein the reservoir 122 includes at least 1.5 inches of water above the light sensor 316. Here, only a small amount of the light emitted by the light emitter or LED 160 returns back to the light detector or photo-sensitive transistor 320 as compared to the conditions shown in FIGS. 48A and 48B. Again, the control circuit 166 is able to determine that the voltage difference between the light emitter circuit and the light detector circuit readings varies more than the conditions shown in FIGS. 48A and 48B. In this respect, the control circuit 166 may be able to ascertain the amount of fluid within the reservoir 122 at any given point in time as a result of the difference in these readings. In essence, lower refractive losses occur at the LED/air interface as compared to the losses at the LED/water interface because the refractive index of air is lower than the material used in the LED lens of the emitter 318. The refractive index of water is much higher than the material used in the LED lens. Thus, additional reflection and refraction occurs at the water/air interface when the LED is covered with water. Higher water levels cause increased attenuation of these reflections, which allows the control circuit 166 to use the voltage differences between the circuits to determine the water level and to select various programs to operate the brewer 100.

As described above, the solenoid valve 168, the optical detector 200, the float sensor 282, and the light sensor 316 can be used to determine a predetermined low (e.g., ¾ inch) or no water level in the water reservoir 122. When the low or no water level is identified, the control circuit 166 may look up a near end of brewing cycle program stored in a memory chip (e.g., a non-volatile memory chip) to control the phase control valve 162 to provide the most expedient emptying of the brew basket 128 now that the water reservoir 122 is at a low or no water state (i.e., the near end of the brew cycle). At this point, the control circuit 166 may read the current inline brewer voltage and look up another operating program for the end of brewing cycle based on that voltage, as described herein. In a preferred embodiment, the near end of brew sequence may include a different program that alternates between the water and stream brew phases more quickly to keep the bimetal switch 216 from deactivating the heating unit 160 so that the remaining water is used to rapidly evacuate the brew basket 128 into the pot 106. Additionally, the control circuit 166 may turn off the light 218 and activate an audible downtown indicating the end of the brew cycle. Furthermore, the control circuit 166 may track the time from the start of the brew cycle until the low or no water level is detected by the solenoid valve 168, the optical detector 200, the float sensor 282, and/or the light sensor 316, as described herein, to determine the number of cups brewed. In this respect, the duration between the initiation of the brew cycle and when the solenoid valve 168, the optical detector 200, the float sensor 282, and/or the light sensor 316 detects the low or no water level will be shorter for fewer cups brewer (e.g., five minutes for four cups) and longer for more cups (e.g., seven minutes for eight cups). The brew time may also depend on the brewer inline voltage. Additionally, the control circuit 166 may also prevent a user from setting a delayed brew feature when the brewer 100 is in a low or no water state. To this end, the brewer 100 may provide a visual or audible signal when the reservoir 122 has no or little water.

One of the programs that operate the brewer 100 can facilitate the starting and stopping of the brewing cycle. In essence, such a program can "stop" or "pause" the brew cycle and then subsequently reinitiate the program from the stopping point to finish the brew cycle. Such a program can be useful if certain conditions occur where continued brewing may not be desirable. For example, if the brew basket lid 150 or the water reservoir lid 152 open before or during a brew cycle, ambient external light entering the water reservoir 122 can inadvertently expose the liquid level sensor 316 to additional ambient light, which can saturate the light detector 320 to a maximum voltage or voltage differential. This can cause the sensor 316 to mistakenly sense that the water in the reservoir 122 is at or below a certain level. When such a circumstance occurs, the control circuit 166 can, based on the signal from the detector 320 cause an indicator to illuminate prompting a user to close the lid 150 or 152. For example, a "Shut Top" or other such text-based message can be displayed on an LCD screen 358 (FIGS. 1-3 and 9-10). The current program can stop or pause and, if paused, resume when the sensed condition is no longer present.

In addition to an increase in light in the water reservoir 122 due to the lid 152 being opened, another circumstance where the light sensor 316 may output an incorrect signal is when the brewer 100 is bumped or jostled, causing a wave in the reservoir 122. Here, the light sensor 316 can output a signal indicative of a first liquid level, then, as the water level changes in the water reservoir 122, the light sensor 316 may read a second signal indicative of a second and different liquid level. This sequence could continue in rapid succession until the water in the water in the reservoir 122 stops moving back and forth. The control circuit 166 can be adapted to sense such conditions and ignore the signals or switch to a different program. For example, the control circuit 166 could be set to ignore the signals if a certain number of fluctuations are read by the control circuit 166 within a certain predetermined period or sequence.

In another feature of the brewer 100, the control circuit 166 may regulate the operation of the heating unit 160 based on readings from the light sensor 316. For example, the control circuit 166 may regulate the power delivered to the heating unit 160, or the control circuit 166 may selectively turn the heating unit 160 "on" and "off" during the course of a brew cycle, depending on the amount of water in the reservoir 122 measured by the light sensor 316. Additionally, the light sensor 316 may be used to determine various water levels or simply whether the reservoir 122 has water or is empty. For example, if there is an insufficient amount of water in the reservoir 122 (e.g., an empty or nearly empty state), the control circuit 166 may activate and deactivate the heating unit 160 for purposes of heating the platen 104 only to keep the dispensed beverage warm after the brew cycle is completed.

Notably, the light sensor 316 can be adapted for uses other than with the brewer 100. For example, the sensor 316 can be used in other environments, such as washing machines. Moreover, the light sensor 316 can be calibrated to be reactive to materials in water as opposed or in addition to the water level. For example, the sensor 316 can be used to detect turbidity, or particulate matter in a solution or in water.

Figure 52:
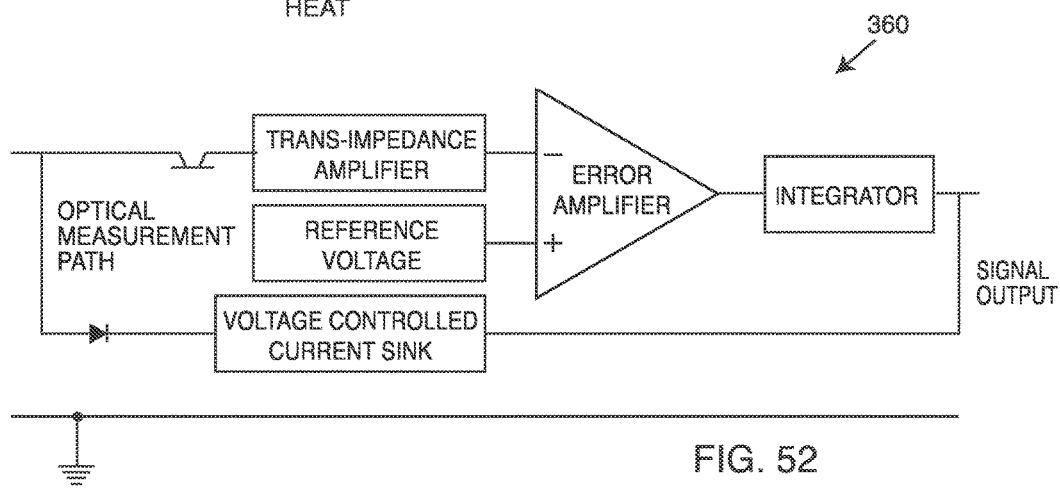
FIG. 52 is a circuit diagram of the water level sensor of FIG. 29.

An exemplary embodiment of a servo-loop 360 that can optionally be integrated into the brewer circuitry is illustrated in FIG. 52. The emitting device current can be controlled by the servo-loop using feedback from the detecting device. The detecting device, e.g., a photo-sensitive transistor, operates as a transistor within its linear region, but instead of controlling the current flow through the collector to the emitter of the transistor directly via base current, the photo-sensitive transistor base junction is sensitive to light in the same range as the emitting device so that the greater the light detected by the transistor base, the greater the conductivity (current flow) through the photo-transistor. As with the emitting device, the detecting device is either always on or controlled by some sort of device—such as a microcontroller—in the same manner as the emitting device. Likewise, the photo-transistor low side may be permanently attached to ground and the high side (collector side) controlled with the addition of a resistor in the VDD to collector path with the sensing line then taken from the collector-resistor junction. Alternatively the detecting device may be connected between VDD and the input to a transimpedance amplifier (current to voltage converter) whose output is used as the input to a servo-loop which controls the emitting device current. The sensing line is connected to the emitting device current command node, as shown in FIG. 52. The servo-loop may be implemented via a microcontroller, such as the controller discussed herein.

One or more programs (e.g., P1 and P2 shown in FIG. 50) can be activated automatically upon pushing an "on" button 362 (FIGS. 1-3 and 9-10) integrated into the base 102 of the brewer 100. Pressing the "on" button 362 causes the control circuit 166 to initiate a brew cycle, and specifically activates the heating unit 160 assuming that no other conditions, as described herein, prevent the brewer 100 from initiating the brew cycle (e.g., the brew basket lid 150 has been removed). The control circuit 166 may also activate the light 218 viewable through the illumination window 246 when the "on" button 362 is pressed, or a short time thereafter, such as when water flow is initiated through the solenoid valve 162 as a result of opening the plunger 174. The control circuit 166 may also activate an audible sound to denote the beginning of the brew cycle. The brew cycle program can include a generic program, suitable for a variety of different quantities of brewed beverage. For instance, the same program can be used for brewing 4, 6, 8 and 10 cups of beverage. One of several programs can also be automatically selected based upon the water level in the water reservoir 122. In this respect, the light sensor 316 (FIGS. 29-33) can be used to determine the water level in the reservoir 122 and to provide that information to the controller 166, which in turn selects a program (e.g., P1 or P2) from among a variety of programs tailored for brewing different beverage quantities. Alternatively, the program can be manually user selectable from among a variety of pre-stored programs, such as by pushing one or more buttons on the control panel 156 of the base 102 of the brewer 100. For example, the brewer 100 may include a "tea" or "coffee" selector button 366 or a cup quantity button 368. The brewer 100 may also include other buttons known in the art (e.g., a beverage temperature button) and preferably integrated into the control panel 364.

During the beginning of the cycle, the phase control valve 162 can be quickly actuated so that the plunger 174 bumps the top of the valve seat 194 or 194' to clear debris. In an alternative embodiment, the phase control valve 162 can be replaced by a pump that performs the same function of controlling the flow to alternate between the water and steam brewing phases.

An example of a program that alternates between the steam and water brewing phases may include the following, indicated in seconds of electric current supply to the coil 170 of the phase control valve 162, and thus water (on) and steam (off) brewing phases: 3 (water), 7 (steam), 3 (water), 7 (steam), 3 (water), 7 (steam), 3 (water), 7 (steam), 3 (water), 7 (steam), 20 (water), 20 (steam), 20 (water), 20 (steam), 20 (water), 20 (steam), 15 (water), 15 (steam), 15 (water), 15 (steam), 15 (water), 15 (steam), and 255 (water). Another example of a program can include the following: 3 (water), 15 (steam), 1 (water), 15 (steam), 1 (water), 15 (steam), 1 (water), 15 (steam), 1 (water), 15 (steam), 20 (water), 20 (steam), 20 (water), 20 (steam), 20 (water), 20 (steam), 15 (water), 15 (steam), 15 (water), 15 (steam), 15 (water), 15 (steam), and 255 (water). Yet another exemplary program is as follows: 8 (water), 30 (steam), 7 (water), 17 (steam), 7 (water), 17 (steam), 7 (water), 17 (steam), 7 (water), 17 (steam), 7 (water), 17 (steam), 7 (water), 17 (steam), 11 (water), 17 (steam), 11 (water), 17 (steam), 11 (water), 17 (steam), 11 (water), 17 (steam), 11 (water), 17 (steam), 12 (water), 5 (steam), 12 (water), 5 (steam), 12 (water), 5 (steam), 7 (water), 17 (steam), 7 (water), 17 (steam), 7 (water), 17 (steam), 255 (water). Another example of a program can include the following: 2 (water), 2 (steam), 30 (water), 17 (steam), 7 (water), 17 (steam), 7 (water), 17 (steam), 7 (water), 17 (steam), 7 (water), 17 (steam), 7 (water), 17 (steam), 7 (water), 17 (steam), 7 (water), 17 (steam), 7 (water), 17 (steam), 5 (water), 17 (steam), 5 (water), 17 (steam), 5 (water), 17 (steam), 5 (water), 17 (steam), 5 (water), 17 (steam), 5 (water), 17 (steam), 5 (water), 17 (steam), 5 (water), 17 (steam), 5 (water), 17 (steam), 5 (water), 17 (steam), 5 (water), 17 (steam), 5 (water), 17 (steam), 5 (water), 17 (steam), 5 (water), 17 (steam), 5 (water), 17 (steam), 5 (water), 17 (steam), 255 (water). The "255" can represent an indefinitely long water phase. Programs can be selected that result in water temperatures in the brew basket 128 that exceed 190° F., 195° F., 200° F. and approach or exceed 205° F. during a brew cycle. When the brew cycle finishes, the control circuit 166 may play an audible end sound and turn off the light 218, thereby signifying that brewing has successfully completed. The bimetal switch 216 can be set to a predetermined temperature so that the heating unit 160 can keep energizing the platen 104 to keep the brewed beverage warm for a period selected by the operator. In the event that the bimetal switch 216 deactivates after the reservoir 122 is in a low or no water state, the control circuit 166 may be programmed to prevent the bimetal switch 126 from activating the heating unit 160 for some predetermined period thereafter (e.g., five minutes) to prevent any leftover condensation in the tubing 212 from undesirably immediately turning to high pressure steam and being ejected into the brew basket 128. Instead, by keeping the bimetal sensor 126 "off", the leftover condensation is evaporated at a slower, controlled state to prevent the aforementioned high pressure steam state.

Alternating between the steam and water brewing processes during a brew cycle increases the temperature and, as a result, the pressure within the brew basket 128. Such increased pressure within the brew basket 128 may undesirably cause the brew basket lid 150 to unseat or pop up during brewing. Moreover, steam may have a tendency to undesirably emanate out from the front of the brewer 100 in and around the arcuate cutout 244 and the reinforcing badge 240. To relieve the brew basket 128 of this increased pressure and to prevent steam from escaping out through the front of the brewer 100, the brew basket lid 150 shown in FIGS. 4-6 includes a set of vents 370 that permit rearward escape of heated air or steam. As shown in FIG. 4, the brew basket lid 150 generally includes a three layer clamshell arrangement being constructed of an upper layer 372, a lower layer 374 and a flexible rubber-based sealing ring 376 that preferably substantially seals the brew basket lid 150 around the periphery of the brew basket 128. The lower layer 374 may screw or otherwise snap into the upper layer 372 to provide secure attachment thereto and to generally securely sandwich the sealing ring 376 therebetween. The sealing ring 376 is designed to form an airtight and watertight seal around the periphery of the brew basket 128, except along a cutout 378 therein substantially aligned with a similarly shaped recessed or cutout section 380 in the upper layer 372 and a similarly aligned recessed or cutout section 382 in the lower base 374. The cutouts 378, 380, 382 generally form the vents 370 that permit heated steam to exit the brew basket 128, as generally shown by the directional arrows in FIG. 6. The vents 370 are, of course, optional. That is, the brewer 100 could be used with a brew basket lid 150 without the cutouts 378, 380, 382 that generally form the vents 370.

Figure 7:
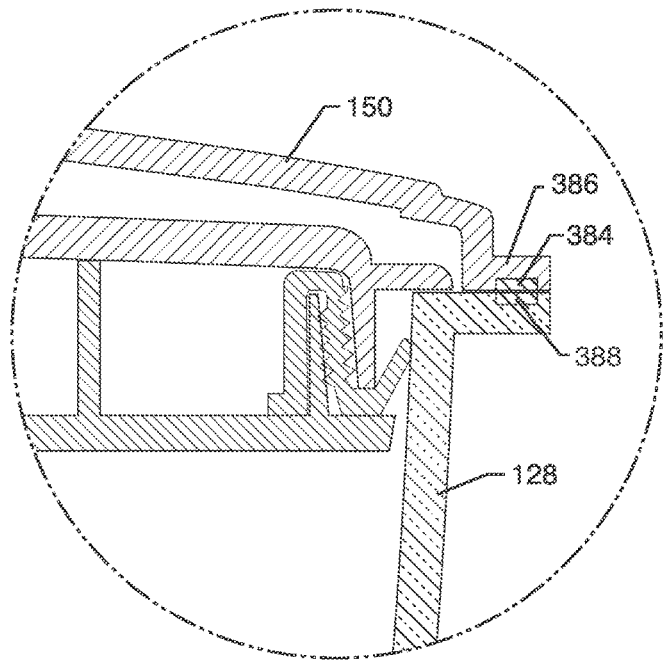
FIG. 7 is an enlarged view taken generally about the circle 7-7 of FIG. 6, illustrating the brew basket lid and the brew basket interlocked by a pair of magnets.
Figure 8:
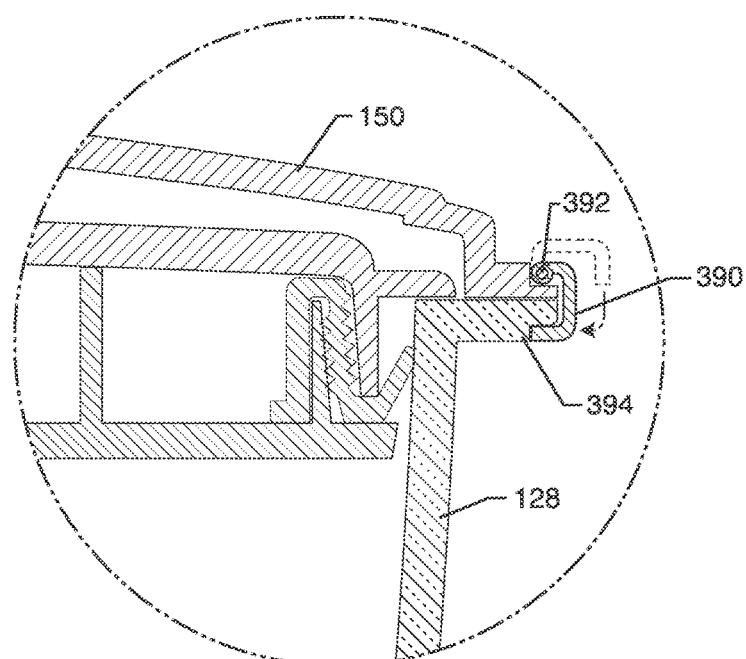
FIG. 8 is an enlarged view taken generally about the circle 8-8 of FIG. 6 and similar to FIG. 7, illustrating an alternative locking mechanism in the form of a pivoting clasp.

Furthermore, the brew basket lid 150 may be secured to the brew basket 128 by some attachment mechanism to further ensure a substantially airtight and watertight seal thereto, except in and around the vents 370 when used. More specifically, FIG. 7 illustrates one embodiment wherein the brew basket lid 150 includes a lid magnet 384 carried by an radially outwardly extending flange 386 that corresponds with a brew basket magnet 388 seated within a portion of the brew basket 128 or, in an alternative form, the brew basket housing 126. The magnets 384 and 388 attract each other and enhance the seal between the brew basket lid 150 and the brew basket 128. In an alternative embodiment shown in FIG. 8, the brew basket lid 150 may include a hinged clamp that pivots about an axis 392 for engagement with a recessed shoulder 394 in the brew basket 128. Here, the generally C-shaped clamp 390 wraps around the outer periphery of the flanged lid 150 and secures underneath the flanged brew basket 128 to clamp the brew basket lid 150 to the brew basket 128.

In another aspect, the brewer 100 may include an improved lighting system as generally shown in FIGS. 74-84. For purposes of establishing the context of this improved system, FIGS. 62-71 generally illustrate a preferred or alternative coffee brewer 100' incorporating a brewing process particularly compatible with the improved lighting system disclosed herein. Application of the presently disclosed coffee brewer lighting system should not be limited only to the brewer 100' as it may be compatible with other coffee brewers as may be recognized by persons of ordinary skill in the art, such as the brewer 100 described above. The coffee brewer 100' shown and described in FIGS. 62-71 includes a prior art lighting system that generally includes an externally visible light 218' positioned within a transparent front illumination window or front window 396 for illuminating the brewing process. This prior art lighting system is particularly incompatible with the presently disclosed lighting system for the reasons discussed in the background of the invention section of the present application.

Figure 62:
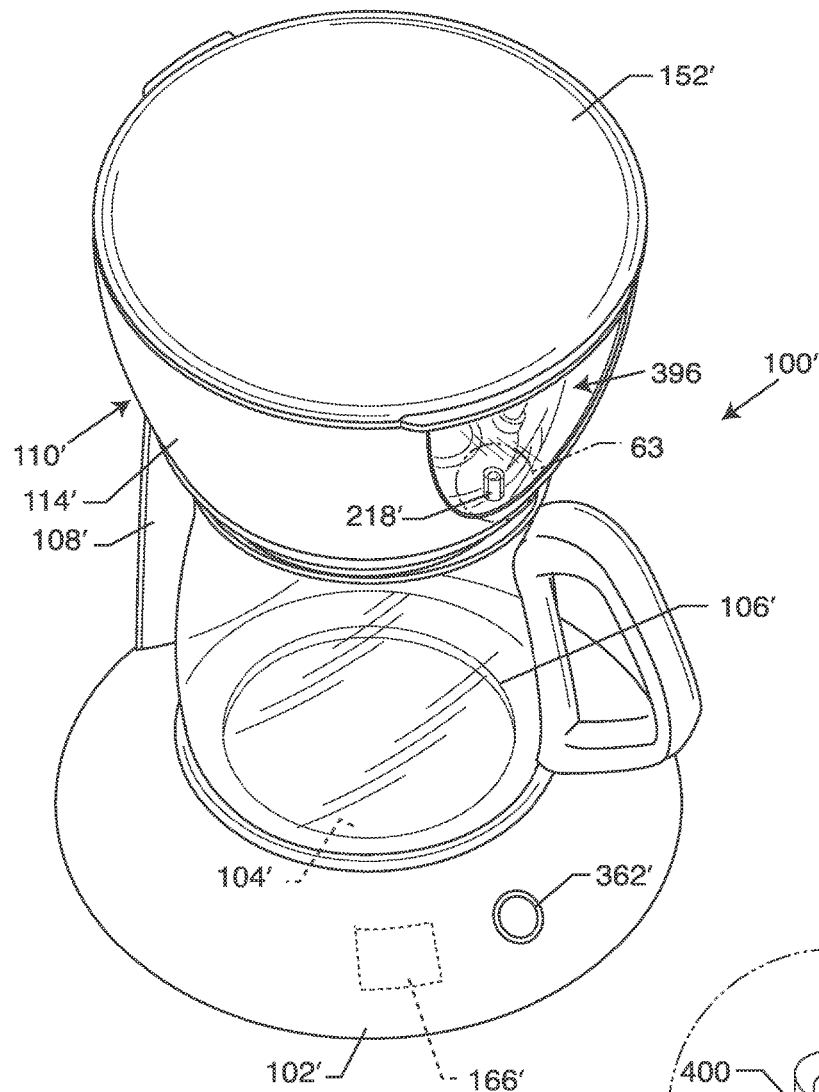
FIG. 62 is perspective view showing the top and front sides of a coffee brewer constructed with a prior art lighting mechanism.
Figure 63:
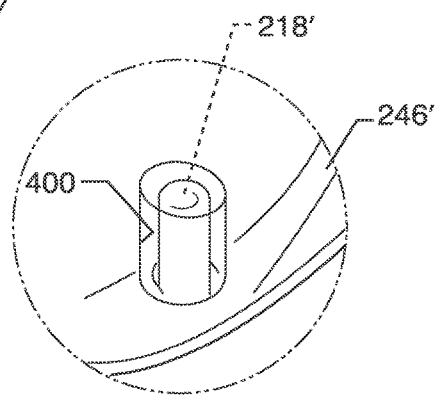
FIG. 63 is an enlarged fragmented perspective view corresponding with the encircled region 63 of FIG. 62, further illustrating the prior art lighting mechanism.
Figure 64:
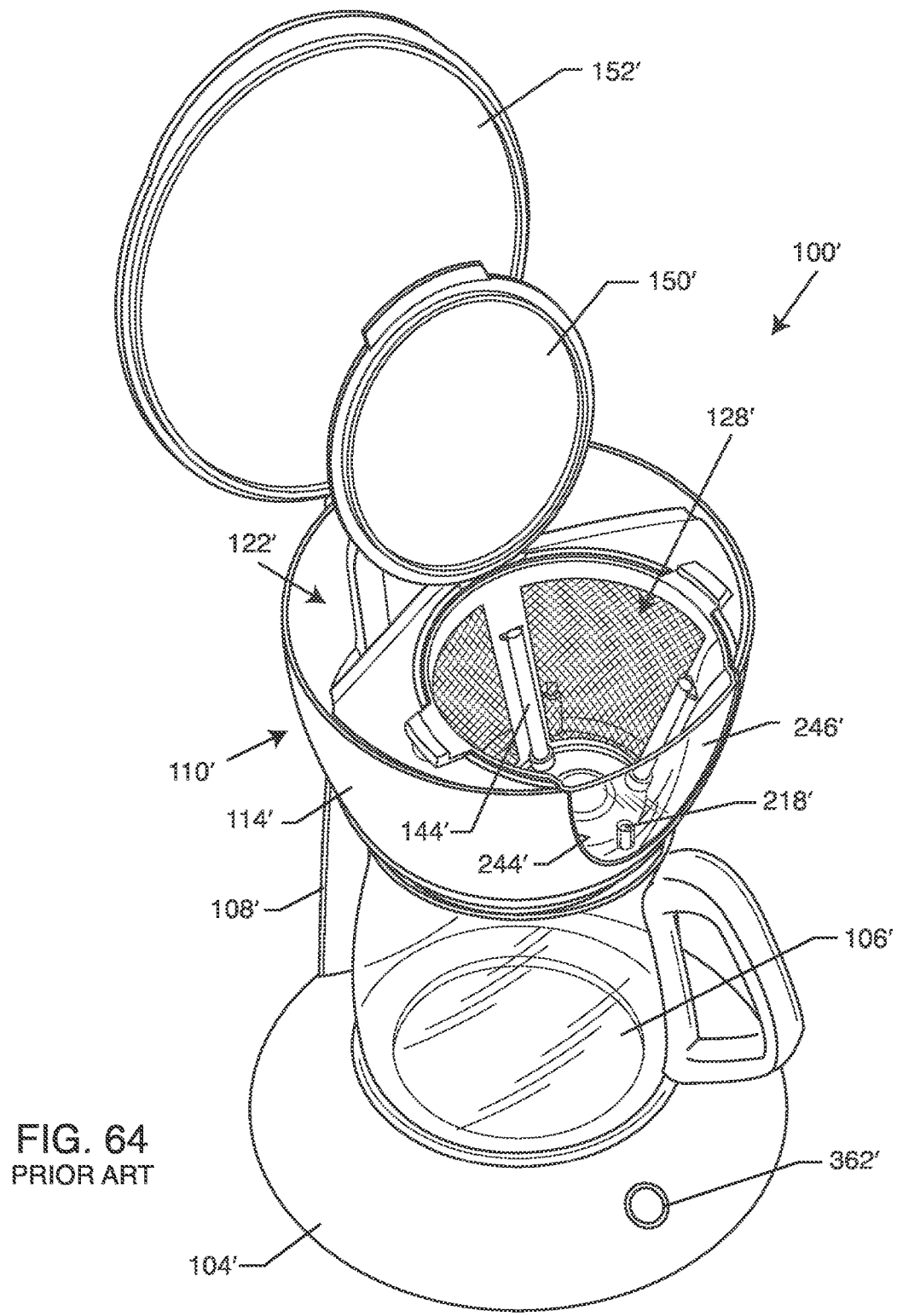
FIG. 64 is a top and front perspective view similar to FIG. 62, but showing a hinged upper lid on the prior art brewer in an open position for pour-in reception of a volume of water for use in brewing coffee, and also showing a hinged brew basket cap in an open position.
Figure 65:
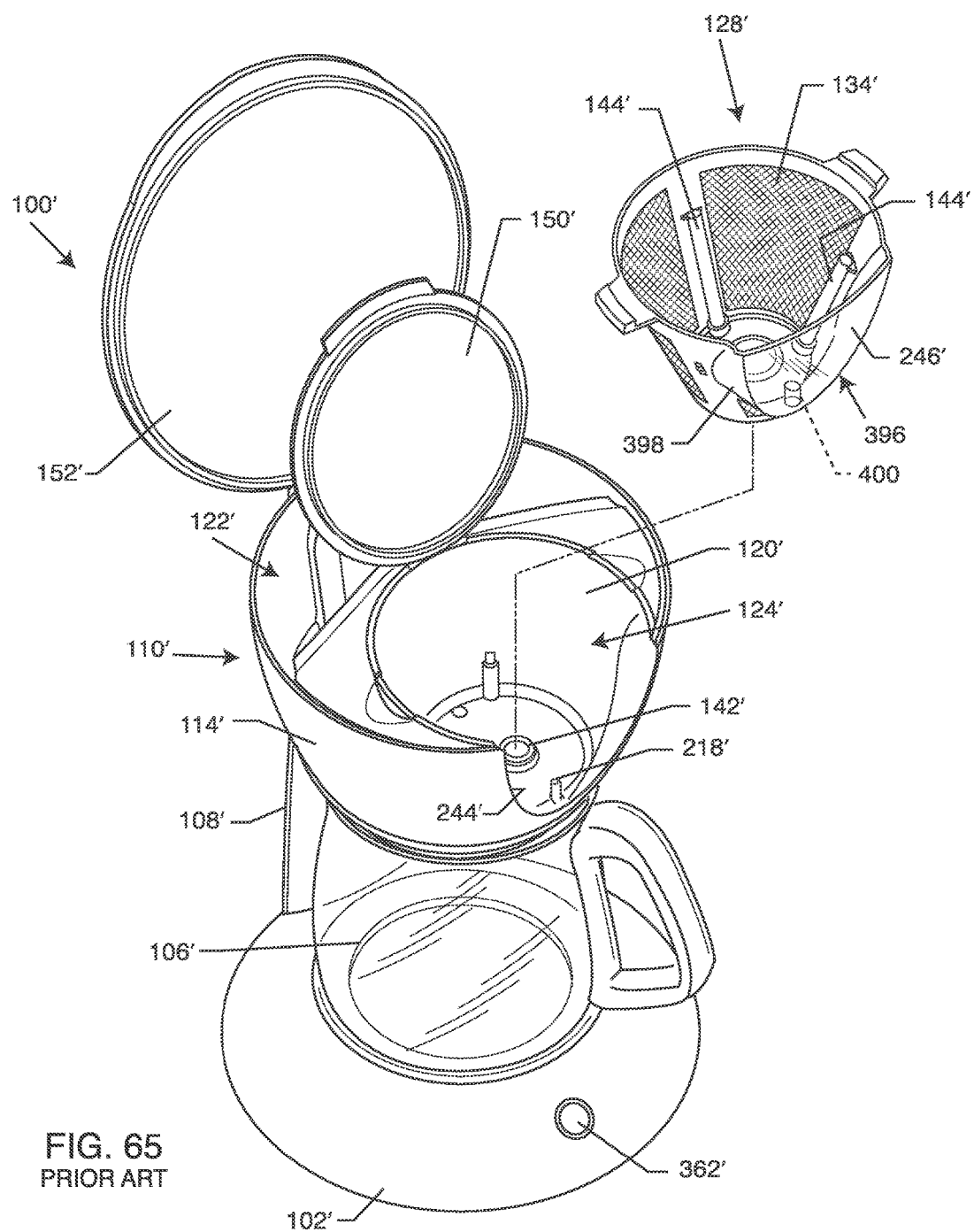
FIG. 65 is a top and front perspective view similar to FIG. 64, but illustrating the brew basket in exploded relation with the prior art brewer.
Figure 66:
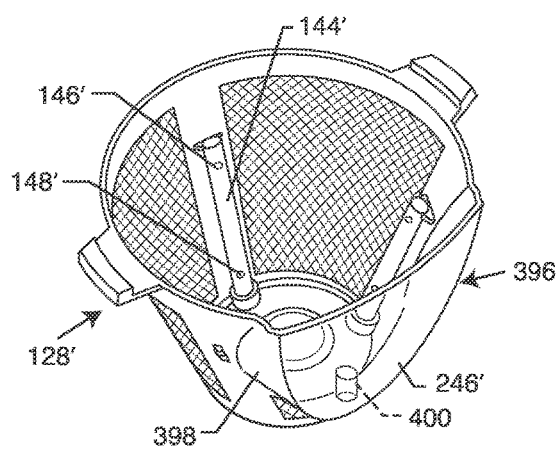
FIG. 66 is an enlarged top perspective view of the brew basket shown in FIGS. 64 and 65.
Figure 67:
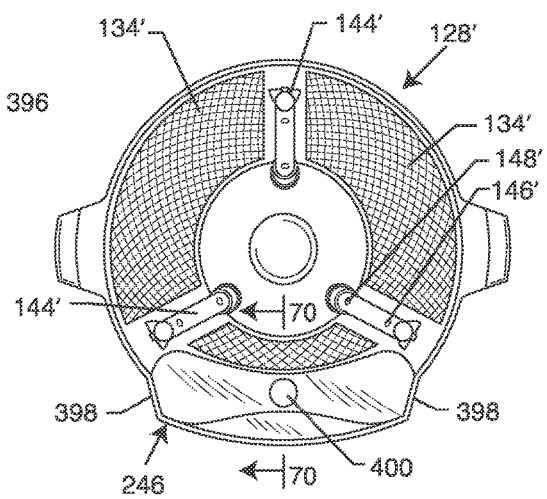
FIG. 67 is a top plan view of the brew basket of FIG. 66.

In this respect, and as shown in FIG. 62, the coffee brewer 100' similarly includes a lower support base 102' defining a platen 104' for removably supporting a coffee carafe or pot 106'. The pot 106' is positioned beneath a brewer head 110' mounted on an upstanding support 114'. An on-off button or switch 362' is provided on the front of the support base 102' for initiating a brew cycle. The upper brewer head 110' includes an upwardly open housing bowl 114' carrying a hinged lid 152' for normally closing and covering the otherwise open top of the bowl 114', as viewed in FIG. 62. The hinged lid 152' can be pivoted upwardly to an open position, as viewed in FIGS. 64-65, to expose the bowl interior which includes a central divider wall 120' separating the bowl interior into a rearwardly disposed water reservoir 122' and a forwardly disposed brew basket cavity 124'. A hinged cap 150' is shown for normally closing and covering the brew basket cavity 124'. A brew basket 128' is removably seated within this cavity 124', for supporting a selected quantity of ground coffee in the course of a coffee brewing cycle. Importantly, in this modified embodiment, water from the reservoir 122' is coupled through an appropriate heating element 160' for delivery via an inflow port 142' (FIG. 65) to the brew basket 128'.

Furthermore, FIG. 62 illustrates the upstanding light 218' positioned generally at the front of the brew basket cavity 124' (FIG. 65) and centered at a lower margin of a front-open arcuate recess 244'. The light 218' is a relatively small light element such as an LED upstanding a short distance at this lower margin of the recess 244'. As shown, the light 218' incorporates a translucent bulb body that may include a frosted bulb, non-frosted bulb or one of a variety of different light sources such as incandescent bulbs and the like for providing broad and relatively uniform dispersal of generated light energy, substantially without providing a sharp point of light.

The brew basket 128' (FIGS. 65-69) is generally constructed to include an underside feed port (not shown) for registry with the inflow port 142' (FIG. 65) when the brew basket 128' is seated within the cavity 124' for a brew cycle. Hot water from the inflow port 142' thus enters a false bottom or plenum chamber (described above) of the brew basket 128', for flow further to and upwardly through a plurality of upstanding hollow ribs 144' each having at least one and preferably multiple jet ports, such as upper jet ports 146' and lower jet ports 148' formed therein. In general, these jet ports 146', 148' deliver hot water in jetted streams into the brew basket interior for turbulently agitating and stirring the coffee grounds during a brew cycle. At least one and preferably a plurality of these jet ports 146', 148' are disposed below the surface level of the coffee grounds contained within the brew basket 128'.

The frontal segment 396 of the brew basket 128' includes a forwardly protruding structure having a size and shape for substantially seated reception within the arcuate recess 244'. Accordingly, this frontal segment 396 defines a generally U-shaped shoulder 398 which protrudes forwardly from the otherwise generally truncated conical profile of the brew basket 128'. A forward margin of this shoulder 398 is joined to a substantially transparent front window 246 of the frontal segment 396, whereas a rearward margin of the shoulder 398 is joined to the rearwardly-disposed truncated conical portion of the brew basket 128' which includes mesh-type filter elements or segments 134' through which brewed coffee may flow outwardly and drain downwardly into the underlying coffee pot 106'.

The U-shaped shoulder 398 of the forwardly protruding frontal segment 396 defines a relatively small, downwardly open pocket 400. This pocket 400 is positioned, and has a size and shape, for slide-in reception of the upstanding light 218', when the brew basket 128' is mounted within the brew cavity 124'. As viewed in FIG. 70, this pocket 400 is spaced rearwardly at least a short distance from an inboard side of the transparent window 246', thereby defining a chamber 402 therebetween, so that a portion of the water-borne coffee grounds may flow or circulate through this chamber 402, i.e., between the window 246' and the light-containing pocket 400. In this position, when energized, the light 128' illuminates or back-lights the transparent window 246' thereby also illuminating and back-lighting the portion of the water-borne coffee grounds circulating between the light and the window to render the brewing process externally visible. When a non-frosted light 218' is used, the region of the basket defining the pocket 400 is preferably frosted for improved and relatively even light distribution.

As previously noted, this brew process includes multiple water jets 146', 148' oriented for turbulently stirring the coffee grounds during the brew cycle, for purposes of achieving improved extraction of coffee flavor. When the brew cycle is initiated as by depression of the on-off button 362', the control circuit 166' (FIG. 62) energizes the light 218'. Upon completion of the brew cycle, as indicated by a cessation of jetted water inflow to the brew basket 128', the control circuit 166' may be adapted to turn the light 218' off, thereby indicating brew cycle completion.

Figure 71:
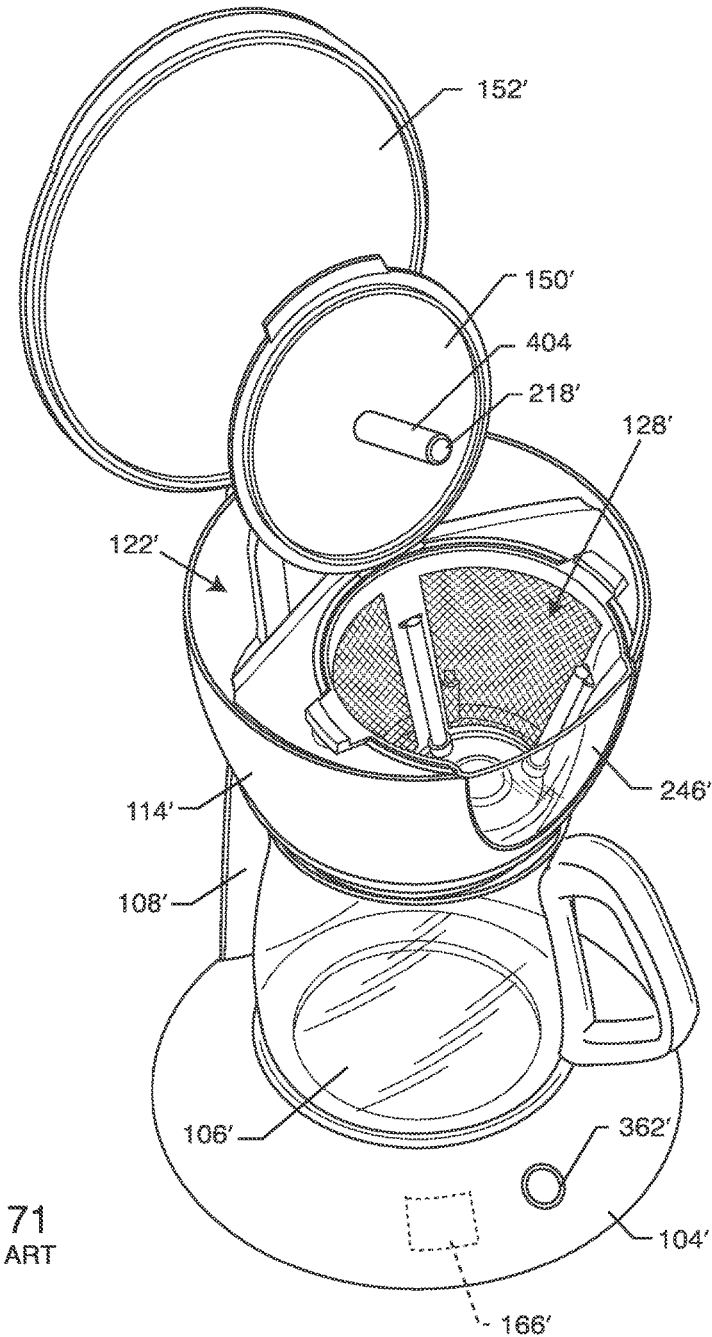
FIG. 71 is a top and front perspective view similar to FIG. 64, but illustrating a further alternative preferred form of the invention.

FIG. 71 shows an alternative form of a prior art coffee brewer lighting mechanism. As shown, the light 218' is carried on the lower end of a post 404 depending from a modified hinged cap 150' for closing the brew basket cavity 124' during a brew cycle. The light 218' in FIG. 71 is suitably coupled to the control circuit 166' for on-off regulation in the same manner as previously shown and described with respect to FIGS. 62-70. In particular, during a brew cycle, the light 218' of FIG. 71 is spaced rearwardly from an inboard side of the transparent front window 246' on the brew basket 128', thereby permitting at least some of the water-borne coffee grounds to circulate between the light 218' and the window 246' during brewing. Such circulating grounds are thus back-lighted for easy external viewing. The light 218' may be frosted, or otherwise positioned within a frosted pocket defined at a distal end of the post 404.

Figure 72:
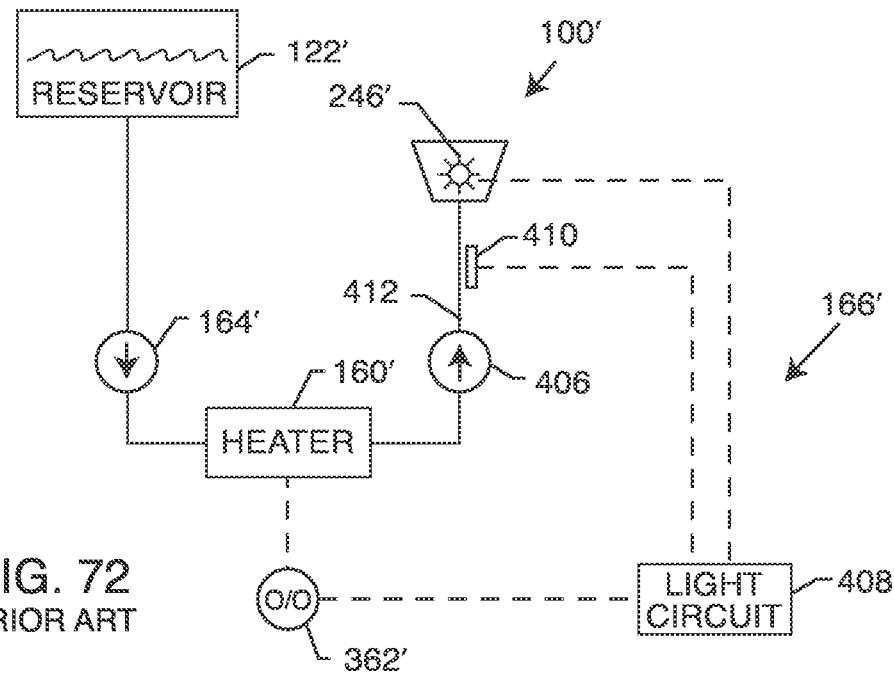
FIG. 72 is a schematic diagram depicting one preferred form including a light circuit and sensor for controlling illumination of a light associated with the brew basket.

FIG. 72 is a schematic diagram showing the coffee brewer of FIGS. 62-71 in association with the control circuit 166'. As shown, water from the reservoir 122' flows through a pair of check valves 164', 406 disposed at opposite sides of a heating unit 160' configured to deliver heated water to the interior of the brew basket 128' via the jets 146', 148', as previously shown and described. Such water flow is initiated upon depression of a suitable on-off switch or button 362' adapted to couple electrical power to the heating unit 160', and also through a light control circuit 408 to the light 218'. Illumination of the light 218' can be responsive to a suitable sensor 410 such as temperature sensor for detecting the presence of hot water flow from the second check valve 406 and through a conduit 412 to the brew basket 128'. A suitable sensor for use with the brewer 100' may include a thermistor, or a bimetal thermal sensor, or the like. When heater water flow is initiated and detected by the sensor 410, the light 218' is illuminated by the light control circuit 408. When the brew cycle is complete, and hot water flow past the sensor 410 thus stops, the sensor 410 will detect a reduced temperature and thereupon signal the light control circuit 408 to extinguish the light 218' thus providing a visible indication that the brew process finished.

Figure 73:
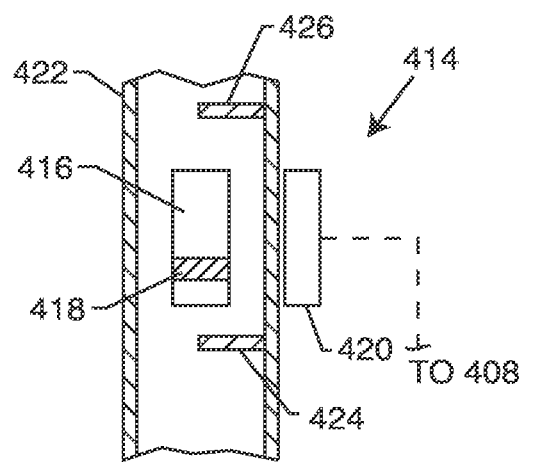
FIG. 73 is an enlarged fragmented and somewhat schematic sectional view depicting an alternative form of the sensor.

In a further alternative form as viewed in FIG. 73, a modified sensor 414 may be provided in the form of a float element 416 carrying a magnet 418 or the like in close proximity with a magnetic reed switch 420 coupled to the light control circuit 408. In this embodiment, upon initiation of hot water flow to the brew basket 128', the float element 416 is carried upwardly along a flow conduit 422 thereby displacing the magnet 418 relative to the reed switch 420 resulting in switch movement indicative of said hot water flow. The reed switch 420 thus signals the light control circuit 408 which responds by energizing the light 218'. Subsequently, when the hot water flow ceases, the float element 416 descends within the conduit 422 for reversing the state of the reed switch 420, which thereupon signals the light control circuit 408 to de-energize the light 218'. Suitable stops 424, 426 may be provided along the flow conduit 422 for defining end limits of the float element movement 416 therein.

Figure 74:
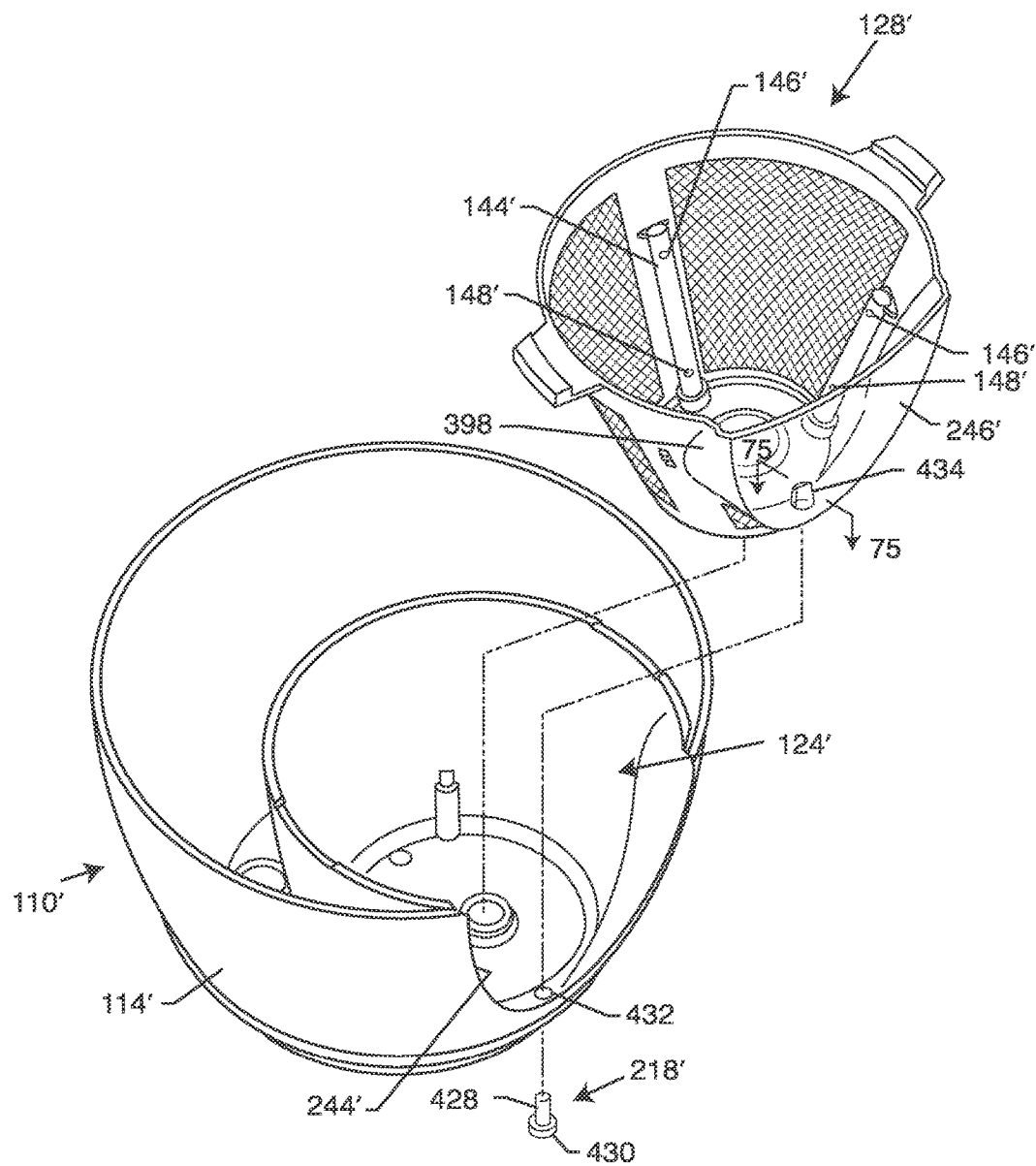
FIG. 74 is an exploded perspective view of an improved brewer head and brew basket incorporating one embodiment of the enhanced lighting system disclosed herein.

FIGS. 74-80 illustrate one preferred embodiment of the improved coffee brewer lighting system of the type compatible with the coffee brewers 100, 100' discussed above. In this respect, the lighting system disclosed herein is designed to illuminate coffee and hot water turbulently agitated by the jet ports 146', 148' in the interior of the brew basket 128'. Specifically, FIG. 74 is an exploded perspective view illustrating the light 218' generally including a bulb 428 and a base 430 mountable within a portion of the upwardly open housing bowl 114'. The light 218' is preferably an LED or the like having a bulb head size of approximately 3 mm to 5 mm in diameter, although larger size LEDs having increased luminosity could be used with the present lighting system, as described in more detail below. The light 218' sits within an alcove 432 formed from a portion of the upwardly open housing bowl 114' below the planar surface defining the generally arcuate recess 244' of the brewer head 110'. The base 430 is preferably generally exposed for electrical connection to a power source (not shown) and the light control circuit 408 or the like. The brew basket 128' includes a reflector chamber 434 formed from a portion of the U-shaped shoulder 398 that projects up into the interior of the brew basket 128'. This chamber 434 is preferably substantially aligned with the open alcove 432 housing the light 218' along the arcuate recess 244' of the brewer head 110'.

Figure 68:
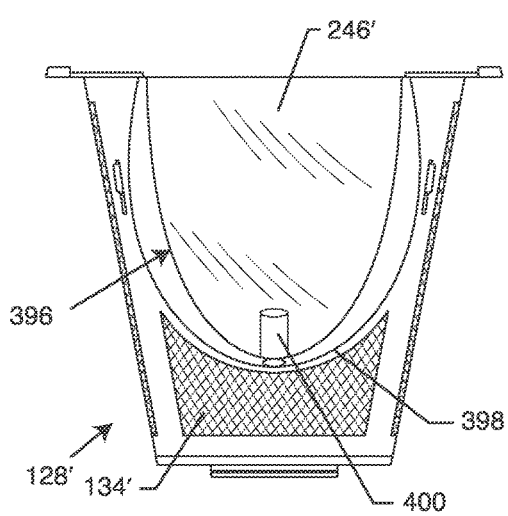
FIG. 68 is a front elevation view of the brew basket of FIGS. 66-67.
Figure 69:
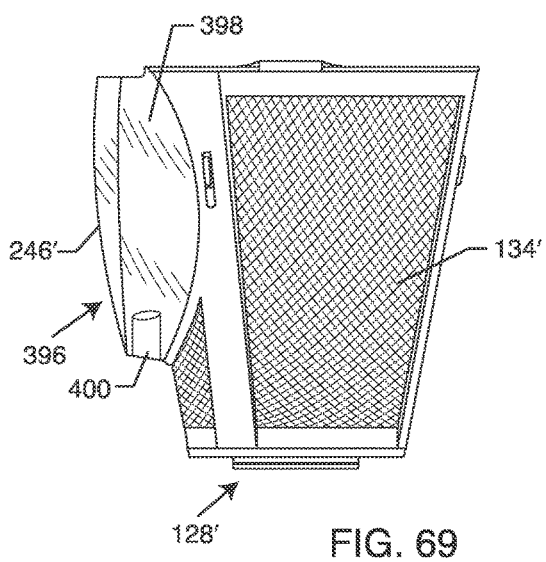
FIG. 69 is a right side elevation view of the brew basket of FIGS. 66-68.
Figure 70:
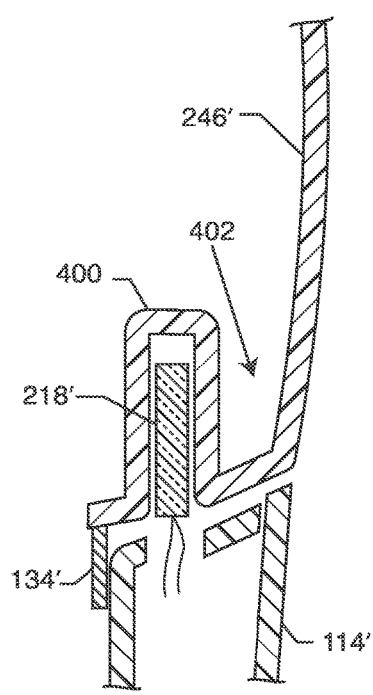
FIG. 70 is an enlarged fragmented vertical sectional view taken generally on the line 70-70 of FIG. 67.
Figure 78:
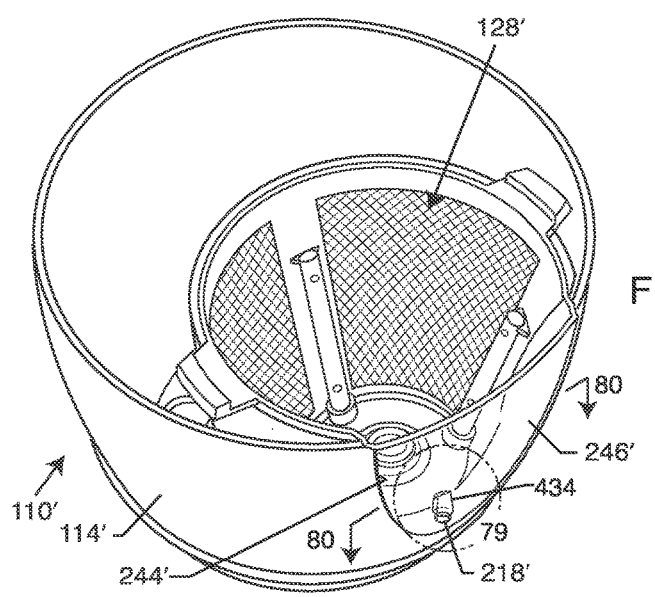
FIG. 78 is a perspective view similar to FIG. 74, illustrating nested reception of the brew basket within the brewer head in a manner wherein the light bulb is in non-engaged relation with the brew basket.
Figure 79:
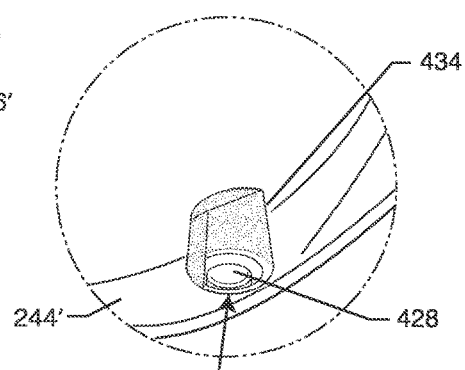
FIG. 79 is an enlarged perspective view taken generally about the circle 79 in FIG. 78, further illustrating the non-engaged relationship of the bulb and light receiving chamber.
Figure 80:
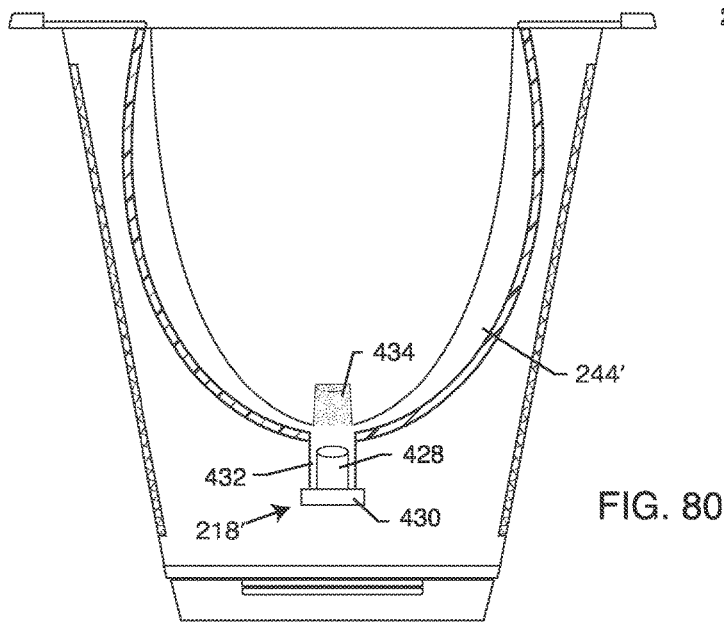
FIG. 80 is a cross-sectional view taken about the line 80-80 of FIG. 78, further illustrating the light disposed within the body of the brewer head in non-engaged relation with the nested brew basket.

FIGS. 78-80 more specifically illustrate alignment of the chamber 434 relative to the light 218' when the brew basket 128' is in nested reception with the brewer head 110'. Specifically, FIG. 68 is a perspective view similar to FIG. 74, illustrating placement of the brew basket 128' within the cavity 124'. Here, and as more specifically shown in the enlarged view of FIG. 79 and the cross-sectional view of FIG. 80, the bulb 428 sits flush with or substantially below the arcuate recess 244' formed from the upwardly open housing bowl 114'. One advantage of placing the light 218' within the alcove 432 is that the bulb 428 is no longer restricted to the size and shape of the interior of the aforementioned pocket 400. Increasing the size of the pocket 400 has an adverse consequence of restricting flow from the jet ports 146', 148' through the chamber 402. That is, the pocket 400 will eventually protrude too far into the interior of the brew basket 128', thereby occluding the jet ports 146', 148' from projecting turbulently brewed coffee into the chamber 402 for illumination against the transparent window 246'. The other added benefit is that larger, higher wattage LEDs may be used in association with the brewer. This is important from the standpoint that the pocket 400 is sized only to retain 3-5 mm diameter LEDs, which provide insufficient illumination of "darker" brews. Increasing the size of the LED beyond 3-5 mm provides more luminescence, but the increased heat generation requires incorporation of a cooling mechanism or heatsink at or near the bulb 428 or base 430 to reduce heat-related stresses at the P-N junction of the bulb 428, otherwise the LED will simply fail.

Accordingly, the chamber 434 is specifically designed to cooperate with the light 218' to provide adequate illumination to the transparent window 246', despite the fact that the bulb 428 resides within the alcove 432. In this respect, the cross-sectional views of FIGS. 75-77 illustrate preferred placement of the chamber 434 relative to the light 218'. The chamber 434 is generally formed by a pair of vertical or upstanding wall segments 436, 438 positioned apart to form a gap therebetween for receiving light emitted by the bulb 428. The chamber 434 further includes a slanted reflector segment 440 connecting wall segments 436, 438 and generally forming an angle between 45° and 65°, and more specifically 55°, relative to the vertical wall segment 436. Alternatively, the chamber 434 may omit the wall segment 436 such that the reflector segment 440 forms the 45°-65° angle with the base of the chamber 434 sitting flush against the arcuate recess 244' of the brewer head 110', as shown in FIG. 76. The wall segment 438 and the transparent window 246' generally form a channel 442 therebetween through which agitated water-borne coffee is forcibly projected by the jet ports 146', 148', as described in detail above.

The wall segment 436 and the reflector segment 440 are configured to reflect or redirect a plurality of the light beams 444 emitted by the bulb 428 out through the substantially transparent or translucent wall segment 438, through the channel 442 and onto or out through the transparent window 246'. In this respect, the wall segment 438 is preferably made from a substantially transparent material to improve light transmission through to the channel 446 and the window 246'. In doing so, the externally visible or observable transparent window 246' illuminates in a manner that enables external viewing of the brewing coffee. More specifically, in one embodiment, the wall segment 436 and the slanted reflector segment 440 (or just the slanted reflector segment 440 as shown in FIG. 76) may include a highly polished interior surface 448. This surface 448 may be made from a polished plastic or metal material that substantially redirects the light beams 444 in the manner shown in FIG. 75, thus increasing the concentration of the light beams 444 projected through the channel 442 and the transparent window 246' to provide adequate illumination of "darker" brews of coffee.

FIG. 76 illustrates an alternative embodiment wherein the slanted reflector segment 440 includes a reflector 450 positioned substantially in front of or coating the interior surface 448. Here, the chamber 434 may be of a size and shape configured for slide fit reception of a separately insertable reflector (not separately numbered) made from a metal alloy or highly polished plastic material or the like (e.g., glass or a mirror) substantially reflective of the light beams 444. Alternatively, FIG. 77 illustrates another embodiment wherein the reflector 450 is positioned along an exterior surface 452 of the slanted reflector segment 440, and on an interior side of the brew basket 128'. Here, the combination of the slanted reflector segment 440 and the reflector 450 may provide more efficient reflection of the light beams 444 out through the transparent frontal window 246'. In this respect, the polished nature of the interior surface 448 and/or use of the reflector 450 ensure that a higher concentration of the light beams 444 emitted by the bulb 428 make their way through the channel 446 and out through the transparent window 246', again, for adequate illumination of "darker" brews.

Figure 83:
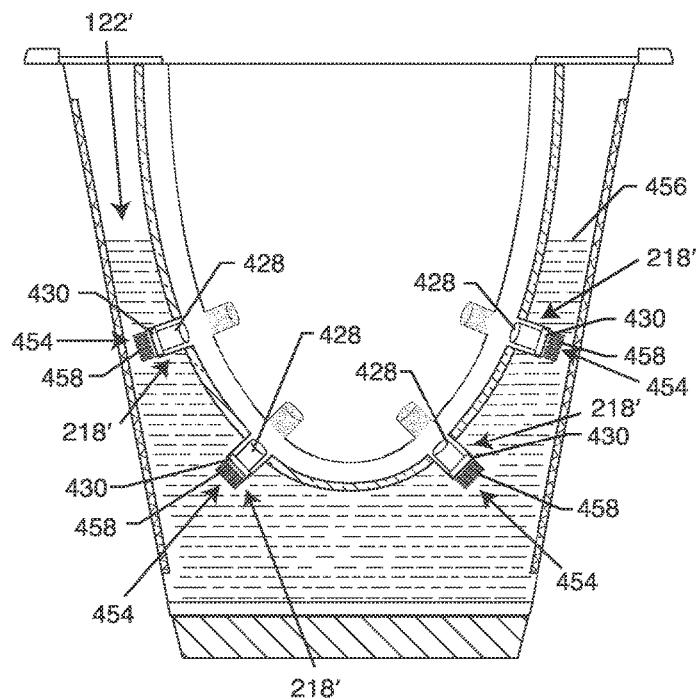
FIG. 83 is a cross-sectional view taken generally about the line 83-83 of FIG. 82, further illustrating one form of a heatsink exposed to unheated water in a reservoir for cooling the lights.
Figure 84:
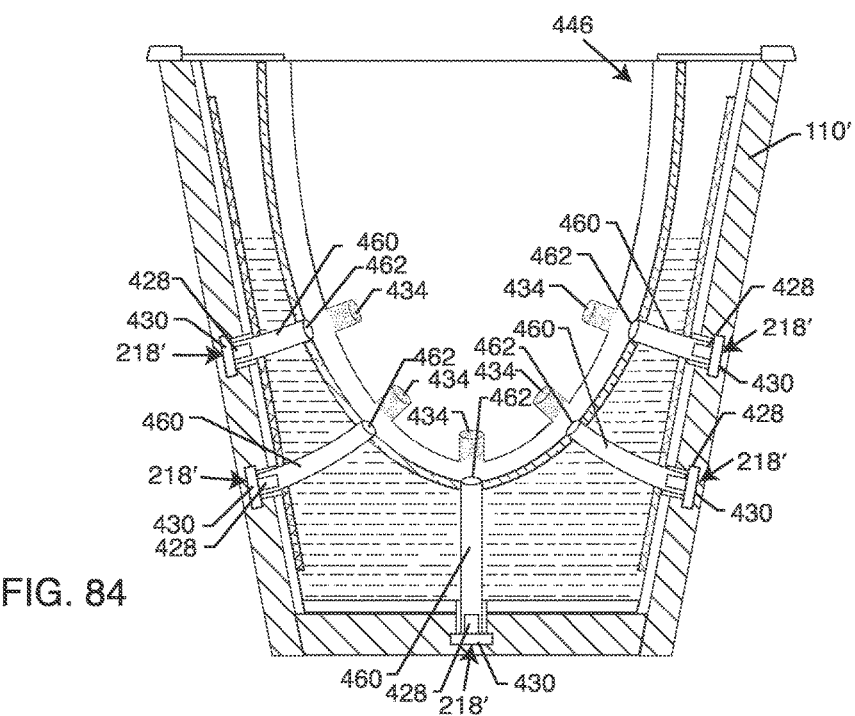
FIG. 84 is an alternative cross-sectional view of the improved coffee brewer lighting system, illustrating the lights in the brewer head body positioned in distal relationship to the light receiving chambers for delivering light thereto by respective light conduits.

FIGS. 81-84 illustrate additional alternative embodiments of the improved coffee brewer lighting system as disclosed herein. For example, FIGS. 81 and 82 illustrate one such embodiment wherein the upwardly open housing bowl 114' includes multiple lights 218' disposed around the periphery of the arcuate recess 244'. Accordingly, the brew basket 128' includes a plurality of reflective chambers 434 disposed around the periphery of the U-shaped shoulder 398, and preferably matching or tracking the relative placement of the lights 218' in the arcuate recess 244'. Here, and as better shown in FIG. 82, each reflective chamber 434 is in substantial alignment with a light 218' when the brew basket 128' is in nested reception with the brewer head 110' for selectively receiving and reflecting the light beams 444 out through the transparent window 246'. FIGS. 81 and 82 illustrate the use of five lights 218' and five reflector chambers 434, but the quantity can change, depending on the application and orientation of the jet ports 146', 148. For example, a coffee brewer may incorporate four offset lights 218' and chambers 434 as shown in FIG. 83. Increasing the number of lights 218' generally increases the available light projectable on to the transparent window 246'. Moreover, deploying additional reflector chambers 434 in the brew basket 128' increases the quantity of channels 442 formed therein, thereby increasing the quantity of turbulently agitated coffee subject to illumination. This naturally enhances the desired external visual observation of coffee brewing within the brew basket 128', especially for "darker" brews.

FIG. 83 illustrates another alternative embodiment wherein each of the lights 218' include an optional heatsink 454 exposed to water 456 in the water reservoir 122'. The heatsink 454 facilitates the use of higher wattage LEDs without risk of burnout through use of an increased heat dissipation or cooling system. In this embodiment, the heatsink 454 preferably includes a plurality of highly conductive fins 458 exposed to unheated water within the reservoir 122'. Upon activation of the brew cycle, each light 218' activates to provide a certain amount of illumination to the transparent window 246'. The generation of light causes increased heat in and around the bulb 428, as is well known in the art. This heat may initially dissipate through the base 430 of the light 218' through use of highly conductive metals such as silver, copper or other comparable conductive materials known in the art. The base 430 is typically enough for lower wattage LEDs ranging between 3-5 mm in diameter. Addition of the heatsink 454 to each base 430 provides added heat dissipation for the bulbs 428 during operation by increasing the conductive surface area subject to cooling. A thermal compound (not shown) may be layered between the base 430 and the heatsink 454 to improve thermal energy transfer therebetween.

Unheated water 456 in the reservoir 122' is used as the preferred energy transfer medium as water can absorb relatively large quantities of energy without much temperature change. The fins 458 disposed within this reservoir 122' and submerged within the unheated water 456 more efficiently cool the bulb 428 as the increased contact area of the fins 458 results in higher quantities of energy transferred to the water 456 and drawn away from the bulb 428. Additionally, the coffee brewer 100' extracts water 456 out from within the reservoir 122' during the brew cycle, in accordance with the embodiments described above, resulting in active cooling. In this respect, fresh unheated water passes over and through the fins 458 to provide a constant resupply of unheated water as the preheated water is eventually used for brewing. The benefits of this design are the reduced heat stresses at the bulb 428 through integration of the aforementioned cooling system along with more efficient energy use due to preheating of the water 456 in the reservoir 122' with the heat generated by the bulbs 428 before delivery to the heating unit 160'.

The heatsink 454, and specifically the fins 458, can be used with other coffee brewer designs that may not include the aforementioned water reservoir 122'. In these designs, water is typically injected into an inlet for travel to a heating element before delivery to the brew basket during the brew cycle. Preferably, the unheated water from the supply line travels first through a water conduit disposed in and around the heatsink 454, as desired or needed. As such, the unheated water in the water conduit operates in a similar capacity as described above, namely acting as a heat transfer medium to cool the bulbs 428 and provide limited preheating of the unheated water before travel to the heating element, for example the heating unit 160' as described above.

FIG. 23 illustrates another embodiment of the coffee brewer lighting system described herein, wherein the lights 218' are disposed in a portion of the brewer head 110' distal from the brew basket 128' and the reflector chambers 434. In this embodiment, the base 430 and preferably at least a portion of the bulb 428 reside in thermal contact with a conductive material forming all or a portion of the wall of the brewer head 110'. Preferably, the brewer head materials are made from a highly conductive metal or plastic material capable of dissipating heat away from the bulb 428 during operation. Each bulb 428 is coupled to a light conduit 460 that generally forms an elongated chamber that receives light emitted by the bulbs 428 at one end and channels said light to an exit 462 positioned proximate to the reflector chamber 434. Accordingly, light emitted from the lights 218' distal to the chambers 434 still operates in the same or similar manner as if the lights 218' were positioned near the exit 462 in substantial alignment with the chambers 434. The light conduit 460 may include a type of fiber optic line designed specifically to channel light beams or the like. Furthermore, the exit 462 may include a lens designed to concentrate or direct the light beams for strategic reception in the chamber 434 to accomplish substantial and uniform lighting of the transparent window 246' in accordance with the embodiments described herein.

In another aspect, the brewer 100 may include a filter 464 (FIGS. 9, 26-28 and 53) disposed within the water reservoir 122 and having a mesh surface to prevent debris or other particles from entering the tubing 212 that may clog or disable use of the phase control valve 162, the check valve 164 or otherwise substantially impair the flow of water from the reservoir 122 to the brew basket 128 in accordance with the embodiments described herein. Additionally, FIG. 12 illustrates the wiring of the light 218 travelling down a front portion of the brewer head 110 just below the illumination 246. The lower housing shell 112 carries the wiring therein for connection to the control circuit 166.

Although several embodiments have been described in detail for purposes of illustration, various modifications may be made without departing from the scope and spirit of the invention. Accordingly, the invention is not to be limited, except as by the appended claims.

What is claimed is:

1. A coffee brewer, comprising:
   a brewer head having a cavity configured for nested reception of a brew basket that intermixes hot water and coffee during a brew cycle;
   at least one water inflow port in said brewer head for introducing at least one hot water stream into said brew basket for contacting coffee to produce brewed coffee;
   a heating unit disposed upstream from said water inflow port for producing said hot water stream before delivery to said brew basket; and
   a phase control valve for regulating the supply of unheated water to said heating unit, said phase control valve alternating between a first position permitting a first flow rate of unheated water to said heating unit during a water brew phase and a second position permitting a relatively lower second flow rate of unheated water to said heating unit during a steam brew phase, in which the control valve comprises a solenoid valve having a central shaft with a hollow plunger movable therein and selectively positionable within a magnetic field selectively generated by a coil.

2. The coffee brewer of claim 1, wherein said solenoid valve includes a valve seat having at least one flow port therein, said plunger substantially permitting unheated water flow through said flow port when said phase control valve is in said first position and substantially occluding unheated water flow through said flow port when said phase control valve is in said second position.

3. The coffee brewer of claim 2, wherein said first flow rate comprises a substantially full flow rate of unheated water and said second flow rate comprises a no flow rate of unheated water.

4. The coffee brewer of claim 2, wherein said valve seat further includes a bypass channel fluidly coupled to said flow port to permit metered flow of unheated water through said phase control valve when said plunger is in said second position.

5. The coffee brewer of claim 1, including a control circuit for measuring current changes in said magnetic field through movement of said plunger in said central shaft during said water brew phases.

6. The coffee brewer of claim 1, including an optical sensor having an emitter that selectively generates a beam receptive by a detector, said optical sensor being positioned relative to said phase control valve such that the flow of unheated water through said phase control valve during said water brew phase displaces said plunger to disrupt communication of said beam between said emitter and said detector.

7. The coffee brewer of claim 1, including a check valve fluidly coupled between said phase control valve and said heating unit and positioned to prevent backflow of heated water into said phase control valve during said water brew or said steam brew phases.

8. The coffee brewer of claim 1, including a water reservoir for retaining relatively unheated water fluidly coupled upstream from said phase control valve, said phase control valve regulating delivery of unheated water from said water reservoir to said heating unit during said water and steam brew phases.

9. The coffee brewer of claim 8, wherein said water reservoir includes an outlet port having a filter screen.

10. The coffee brewer of claim 1, including an optical sensor having an emitter that selectively generates a beam receptive by a detector, said optical sensor being positioned relative to said phase control valve such that the turbulent flow of unheated water through said phase control valve during said water brew phase disrupts communication of said beam between said emitter and said detector.

11. The coffee brewer of claim 1, including a light synchronized with an audible tone and evacuation of brewed beverage from said brew basket.

12. The coffee brewer of claim 1, wherein said heating unit comprises multiple heating units.

13. The coffee brewer of claim 1, wherein said phase control valve is positioned in fluid communication between a reservoir and said heating unit, said phase control valve being actuated based upon an electrical control signal from a controller.

14. The coffee brewer of claim 13, wherein said controller alternates said phase control valve between said water brew phase and said steam brew phase multiple times when brewing a beverage.

15. The coffee brewer of claim 14, including a memory chip for storing a program, said memory chip accessible by said controller for causing said controller to send said electrical control signal to said phase control valve according to said program.

16. The coffee brewer of claim 15, wherein said memory chip comprises a non-volatile memory chip including a plurality of manually or automatically selectable brewing programs.

17. The coffee brewer of claim 1, including a TRIAC for regulating a duty cycle of said heating unit in real-time.

18. A coffee brewer, comprising:
a brewer head having a cavity configured for nested reception of a brew basket that intermixes hot water and coffee during a brew cycle;
at least one water inflow port in said brewer head for introducing at least one hot water stream into said brew basket for contacting coffee to produce brewed coffee;
a heating unit disposed upstream from said water inflow port for producing said hot water stream before delivery to said brew basket;
a phase control valve comprising a solenoid valve having a central shaft with a hollow plunger movable therein and selectively positionable within a magnetic field selectively generated by a coil for regulating the supply of unheated water to said heating unit, said phase control valve alternating between a first position permitting a substantial full flow of unheated water to said heating unit during a water brew phase and a second position substantially restricting full flow of unheated water to said heating unit during a steam brew phase;
a control circuit for measuring current changes in said magnetic field through movement of said plunger in said central shaft during said water brew phase; and
a water reservoir for retaining a quantity of relatively unheated water fluidly coupled upstream from said phase control valve, said phase control valve regulating delivery of unheated water from said water reservoir to said heating unit during said water and steam brew phases.

19. The coffee brewer of claim 18, wherein said phase control valve includes a valve seat having at least one flow port therein, said plunger substantially permitting water flow through said flow port when said phase control valve is in said first position and substantially occluding water flow through said flow port when said phase control valve is in said second position.

20. The coffee brewer of claim 19, wherein said valve seat includes a bypass channel fluidly coupled to said flow port to permit metered flow of water through said solenoid valve when said plunger is in said second position occluding flow though said flow port.

21. The coffee brewer of claim 18, including a check valve fluidly coupled between said phase control valve and said heating unit and positioned to prevent backflow of heated water into said phase control valve during said water brew or said steam brew phases.

22. The coffee brewer of claim 18, including an optical sensor having an emitter that selectively generates a beam receptive by a detector, said optical sensor being positioned relative to said phase control valve such that the flow of unheated water through said phase control valve during said water brew phase displaces said plunger to disrupt communication of said beam between said emitter and said detector, wherein said water reservoir includes an outlet port having a filter screen.

23. The coffee brewer of claim 18, including an optical sensor having an emitter that selectively generates a beam receptive by a detector, said optical sensor being positioned relative to said phase control valve such that the turbulent flow of unheated water through said phase control valve during said water brew phase disrupts communication of said beam between said emitter and said detector.

24. The coffee brewer of claim 18, including a light synchronized with an audible tone and evacuation of brewed beverage from said brew basket, wherein said heating unit comprises multiple heating units.

25. A coffee brewer, comprising:
a brewer head having a cavity configured for nested reception of a brew basket that intermixes hot water and coffee during a brew cycle;
at least one water inflow port in said brewer head for introducing at least one hot water stream into said brew basket for contacting coffee to produce brewed coffee;
at least two heating units disposed upstream from said water inflow port for producing said hot water stream;
a phase control valve for regulating the supply of unheated water to said heating unit, said phase control valve alternating between a first position permitting a first flow rate of unheated water to said heating unit during a water brew phase and a second position permitting a relatively lower second flow rate of unheated water to said heating unit during a steam brew phase;
a water reservoir for retaining relatively unheated water fluidly coupled upstream from said phase control valve, said phase control valve regulating delivery of unheated water from said water reservoir to said heating unit during said water and steam brew phases, wherein said water reservoir includes an outlet port having a filter screen;
an optical sensor having an emitter that selectively generates a beam receptive by a detector, said optical sensor being positioned relative to said phase control valve such that the flow of unheated water through said phase control valve during said water brew phase displaces a plunger therein to disrupt communication of said beam between said emitter and said detector; and
a controller configured for sending an electrical control signal to said phase control valve to move said phase control valve between said first and second positions multiple times during the brew cycle.

26. The coffee brewer of claim 25, wherein said phase control valve comprises a solenoid valve having a central shaft with a hollow plunger movable therein and selectively positionable within a magnetic field selectively generated by a coil and a valve seat having at least one flow port therein, said plunger substantially permitting water flow through said flow port when in an unseated position and substantially occluding water flow through said flow port when in a seated position, wherein said unseated position corresponds with said water brew phase and said seated position corresponds with said steam brew phase.

27. The coffee brewer of claim 26, including a check valve fluidly coupled between said phase control valve and said heating unit and positioned to prevent backflow of heated water into said phase control valve during said water brew or said steam brew phases and an optical sensor having an emitter that selectively generates a beam receptive by a detector, said optical sensor being positioned relative to said phase control valve such that the turbulent flow of unheated water through said phase control valve during said water brew phase disrupts communication of said beam between said emitter and said detector, wherein said valve seat further includes a bypass channel fluidly coupled to said flow port to permit metered flow of water through said solenoid valve when said plunger is in said seated position occluding flow though said flow port.

28. The coffee brewer of claim 26, including a water reservoir for retaining relatively unheated water fluidly coupled upstream from said phase control valve, said phase control valve regulating delivery of unheated water from said water reservoir to said heating unit during said water and steam brew phases, and a light synchronized with an audible tone and evacuation of brewed beverage from said brew basket at the end of said brew cycle, wherein said controller measures current changes in said magnetic field through movement of said plunger in said central shaft during said water brew phase.

29. The coffee brewer of claim 25, including a TRIAC for regulating a duty cycle of said heating unit in real-time, wherein said phase control valve is positioned in fluid communication between a reservoir and said heating unit, said phase control valve being actuated based upon an electrical control signal from said controller coupled to a memory chip for storing a program comprising a plurality of manually or automatically selectable brewing programs, said memory chip accessible by said controller for causing said controller to send said electrical control signal to said phase control valve according to said program.

30. A coffee brewer, comprising:
a brewer head having a cavity configured for nested reception of a brew basket that intermixes hot water and coffee during a brew cycle;
at least one water inflow port in said brewer head for introducing at least one hot water stream into said brew basket for contacting coffee to produce brewed coffee;
a heating unit disposed upstream from said water inflow port for producing said hot water stream before delivery to said brew basket;
a phase control valve for regulating the supply of unheated water to said heating unit, said phase control valve alternating between a first position permitting a substantial full flow of unheated water to said heating unit during a water brew phase and a second position substantially restricting full flow of unheated water to said heating unit during a steam brew phase, the phase control valve comprising a solenoid valve having a central shaft with a hollow plunger movable therein and selectively positionable within a magnetic field; and
a TRIAC coupled to a controller for regulating a duty cycle of said heating unit in real-time, wherein said controller is coupled to a memory chip for storing a program comprising a plurality of manually or automatically selectable brewing programs, said memory chip accessible by said controller for causing said controller to send an electrical control signal to said phase control valve according to said program.

31. The coffee brewer of claim 30, wherein said phase control valve includes a valve seat having at least one flow port therein, said plunger substantially permitting water flow through said flow port when in an unseated position and substantially occluding water flow through said flow port when in a seated position.

32. The coffee brewer of claim 31, wherein said unseated position corresponds with said water brew phase and said seated position corresponds with said steam brew phase.

33. The coffee brewer of claim 31, wherein said valve seat further includes a bypass channel fluidly coupled to said flow port to permit metered flow of water through said phase control valve when said plunger is in said seated position occluding flow though said flow port.

34. The coffee brewer of claim 30, wherein said controller measures current changes in said magnetic field through movement of said plunger in said central shaft during said water brew phase.

35. The coffee brewer of claim 30, including a check valve fluidly coupled between said phase control valve and said heating unit and positioned to prevent backflow of heated water into said phase control valve during said water brew or said steam brew phases.

36. The coffee brewer of claim 30, including a water reservoir for retaining relatively unheated water fluidly coupled upstream from said phase control valve, said phase control valve regulating delivery of unheated water from said water reservoir to said heating unit during said water and steam brew phases.

37. The coffee brewer of claim 30, wherein said controller is configured to send an electrical control signal to said phase control valve to move said phase control valve between said first and second positions multiple times during the brew cycle.

38. A method for brewing a beverage, comprising the steps of:
flowing unheated water from a water reservoir to a heating unit through a phase control valve; activating a heating element for imparting energy to said unheated water to create a stream of heated water or a stream of heated steam;
delivering the stream of heated water or the stream of heated steam to a brew basket for mixing with coffee to create a brewed beverage;
determining whether a brew basket lid or a water reservoir lid are in a closed position; and
alternating the phase control valve between a first position permitting a first flow rate of unheated water to the heating unit to create the stream of heated water and a second position permitting a relatively lower second flow rate of unheated water to the heating unit to create the stream of heated steam.

39. The method of claim 38, including the step of sensing a low or no water condition in the water reservoir.

40. The method of claim 38, including the step of opening the phase control valve.

41. The method of claim 38, including the step of closing the phase control valve.

42. The method of claim 38, wherein the phase control valve comprises a solenoid valve inline and upstream of the heating element.

43. The method of claim 38, including the step of activating an audio notification.

44. The method of claim 38, including the step of illuminating a light.

45. The method of claim 38, including the step of reading a brewer inline voltage.

46. The method of claim 38, including the step of measuring a quantity of fluid in the reservoir with a sensor comprising a reed switch.

47. The method of claim 38, including the step of delaying activation of a bimetal switch.

48. The method of claim 38, including the step of initiating a near end of brew program.

49. The method of claim 38, including the step of measuring a time between brewer initiation and a low or no water state in the water reservoir.

50. The method of claim 38, including the step of regulating a duty cycle of the heating unit with a TRIAC.

51. The method of claim 38, including the step of electronically controlling the phase control valve between the reservoir and the heating unit.

52. The method of claim 38, including the step of operating a phase control valve electronically controlled according to a selected program.

53. The method of claim 38, including the step of selecting the predetermined program from one of a plurality of different predetermined programs.

54. The process of claim 38, further comprising the steps of:
   relaying a sensed low or no water condition to a control circuit; and
   selecting a program for evacuating the brewed beverage from the brew basket.

55. The process of claim 38, including the step of selecting a program from a plurality of predetermined programs based on an initial brewer inline voltage.

56. The process of claim 55, including the step of selecting a new program based on a subsequent brewer inline voltage.

57. The process of claim 55, including the step of deactivating a bimetal switch for a predetermined time.

* * * * *